US008901965B2

(12) United States Patent
Fish et al.

(10) Patent No.: US 8,901,965 B2
(45) Date of Patent: Dec. 2, 2014

(54) DEVICE AND METHOD FOR DUAL-MODE LOGIC

(75) Inventors: Alexander Fish, Tel-Mond (IL); Asaf Kaizerman, Givataim (IL); Sagi Fisher, Tel-Aviv (IL); Itamar Levy, LeHavim (IL)

(73) Assignee: Ben-Gurion University of the Negev Research and Development Authority, Beer-Sheva (IL)

( * ) Notice: Subject to any disclaimer, the term of this patent is extended or adjusted under 35 U.S.C. 154(b) by 0 days.

(21) Appl. No.: 14/236,641

(22) PCT Filed: Aug. 2, 2012

(86) PCT No.: PCT/IB2012/053972
§ 371 (c)(1),
(2), (4) Date: Feb. 3, 2014

(87) PCT Pub. No.: WO2013/018061
PCT Pub. Date: Feb. 7, 2013

(65) Prior Publication Data
US 2014/0232432 A1    Aug. 21, 2014

Related U.S. Application Data

(60) Provisional application No. 61/596,748, filed on Feb. 9, 2012, provisional application No. 61/514,497, filed on Aug. 3, 2011.

(51) Int. Cl.
*H03K 19/094* (2006.01)
*H03K 19/20* (2006.01)
*H03K 19/02* (2006.01)

(52) U.S. Cl.
CPC ............... *H03K 19/02* (2013.01); *H03K 19/20* (2013.01)
USPC ............................... 326/95; 326/93; 326/112

(58) Field of Classification Search
USPC ............................... 326/93–98, 112, 119, 121
See application file for complete search history.

(56) References Cited

U.S. PATENT DOCUMENTS

| 4,924,430 A | 5/1990 | Zasio et al. |
| 6,744,282 B1 | 6/2004 | Dhong et al. |

(Continued)

FOREIGN PATENT DOCUMENTS

| WO | WO 2013/018061 | 2/2013 |
| WO | WO 2013/118119 | 8/2013 |

OTHER PUBLICATIONS

International Preliminary Report on Patentability Dated Feb. 13, 2014 From the International Bureau of WIPO Re. Application No. PCT/IB2012/053972.

(Continued)

*Primary Examiner* — Don Le

(57) ABSTRACT

A dual-mode logic gate, for selectable operation in either of static and dynamic modes, includes: a static gate which includes at least one logic input and a logic output; a mode selector, configured for outputting a turn-off signal to select static mode operation and for outputting a dynamic clock signal to select dynamic mode operation; and a switching element associated with the mode selector static gate, comprising a first input connected to a constant voltage, a second input for inputting the mode selection signal from the mode selector, and an output connected to a logic output of the static gate. The switching elements switches the logic gate operation from static to dynamic mode, by applying the appropriate signal to the switching element.

29 Claims, 37 Drawing Sheets

(56) References Cited

U.S. PATENT DOCUMENTS

| | | | |
|---|---|---|---|
| 2003/0046649 | A1 | 3/2003 | Wheeler et al. |
| 2003/0153156 | A1 | 8/2003 | Forbes |
| 2005/0052203 | A1 | 3/2005 | Ngo |
| 2006/0001451 | A1* | 1/2006 | Malik .......................... 326/95 |
| 2006/0044020 | A1 | 3/2006 | Aipperspach et al. |
| 2006/0139061 | A1* | 6/2006 | Curtis et al. .................. 326/95 |
| 2006/0164119 | A1 | 7/2006 | Nowak-Leijten |
| 2007/0262793 | A1 | 11/2007 | Kapoor |
| 2009/0109780 | A1 | 4/2009 | Chang et al. |
| 2009/0271747 | A1 | 10/2009 | Tanaka |
| 2010/0127745 | A1 | 5/2010 | Hwang et al. |
| 2010/0231263 | A1 | 9/2010 | Fish et al. |
| 2010/0301903 | A1 | 12/2010 | Cocchi et al. |

OTHER PUBLICATIONS

International Search Report and the Written Opinion Dated Jun. 10, 2013 From the International Searching Authority Re. Application No. PCT/IL2013/050111.

International Search Report and the Written Opinion Dated Dec. 17, 2012 From the International Searching Authority Re. Application No. PCT/IB2012/053972.

Alioto "Understanding DC Behvior of Subthreshold CMOS Logic Through Closed-Form Analysis", IEEE Transactions on Circuits and Systems, I: Regular Papers, 57(7): 1597-1607, Jul. 2010.

Bol et al. "Analysis and Minimization of Practical Energy in 45nm Subthreshold Logic Circuits", IEEE International Conference on Computer Design, ICCD 2008, Lake Tahoe, CA, USA, Oct. 12-15, 2008, p. 294-300.

Calhoun et al. "Modeling and Sizing for Minimum Energy Operation in Subthreshold Circuits", IEEE Journal of Solid-State Circuits, 40(9): 1778-1786, Sep. 2005.

Calhoun et al. "Sub-Threshold Operation and Cross-Hierarchy Design for Ultra Low Power Wearable Sensors", IEEE International Symposium in Circuits and Systems, ISCAS 2009, p. 1437-1440, 2009.

Calhoun et al. "Ultra-Dynamic Voltage Scaling (UDVS) Using Sub-Threshold Operation and Local Voltage Dithering", IEEE Journal of Sold-State Circuits, 41(1): 238-245, Jan. 2006.

Chandrakasan et al. "Low-Power CMOS Digital Design", IEEE Journal of Solid-State Circuits, 27(4): 473-484, Apr. 1992.

Chang et al. "A Review of 0.18-[Mu]m Full Adder Performances for Tree Structured Arithmetic Circuits", IEEE Transactions on Very Large Scale Integration (VLSI) Systems, 13(6): 686-695, Jun. 2005.

Chappell et al. "A System-Level Solution to Domino Synthesis With 2 GHz Application", Proceedings of the 2002 IEEE International Conference on Computer Design: VLSI in Computer Processors, ICCD '02, Freiburg, Germany, Sep. 16-18, 2002, p. 164-171, 2002.

Chen et al. "Triple-Threshold Static Power Minimization Technique in High-Level Synthesis for Designing High-Speed Low-Power SOC Applications Using 90nm MTCMOS Technology", Canadian Conference on Electrical and Computer Engineering 2007, CCECE 2007, Cancouver, BC, Canada, Apr. 22-26, 2007, p. 1671-1674.

Cheng et al. "Self-Timed Carry-Lookahead Adders", IEEE Tansactions on Computer, 49(7): 659-672, Jul. 2000.

De Gloria et al. "Statistical Carry Lookahead Adders", IEEE Trans-actions on Computers, 45(3): 340-347, Mar. 1996.

Elgebaly et al. "Efficient Adaptive Voltage Scaling System Through On-Chip Critical Path Emulation", Proceedings of the 2004 International Symposium on Low Power Electronics and Design, ISLPED'04, Newport Beach, CA, USA, Aug. 9-11, 2004, 14.1: 375-380.

Gammle et al. "A 45nm 3.5G Baseband-and-Multimedia Application Processor Using Adaptive Body-Bias and Ultra-Low-Power Techniques", 2008 IEEE International Solid-State Circuits Conference, ISSCC 2008, Digest of Technical Paper, Mobile Processing, Session 13, 13.2: 258-259, 611, Feb. 5, 2008.

Goncalves et al. "NORA: A Racefree Dynamic CMOS Technique for Pipelined Logic Structures", IEEE Journal of Solid-State Circuits, SC-18(3): 261-266, Jun. 1983.

Guyot et al. "A Way to Build Efficient Carry-Skip Adders", IEEE Transactions on Computers, C-36(10): 1144-1152, Oct. 1987.

Hanson et al. "Ultralow-Voltage, Minimum-Energy CMOS", IBM Journal of Research & Development, 50(4/5): 469-490, Jul./Sep. 2006.

Harris et al. "A Transregional Model for Near-Threshold Circuits With Application to Minimum-Energy Operation", 22nd International Conference on Microelectronics (ICM 2010), p. 64-67, Dec. 2010.

Harris et al. "Skew-Tolerant Domino Circuits", IEEE Journal of Solid-State Circuits, 32(11): 1702-1711, Nov. 1997.

Hossain "High Performance ASIC Design. Using Synthesizable Domino Logic in an ASIC Flow", Cambridge University Press, 2008.

Hwang et al. "ABRM: Adaptice Beta-Ration Modulation for Process-Tolerant Ultradynamic Voltage Scaling", IEEE Transactions on Very Large Scale Integration (VLSI) Systems, 18(2): 281-290, Feb. 2010.

Kao et al. "Subthreshold Leakage Modeling and Reduction Techniques", Proceedings of the 2002 IEEE/ACM International Conference on Computer-Aided Design, p. 141-148, 2002.

Keane et al. "Subthreshold Logical Effort: A Systematic Framework for Optimal Subthreshold Device Sizing", 43ed ACM/IEEE Design Automation Conference, DAC 2006, San Francisco, CA, USA, Jul. 24-28, 2006, p. 425-428.

Kwong et al. Variation-Driven Device Sizing for Minimum Energy Sub-Threshold Circuits, Proceedings of the 2006 International Symposium on Low Power Electronics and Design, ISLPED '06, Tegernsee, Germany, Oct. 4-6, 2006, p. 8-13.

Lehman et al. "Skip Techniques for High-Speed Carry-Propagation in Binary Arithmetic Units", IRE Transactions on Electronic Computers, p. 691-698, Dec. 1961.

Liu et al. "Performance of Submicron CMOS Devices and Gates With Substrate Biasing", IEEE International Symposium on Circuits and Systems, ISCAS 2000, Geneva, Switzerland, May 28-31, 2000, p. IV-9-IV-12.

Mair et al. "A 65-nm Mobile Multimedia Applicaitons Processor With An Adaptive Power Management Scheme to Compensate for Variations", 2007 Symposium on VLSI Circuits Digest of Technical Papers, p. 224-225, 2007.

Majerski "On Determination of Optimal Distributions of Carry Skips in Adders", IEEE Transactions on Electronic Computers, EC-16(1): 45-58, Feb. 1967.

Markovic et al. "Ultralow-Power Design in Near-Threshold Region. New Basic Logic That Selects Between Possible Output Values Using A Sense Amplifier May Be Able to Dramatically Improve Ultralow-Power System Performance", Proceedings of the IEEE, 98(2): 237-252, Feb. 2010.

Meijer et al. "Body-Bias-Driven Design Strategy for Area- and Performance-Efficient CMOS Circuits", IEEE Transactions on Very Large Scale Integration (VLSI) Systems, 20(1): 42-51, Jan. 2012.

Noullet et al. "Do We Need so Many Cells for Digital Asic Synthesis", Electron Technology, 32(3): 272-276, 1999.

Oklobdzija et al. "Some Optimal Schemes for Alu Implementation in VLSI Technology", 1985 IEEE 7th Symposium on Computer Arithmetic, ARITH, Urbana, Ill., USA, Jun. 4-6, 1985, p. 2-8, 1985.

Puri et al. "Logic Optimization by Output Phase Assignment in Dynamic Logic Synthesis", Proceedings of the 1996 IEEE/ACM International Conference on Computer-Aided Design, ICCAD '96, p. 2-7, 1997.

Scott et al. "Improving Cell Libraries for Synthesis", Proceedings of the IEEE 1994 Custom Integrated Circuits Conference, May 1-4, 1994, 7.2.1: 128-131.

Seevinck et al. "Static-Noise Margin Analysis of MOS SRAM Cells", IEEE Journal of Solid-State Circuits, SC-22(5): 748-754, Oct. 1987.

Sirisantana et al. "High-Performance Low-Power CMOS Circuits Using Multiple Channel Length and Multiple Oxide Thickness", Proceedings of the 2000 International Conference on Computer Design, Austin, TX, USA, Sep. 17-20, 2000, p. 227-232.

Soeleman et al. "Sub-Domino Logic: Ultra-Low Power Dynamic Sub-Threshold Digital Logic", Proceedings of the 14th International Conference on VLSI Design, VLSID '01, P.211, 2001.

(56) References Cited

OTHER PUBLICATIONS

Soeleman et al. "Ultra-Low Power Digital Subthreshold Logic Circuits", Proceddings of the 1999 International Symposium on Low Power Electronics and Design, ISLPED99, San Diego, CA, USA, p. 94-96, 1999.

Strollo et al. "New Clock-Gating Techniques for Low-Power Flip-Flops", Proceedings of the 2002 International Symposium on Low Power Electronics and Design, ISLPED '00, p. 114-119, 2000.

Sutherland et al. "Logical Effort: Designing Fast CMOS Circuits", Draft, Morgan Kaufmann Publishers, Inc., 223 P., May 19, 1998.

Swanson et al. "Ion-Implanted Complementary MOS Transistors in Low-Voltage Circuits", IEEE International Solid-State Circuits Conference, ISSCC '72, University Museum, University of Pennsylvenia, USA, Feb. 18, 1972, Session XVI: New Device and Circuit Techniques, Digest of Technical Papers, FAM 16.5: 192-193, Feb. 18, 1972.

Tran et al. "Design of an Energy-Efficient 32-Bit Adder Operating at Subthreshold Voltages in 45-nm CMOS", Third international Conference on Communications and Electronics, ICCE 2010, Nha Trang, Vietnam, Aug. 11-13, 2010, p. 87-91.

Verma et al. "Nanometer MOSFET Variation in Minimum Energy Subthreshold Circuits", IEEE Transactions on Electron Devices, 55(1): 163-174, Jan. 2008.

Vittoz et al. "CMOS Analog Integrated Circuits Based on Weak Inversion Operation", IEEE Journal of Solid-State Circuits, SC-12(3): 224-231, Jun. 1977.

Zhai et al. "Analysis and Mitigation of Variability in Subthreshold Design", Proceedings of the 2005 International Symposium on Low Power Electronics and Design, ISPLED '05, San Diego, CA, USA, Aug. 8-10, 2005, p. 20-25, 2005.

\* cited by examiner

| Delay | Neglected Stages |
|---|---|
| Without Branching eq. 34 | $t^{g0}_{DML} \left\{ \underbrace{\dfrac{N_{S\_drain}}{2}}_{P\_DML\ Simplified} \gamma + \underbrace{\dfrac{N_{S\_gate}}{2}}_{LE\_DML\ Simplified} \underbrace{\dfrac{N_{S\_Load} \cdot S_{i+1}}{N_{S\_gate} \cdot S_i}}_{f\_DML\ Simplified} \right\} \begin{bmatrix} \cdot 1 & if\ A \\ \cdot \mu_{n/p} & if\ B \end{bmatrix}$ |
| Including Branching eq. 35 | $t^{g0}_{DML} \left\{ \underbrace{\dfrac{N_{S\_drain}}{2}}_{P\_DML\ Simplified} \gamma + \underbrace{\dfrac{N_{S\_gate}}{2}}_{LE\_DML\ Simplified} \underbrace{\underbrace{\dfrac{\sum_{On+Off\ Path\ i}(N_{S\_gate})}{N_{S\_gate\_on\_path\_i}}}_{b\_DML\ simplified} \underbrace{\dfrac{N_{S\_Load\_on} \cdot S_{i+1}}{N_{S\_gate} \cdot S_i}}_{f\_DML\ Simplified}}_{EF\_simplified} \right\} \begin{bmatrix} \cdot 1 & if\ A \\ \cdot \mu_{n/p} & if\ B \end{bmatrix}$ |

FIGURE 9B (Continued on next page)

| Delay | Un-Neglected stages |
|---|---|
| Without Branching eq. 36 | $t_{p0_{DML}} \underbrace{\dfrac{(N_{S\_drain}s_i + N_{min\_drain})}{2s_i}}_{P\_DML\ un-neglected}\gamma + \underbrace{\dfrac{(N_{S\_gate}s_i+1)}{2 \cdot s_i}}_{LE\_DML\ un-neglected}\underbrace{\dfrac{C_{Load}}{(N_{S\_gate}s_i+1)}}_{f\_DML\ un-neglected}\begin{bmatrix}\cdot 1 & if\ A \\ \cdot \mu_{n/p} & if\ B\end{bmatrix}$ |
| Including Branching eq. 37 | $t_{p0_{DML}} \underbrace{\dfrac{(N_{S\_drain}s_i + N_{min\_drain})}{2s_i}}_{P\_DML\ un-neglected}\gamma + \underbrace{\dfrac{(N_{S\_gate}s_i+1)}{2 \cdot s_i}}_{LE\_DML\ un-neglected}\underbrace{\dfrac{b_i}{b\_DML\ un-neglected}\dfrac{C_{Load\_on}}{(N_{S\_gate}s_i+1)}}_{EF\_un-neglected}\begin{bmatrix}\cdot 1 & if\ A \\ \cdot \mu_{n/p} & if\ B\end{bmatrix}$ |

FIGURE 9B (Continued)

| | | | |
|---|---|---|---|
| Sized INV DML Type_A | $C_{Load} \propto s_{i+1} + 1$ | Sized INV DML Type_B | $C_{Load} \propto s_{i+1} + 1$ |
| Sized NOR_2 DML Type_A | $C_{Load} \propto s_{i+1} + 1$ | Sized NOR_2 DML Type_B | $C_{Load} \propto 2s_{i+1} + 1$ |
| Sized NOR_3 DML Type_A | $C_{Load} \propto s_{i+1} + 1$ | Sized NOR_3 DML Type_B | $C_{Load} \propto 3s_{i+1} + 1$ |
| Sized NAND_2 DML Type_A | $C_{Load} \propto 2s_{i+1} + 1$ | Sized NAND_2 DML Type_B | $C_{Load} \propto s_{i+1} + 1$ |
| Sized NAND_3 DML Type_A | $C_{Load} \propto 3s_{i+1} + 1$ | Sized NAND_3 DML Type_B | $C_{Load} \propto s_{i+1} + 1$ |
| Sized AOI_21 DML Type_A | $\underbrace{C_{Load} \propto 2s_{i+1} + 1}_{A,B\_inputs}$ $\underbrace{C_{Load} \propto s_{i+1} + 1}_{C\_input}$ | Sized AOI_21 DML Type_B | $C_{Load} \propto 2s_{i+1} + 1$ |
| Sized OAI_2 DML Type_A | $C_{Load} \propto 2s_{i+1} + 1$ | Sized OAI_2 DML Type_B | $\underbrace{C_{Load} \propto 2s_{i+1} + 1}_{A,B\_inputs}$ $\underbrace{C_{Load} \propto s_{i+1} + 1}_{C\_input}$ |

FIGURE 9C

Transistor width and L-E parameter calculations

| Gate | Technology | PMOS width | NMOS width | Clock transistor width | p | g | d= ghb+p for h = 3, b=1 |
|---|---|---|---|---|---|---|---|
| NOR 3 | CMOS | 8.4 | 1 | - | 11.4/3 | 9.4/3 | 13.2 |
| | Dom\Dyn | 1 | 3.3 | 1 | 10.9/3 | 3.3/3 | 7.2 |
| | DML_A_un-footed | *1* | *1* | *1* | *5/3* | *2/3* | *3.667* |
| | DML_B_un-footed | 8.4 | 1 | 1 | 12.4/3 | 9.4/3 | 13.533 |
| | DML_A_footed | 1 | 3.3 | 1 | 11.9/3 | 4.3/3 | 8.267 |
| | DML_B_footed | 15 | 1 | 1 | 19/3 | 16/3 | 22.33 |
| NAND 3 | CMOS | 1.5 | 5.6 | | 10.1/3 | 7.1/3 | 10.467 |
| | Dom\Dyn | 1 | 10 | 1 | 11/3 | 10/3 | 13.667 |
| | DML_A_un-footed | 1 | 5.6 | 1 | 9.6/3 | 6.6/3 | 9.8 |
| | DML_B_un-footed | *1.5* | *1* | *1* | *6.5/3* | *2.5/3* | *4.667* |
| | DML_A_footed | 1 | 10 | 1 | 14/3 | 11/3 | 15.667 |
| | DML_B_footed | 5 | 1 | 1 | 17/3 | 6/3 | 11.667 |

FIGURE 13B

DEVICE AND METHOD FOR DUAL-MODE LOGIC

RELATED APPLICATIONS

This application is a National Phase of PCT Patent Application No. PCT/IB2012/053972 having International filing date of Aug. 2, 2012, which claims the benefit of priority under 35 USC §119(e) of U.S. Provisional Patent Application Nos. 61/514,497 filed on Aug. 3, 2011 and 61/596,748 filed on Feb. 9, 2012. The contents of the above applications are all incorporated by reference as if fully set forth herein in their entirety.

FIELD AND BACKGROUND OF THE INVENTION

The present invention, in some embodiments thereof, relates to a Dual Mode Logic (DML) family and, more particularly, but not exclusively, to a DML family with transistor sizing methodologies.

With advancements in technology and the expansion of mobile applications, power consumption has become a primary focus of attention in VLSI digital design. Recently, digital sub-threshold circuit design has become a very promising method for ultra-low power applications. Circuits, operating in the sub-threshold region, utilize a supply voltage ($V_{DD}$) that comes close to or is even less than the threshold voltages of the transistors, so it allows significant reduction of both dynamic and static power. However, an aggressive scaling of supply voltage also results in performance degradation and a much higher sensitivity to process variations and temperature fluctuations.

The most common logic design family used for sub-threshold today is CMOS. Ultra low Voltage (ULV) operation originally introduced in 1972, first, originally used for low throughput applications like wrist watches, biomedical devices and sensors, offers low to moderate performance—up to 50 Mhz—while maintaining low-power dissipation. In 1999 CMOS sub-threshold design was introduced again.

The advantages offered by a conventional CMOS design methodology are well known and widely explored. They include: rail to rail logic levels, strong on and off states, and, various others. Until more recent processes, the CMOS methodology also featured very low static power consumption.

These advantages were also gained by sub-threshold designs. Low voltage operation of Static CMOS logic is quite straightforward, as its non-ratioed structure generally achieves robust operation However, in state of the art nano-scale processes in which the feature size is decreased beyond a hundred nanometers, the sub-threshold slope is increased, resulting in a decreased $I_{on}/I_{off}$ ratio. This prevents the designing of digital gates with large fan-ins, because retaining a logical level may not always be possible when contending with strong opposite leakage, especially under process variations and device mismatch.

Dynamic Logic, such as Domino logic, has been used since the 1970's for high performance applications. Some of the advantages of basic dynamic logic over CMOS logic are reduced area, high performance and, in some cases, reduced power consumption. However, dynamic logic also presents a number of significant drawbacks, such as bulky design, charge sharing, high dynamic power consumption and glitches susceptibility, which intensify with process and voltage scaling. In the past there were several attempts to use dynamic logic in sub-threshold to improve the speed, but because of high sensitivity to process variations in nano-scale technologies, these attempts did not gain momentum. Moreover, recently, the aforementioned problems have even reduced the utilization of super-threshold dynamic logic in recent processes.

Low voltage logic is not widely used as yet, mainly due to significant degradation in performance. Domino low voltage logic was introduced as a possible solution; however, it has not been in use due to high sensitivity to process variations. Moreover, with process scaling, dynamic logic is being abandoned even in the super-threshold regime, due to very low yield and logic failures. The same issues arise at standard operating voltage levels as well. Static logic is power-efficient but slow, whereas dynamic logic faster but at the cost of higher power consumption.

In the last years, there has been a spread of new non-traditional computing platforms with high processing capabilities and mobility requirements. The applications based on these computing platforms are characterized by a non-constant resource usage and time varying workload. Various solutions, such as Dynamic Voltage Scaling, threshold balancing and the recently introduced third generation of SmartReflex have proposed to better fit the requirements of these platforms.

Transistor sizing is a significant element of logic circuit design. Logical effort analysis is sometimes utilized to optimize transistor sizing for a minimal circuit delay.

None of the currently known circuit topologies provides the benefits of both low power operation and minimal circuit delay.

Additional background art includes:

[1] A. P. Chandrakasan, S. Sheng and R. W. Brodersen, "Low-power CMOS digital design," Solid-State Circuits, IEEE Journal of, vol. 27, pp. 473-484, 2002.

[2] G. Gammie, A. Wang, M. Chau, S. Gururajarao, R. Pitts, F. Jumel, S. Engel, P. Royannez, R. Lagerquist and H. Mair, "A 45 nm 3.5 g baseband-and-multimedia application processor using adaptive body-bias and ultra-low-power techniques," in Solid-State Circuits Conference, 2008. ISSCC 2008. Digest of Technical Papers. IEEE International, pp. 258-611, 2008.

[3] B. H. Calhoun, J. Bolus, S. Khanna, A. D. Jurik, A. C. Weaver and T. N. Blalock, "Sub-threshold operation and cross-hierarchy design for ultra low power wearable sensors," in Circuits and Systems, 2009. ISCAS 2009. IEEE International Symposium on, pp. 1437-1440, 2009.

[4] D. Bol, R. Ambroise, D. Flandre and J. D. Legat, "Analysis and minimization of practical energy in 45 nm subthreshold logic circuits," in Computer

[5] D. Markovic, C. C. Wang, L. P. Alarcon and J. M. Rabaey, "Ultralow-power design in near-threshold region," Proc IEEE, vol. 98, pp. 237-252, 2010.

[6] B. Zhai, S. Hanson, D. Blaauw and D. Sylvester, "Analysis and mitigation of variability in subthreshold design," in Proceedings of the 2005 international symposium on Low power electronics and design, pp. 20-25, 2005.

[7] N. Verma, J. Kwong and A. P. Chandrakasan, "Nanometer MOSFET variation in minimum energy subthreshold circuits," Electron Devices, IEEE Transactions on, vol. 55, pp. 163-174, 2008.

[8] R. Swanson and J. Meindl, "Ion-implanted complementary MOS transistors in low-voltage circuits," Solid-State Circuits, IEEE Journal of, vol. 7, pp. 146-153, 1972.

[9] E. Vittoz and J. Fellrath, "CMOS analog integrated circuits based on weak inversion operations," Solid-State Circuits, IEEE Journal of, vol. 12, pp. 224-231, 1977.

[10] H. Soeleman and K. Roy, "Ultra-low power digital sub-threshold logic circuits," in Proceedings of the 1999 international symposium on Low power electronics and design, pp. 94-96, 1999.

[11] J. Kao, S. Narendra and A. Chandrakasan, "Subthreshold leakage modeling and reduction techniques," in Proceedings of the 2002 IEEE/ACM international conference on Computer-aided design, pp. 141-148, 2002.

[12] W. M. Pensey and L. Lau, "MOS Integrated Circuits," pp. 260-282, 1972.

[13] H. Soeleman, K. Roy and B. Paul, "Sub-domino logic: ultra-low power dynamic sub-threshold digital logic," Vlsid, pp. 211, 2001.

[14] B. H. Calhoun and A. P. Chandrakasan, "Ultra-dynamic voltage scaling (UDVS) using sub-threshold operation and local voltage dithering," Solid-State Circuits, IEEE Journal of, vol. 41, pp. 238-245, 2006.

[15] M. E. Hwang and K. Roy, "ABRM: Adaptive β-Ratio Modulation for Process-Tolerant Ultradynamic Voltage Scaling," Very Large Scale Integration (VLSI) Systems, IEEE Transactions on, vol. 18, pp. 281-290, 2010.

[16] B. H. Calhoun, A. Wang and A. Chandrakasan, Modeling and sizing for minimum energy operation in subthreshold circuits, IEEE J. Solid-St. Circ. 40 (2005) 1778-1786.

[17] S. Hanson, B. Zhai, K. Bernstein, D. Blaauw, A. Bryant, L. Chang, K. K. Das, W. Haensch, E. J. Nowak and D. Sylvester, Ultralow-voltage, minimum-energy CMOS, IBM J. Res. Dev. 50 (2006) 469-490.

[18] H. Mair, A. Wang, G. Gammie, D. Scott, P. Royannez, S. Gururajarao, M. Chau, R. Lagerquist, L. Ho and M. Basude, A 65-nm mobile multimedia applications processor with an adaptive power management scheme to compensate for variations, IEEE Sym. VLSI Circ. (2007) 224-225.

[19] I. E. Sutherland, R. F. Sproull and D. F. Harris, Logical effort: designing fast CMOS circuits, Morgan Kaufmann, San Francisco, 1999.

[20] J. Keane, H. Eom, T. H. Kim, S. Sapatnekar and C. Kim, Subthreshold logical effort: a systematic framework for optimal subthreshold device sizing, Design Automation Conference, 2006 43rd ACM/IEEE, 425-428.

[21] D. Harris, B. Keller, J. Karl, and S. Keller, A transregional model for near-threshold circuits with application to minimum-energy operation, in Microelectronics (ICM), 2010 International Conference on, December 2010, pp. 64-67.

[22] J. Kwong and A. P. Chandrakasan, Variation-driven device sizing for minimum energy sub-threshold circuits, Proceedings of the 2006 International Symposium on Low Power Electronics and Design, 8-13.

[23] R. Hossain, High Performance ASIC Design: Using Synthesizable Domino Logic in an ASIC Flow, Cambridge University Press, New York, 2008.

[24] C. H. Chang, J. Gu, and M. Zhang, A review of 0.18 μm full adder performance for tree structure arithmetic circuits, IEEE Trans. VLSI Syst. 13(6) (2005).

[25] H. Razak, "High Performance ASIC Design: Using Synthesizable Domino Logic in an ASIC Flow", Cambridge University Press, 2008'

[26] M. Alioto, "Understanding DC Behavior of Subthreshold CMOS Logic through Closed-Form Analysis," vol. 57, pp. 1597-1607, July 2010.

[27] E. Seevinck, F. List and J. Lohstroh, "Static-noise margin analysis of MOS SRAM cells," Solid-State Circuits, IEEE Journal of, vol. 22, pp. 748-754, 2002.

[28] F.-C. Cheng, S. H. Unger and M. Theobald, "Self-timed carry-lookahead adders," IEEE Trans. Comp., vol. 49, pp. 659-672, 2000.

[29] A. De Gloria and M. Olivieri, "Statistical carry lookahead adders," IEEE Trans. Comp., vol. 45, pp. 340-347, 1996.

SUMMARY OF THE INVENTION

A low-power Dual Mode Logic (DML) family is presented herein. The DML logic family may be switched between static and dynamic modes of operation according to system requirements. Transistor sizing may be performed in accordance with the principles of Logical Effort optimization. DML logic circuits may be tailored to operate in the low-voltage region According to an aspect of some embodiments of the present invention there is provided a dual-mode logic gate, for selectable operation in either of static and dynamic modes, comprising: a static gate comprising, at least one logic input and a logic output; a mode selector, configured for outputting a turn-off signal to select static mode operation and for outputting a dynamic clock signal to select dynamic mode operation; and a switching element associated with the mode selector static gate, comprising a first input connected to a constant voltage, a second input for inputting the mode selection signal from the mode selector, and an output connected to a logic output of the static gate. The dual-mode logic gate is configured to:
  i) disconnect the static gate output from both of the first and second inputs when the mode selector applies the turn-off signal to the second input; and
  ii) connect the static gate output to both of the first and second inputs when the mode selector applies the dynamic clock signal to the second input.

According to some embodiments of the invention, the switching element comprises a switching transistor having a first and second diffusion connection and a gate connection, wherein the first diffusion connection comprises the first input of the switching element, the gate connection comprises the second input of the switching element, and the second diffusion connection comprises the output of the switching element, such that for static operation the mode selector applies the turn-off signal to the gate connection so as to turn off the switching transistor, and for dynamic mode the mode selector applies the dynamic mode clock signal to the gate.

According to some embodiments of the invention, the static gate comprises a type-A gate and the switching transistor comprises a p-type transistor, the second diffusion connection being connected to a high constant voltage.

According to some embodiments of the invention, the static gate comprises a type-B gate and the switching transistor comprises an n-type transistor, the second diffusion connection being connected to a low constant voltage.

According to some embodiments of the invention, the dual-mode logic gate further comprises a footer connected to the static gate.

According to some embodiments of the invention, the mode selector further comprises a clock input for inputting the dynamic mode clock signal.

According to some embodiments of the invention, the mode selector is further configured for internally-generating the dynamic mode clock signal.

According to some embodiments of the invention, the mode selector is further configured for determining a current mode of operation in accordance with mode selection inputs.

According to some embodiments of the invention, the static gate comprises a first portion comprising transistors configured for evaluation of logic input signals, and a second portion comprising transistors comprising static gate transistor unincluded in the first portion, and wherein the switching element is connected in parallel with the second portion of the static gate.

According to an aspect of some embodiments of the present invention there is provided a dual-mode logic circuit, for selectable operation in either of static and dynamic modes, comprising: multiple DML blocks connected to perform a logic function, each of the DML blocks being independently selectable for static or dynamic operation; and a mode selector associated with the plurality of DML blocks, configured for selecting between static and dynamic operation by outputting a mode selection signal to each of the DML blocks to select between static and dynamic operation for each of the DML blocks.

According to some embodiments of the invention, the mode selector is configured for outputting a turn-off signal to select static mode operation and for outputting a dynamic clock signal to select dynamic mode operation.

According to some embodiments of the invention, each of the DML blocks comprises: a respective static gate comprising at least one logic input and a logic output; and a respective switching element associated with the static gate, comprising a first input connected to a constant voltage, a second input for inputting the mode selection signal from the mode selector, and an output connected to a logic output of the static gate. The DML block is configured to:
  i) disconnect the static gate output from both of the first and second inputs when the mode selector applies the turn-off signal to the second input; and
  ii) periodically connecting the static gate output to the constant voltage level, so as to enable dynamic operation.

According to some embodiments of the invention, the switching element comprises a switching transistor having a first and second diffusion connection and a gate connection, wherein the first diffusion connection comprises the first input of the switching element, the gate connection comprises the second input of the switching element, and the second diffusion connection comprises the output of the switching element, such that for static operation the mode selector applies the turn-off signal to the gate connection so as to turn off the switching transistor, and for dynamic mode the mode selector applies the dynamic mode clock signal to the gate.

According to some embodiments of the invention, in order to select static operation for a logic block the mode selector applies a turn-off signal to the second input of a respective switching element so as to turn off the respective switching element, and in order to select dynamic mode for the logic block the mode selector applies a dynamic mode clock signal to the second input of the respective switching element.

According to some embodiments of the invention, at least one of the DML blocks comprises a Type-A DML logic gate, each Type-A DML logic gate comprising a respective Type-A static gate and a respective p-type switching transistor having a first and second diffusion connection and a gate connection, the first diffusion connection of each switching transistor being connected to a logic output of the respective Type-A static gate.

According to some embodiments of the invention, at least one of the DML blocks comprises a Type-B static gate and a respective n-type switching transistor having a first and second diffusion connection and a gate connection, the first diffusion connection being connected to a logic output of the respective Type-B static gate.

According to some embodiments of the invention, the plurality of DML blocks comprises multiple Type-A DML blocks and multiple Type-B DML blocks, the Type-A and Type-B DML logic gates being cascaded in A-B pairs such that the mode selector applies the signals in parallel to the transistor gates.

According to some embodiments of the invention, the connected DML blocks comprise multiple transistors, each of the transistors being associated with a respective sizing factor, and wherein the respective sizing factors are selected so as to minimize a delay of the dual-mode logic circuit.

According to some embodiments of the invention, the minimized delay comprises a delay during dynamic operation.

According to some embodiments of the invention, the respective sizing factors are determined by logical effort optimization.

According to some embodiments of the invention, the dual-mode logic circuit comprises multiple critical paths, each critical path being independently selectable for static or dynamic operation, wherein the mode selector is further configured to determine a respective mode for each of the paths in accordance with current circuit operating conditions.

According to an aspect of some embodiments of the present invention there is provided a method of delay control for a dual-mode logic circuit, comprising:
providing dual-mode logic circuit comprising multiple critical paths, each of the critical paths being independently selectable for static or dynamic operation;
selecting at least one of the critical paths for dynamic operation; and
operating the selected critical paths in dynamic mode and the unselected critical paths in static mode.

According to some embodiments of the invention, the provided dual-mode logic circuit comprises multiple DML blocks connected to perform a logic function, each of the DML blocks being independently selectable for static or dynamic operation, and a mode selector associated with the plurality of DML blocks, configured for selecting between static and dynamic operation by outputting a mode selection signal to each of the DML blocks to select between static and dynamic operation for each of the DML blocks.

According to some embodiments of the invention, each of the DML blocks comprises:
a respective static gate comprising at least one logic input and a logic output; and
a respective switching transistor associated with the static gate, comprising a first and second diffusion connection and a gate connection, the first diffusion connection being connected to a logic output of the static gate.

According to some embodiments of the invention, the mode selector is configured for outputting a turn-off signal to select static mode operation and for outputting a dynamic clock signal to select dynamic mode operation, and wherein each of the DML blocks comprises:
a respective static gate comprising at least one logic input and a logic output; and
a respective switching element associated with the static gate, comprising a first input connected to a constant voltage, a second input for inputting the mode selection signal from the mode selector, and an output connected to a logic output of the static gate, and configured to:

i) disconnect the static gate output from both of the first and second inputs when the mode selector applies the turn-off signal to the second input; and ii) periodically connecting the static gate output to the constant voltage level, so as to enable dynamic operation.

According to some embodiments of the invention, the operating comprises:

applying a respective dynamic mode clock signal to each of the selected critical paths; and applying a respective turn-off signal to each of the unselected critical paths.

According to some embodiments of the invention, each of the DML blocks comprises multiple transistors in a respective topology, each of the transistors being associated with a respective sizing factor, comprising:

determining a delay of each of the DML blocks as a function of respective sizing factors of the transistors comprising the block;

summing the determined DML block delays to obtain total path delay, the sum being a function of the respective transistor sizing factors of all of the DML blocks;

deriving respective sizing factors to obtain equal effort from each of the DML blocks, in accordance with a respective topology of each of the DML blocks, thereby obtaining optimized delay for the dual-mode logic circuit.

According to some embodiments of the invention, the DML blocks form a logic path, further comprising determining an optimal number of stages in the path.

According to some embodiments of the invention, the method further comprises inserting buffer stages within the logic path so as to obtain the optimal number of stages.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 9B shows the delay structure of the neglected and un-neglected stages, and also considers an approximated version of the branching effort;

FIG. 9C shows the proportionality of the load capacitance to the (i+1)'th gate capacitance;

FIG. 13B shows calculated LE parameters;

DESCRIPTION OF SPECIFIC EMBODIMENTS OF THE INVENTION

Figure 1A:
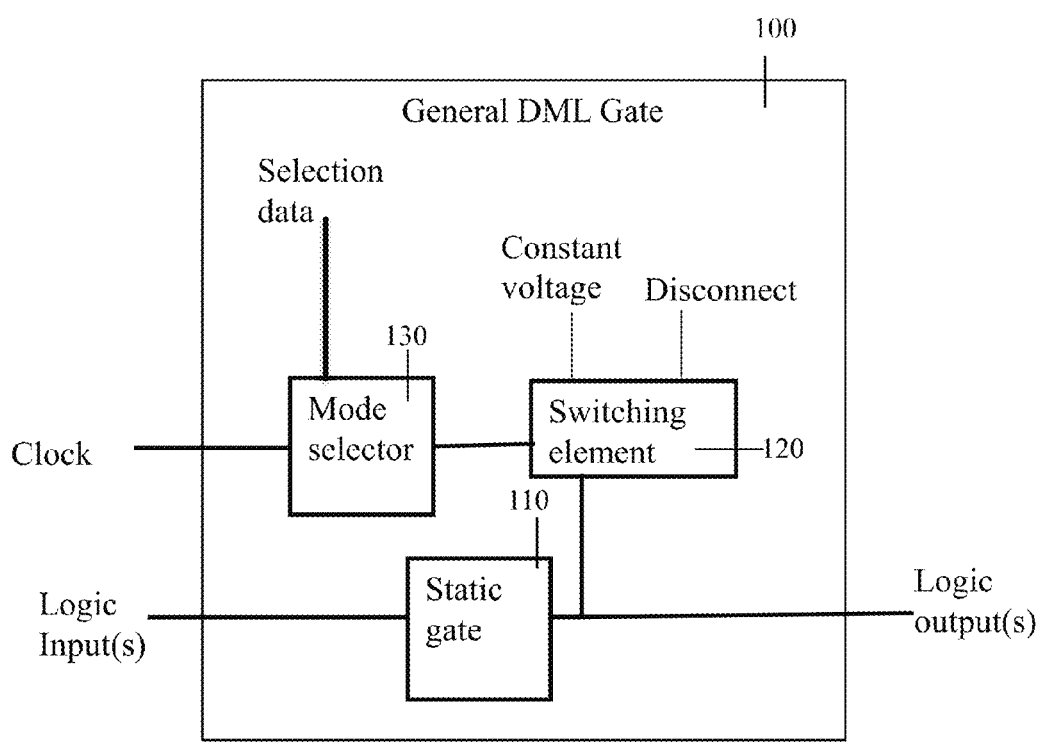
FIGS. 1A-1C are simplified circuit diagrams of a dual-mode logic element, according embodiments of the present invention.

The present invention, in some embodiments thereof, relates to a Dual Mode Logic (DML) family and, more particularly, but not exclusively, to a DML family with transistor sizing methodologies.

Currently logic circuits are designed to work in either static or dynamic mode. Each mode has advantages and disadvantages. Dynamic mode operates rapidly at the cost of high power consumption. Static mode operation operates at lower power with a greater circuit delay.

The Dual Mode Logic (DML) embodiments presented below may be switched between static and dynamic modes of operation according to system requirements. In static mode, the DML gates and circuits feature low power dissipation with moderate performance, while in dynamic mode they achieve higher performance, albeit with increased power dissipation. This unique feature of DML provides the option to control system performance on-the-fly and thus support applications where a flexible workload is required. These advantages are achieved with a simple and intuitive design concept.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

I. Dual-Mode Logic Gate

Reference is now made to FIG. 1A, which is a simplified block diagram of a dual-mode logic gate, according to embodiments of the present invention.

The general DML gate architecture includes:
1) A static gate 110;
2) A switching element 120 connected to the output of static gate 110; and
3) Mode selector 130 connected to the input of the switching element 120.

Mode selector 130 switches between the two functional modes, static and dynamic, by applying the required signal at the input of switching element 120.

When static mode is selected, switching element 120 creates no electrical connection between the static gate output and other portions of the circuit (denoted in FIG. 1A as "Disconnect"), enabling static operation. For example, in an embodiment having a p-type transistor serving as switching element 120 the term "disconnect" may be considered similar to the state of p-type CMOS transistor having one diffusion input connected to high when the gate signal is high, thereby turning off the p-type CMOS transistor.

During dynamic operation, switching element 120 receives a dynamic clock signal provided by mode selector 130, which periodically connects the static gate output to a constant voltage level (high or low as required by static gate topology), enabling dynamic operation.

Figure 1B:
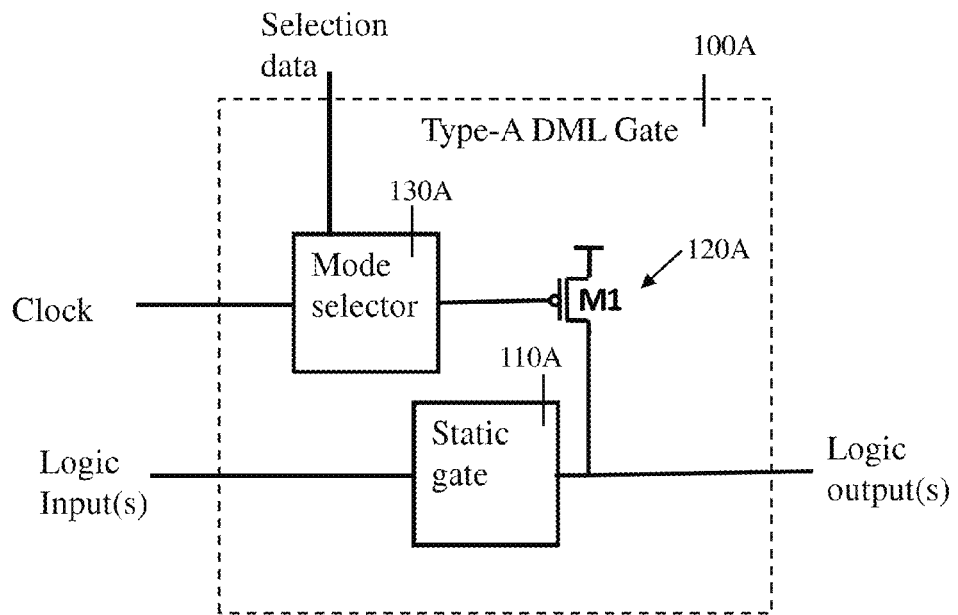
Figure 1C:
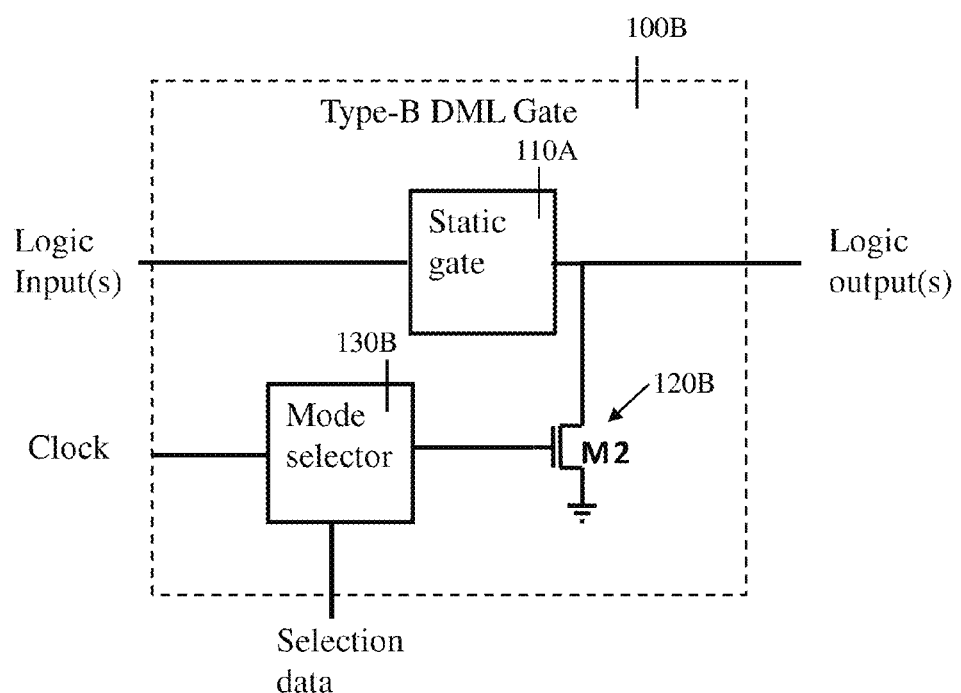

In the following, switching element 120 is sometimes implemented by a transistor (e.g. as illustrated in FIGS. 1B and 1C). It is to be understood that the transistor serves as a non-limiting exemplary embodiment of a switching element. Other embodiments may be used. Additionally, the transistor serving as the switching element is shown and described as a FET. Other types of transistor may be used, including but not limited to: MOS transistors, FInFETs, single electron transistors, HEMT transistor, tunneling gate transistor and Schottky transistors.

In some embodiments a global clock signal is input to mode selector 130. A global clock signal may alternately or additionally be generated within mode selector 130. In some embodiments, additional data required for mode selector 130 to select between static and dynamic mode is input.

In the following, static gate 110 is sometimes described as a CMOS gate. It is to be understood that the CMOS gate serves as a non-limiting exemplary embodiment of a static gate. DML logic gates may be implemented with any static gate topology, including, but not limited to, PTL gates, GDI gates (see U.S. Pat. No. 7,345,511 by Morgenshtein et al.), and CPL gates.

FIG. 1A relates to any type of DML gate.

Reference is now made to FIGS. 1B and 1C, which are simplified circuit diagrams of dual-mode logic gates, according to embodiments of the present invention. FIG. 1B shows Type A DML logic gate 100A. FIG. 1C shows Type B DML logic gate 100B. The static gates (110A and 110B) for both types of DML gate (100A and 100B respectively) may have the same topology but may differ by transistor sizing, therefore they are marked differently.

In the following the static gate may be described in general terms (as shown in FIG. 1A), without explicitly stating a specific whether the DML gate has topology. For example, the term should be understood "DML logic gate 110" should be understood to include any DML gate topology, including, but not limited to, a Type-A topology (DML logic gate 110A as shown in FIG. 1B) and a Type-B topology (DML logic gate 110B as shown in FIG. 1C).

In addition to the unique capability to switch between different modes of operation, DML nodes which are operating in dynamic mode have a number of salient advantages over conventional dynamic nodes. These advantages stem from the DML topology. The DML inherently features an active keeper constructed of the CMOS complementary logic. The active keeper is derived from the structure of the node, in which the CMOS part is still fully functional, and assists in maintaining the output level. This feature is one key attribute to the immunity to process variations and temperature fluctuations, and solves some of Domino Logic's well known drawbacks (such as charge sharing, crosstalk noise and susceptibility to glitches, which intensify with process and voltage scaling).

When the DML gate is operated in the static (e.g. CMOS) mode, mode selector 130 applies a constant logical value to the M1 gate, thus turning off switching transistor M1 120. During static operation the gate input should be fixed to a constant high for Type A topology and constant low for Type B topology. As a result, switching transistor M1 120 has almost no affect on the topology. It attains a similar topology to the basis static gate 110, except for the excessive parasitic capacitance, which is negligible.

To operate DML gate 100 in the dynamic mode, the global clock is assigned an asymmetric clock, and M1 120 is turned on periodically thereby enabling a pre-charge phase as required in dynamic logic.

Similar to the conventional dynamic logic, in dynamic mode the signal applied by mode selector 130 to the M1 gate has two distinct phases: pre-charge and evaluation. During the pre-charge phase, the output is charged to high/low, dependent on the topology of the DML gate. In the consequent evaluation phase, the output is evaluated according to the values at the gate inputs Like the dynamic logic gates, the DML gates, which are operating in the dynamic mode, may be pre-charged to a logical '1' or a logical '0', according to the topology of the DML gate. The proposed DML topologies marked "Type A" and "Type B" are illustrated in FIGS. 1B and 1C. In the Type A gate, switching transistor M1 120 is a pMOS transistor that pre-charges the output to a logical '1' during the pre-charge phase. In the Type B gate, M1 120 is an nMOS that pre-charges the output to a logical '0', thus it discharges the capacitated charge.

In some embodiments mode selector 130 has one or more data inputs for inputting data used to determine whether static or dynamic mode is selected. In a first embodiment, the operation mode is decided externally to mode selector 130, in which case mode selector 130 acts essentially as a switch. In alternate embodiments, mode selector 130 determines which mode should be used based on the selection data received via the data inputs.

Mode selector 130 may have an additional input for inputting the global clock signal which is applied to M1 120. In an alternate embodiment the clock signal is generated internally by mode selector 130.

Dynamic logic gates are often implemented using a footer, which requires an additional transistor. The footer is used to decrease pre-charge time by eliminating the ripple effect of the data advancing through the cascaded nodes and allowing faster pre-charge.

Figure 2A:
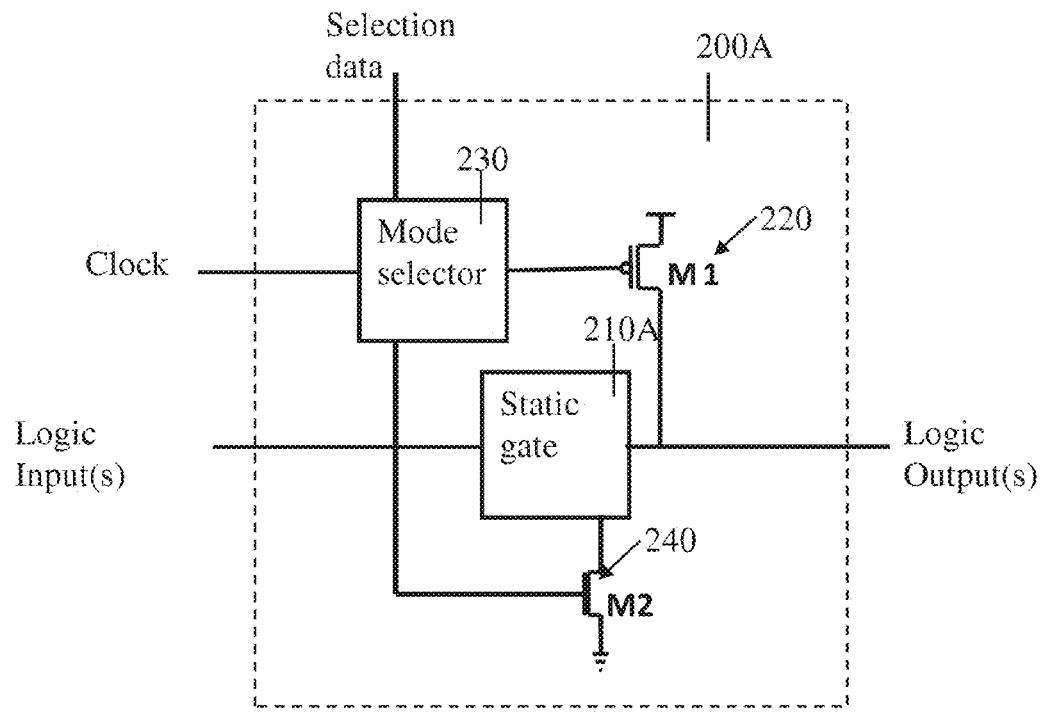
FIGS. 2A and 2B are simplified circuit diagrams of a dual-mode logic element with footer, according to a first and a second embodiment of the present invention.
Figure 2B:
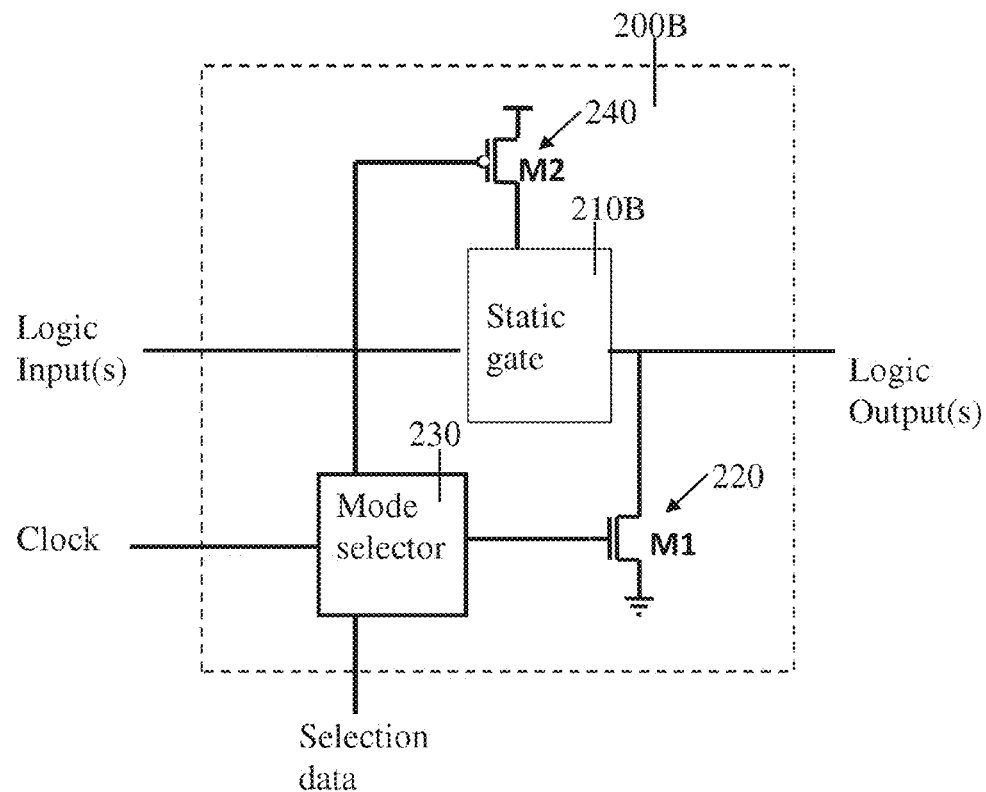

Reference is now made to FIGS. 2A and 2B, which are simplified circuit diagrams of a dual-mode logic element with footer, according to a first and a second embodiment of the present invention. FIG. 2A shows an example of a Type A DML gate with an nMOS footer transistor M2 240. FIG. 2B shows an example of a Type B DML gate with a pMOS footer transistor M2 240.

To operate the DML gate with footer in static mode (CMOS-like), the global Clk is fixed low, enabling a free path to the ground by turning on M2 and disabling the pre-charge by turning off M1.

Figure 3A:
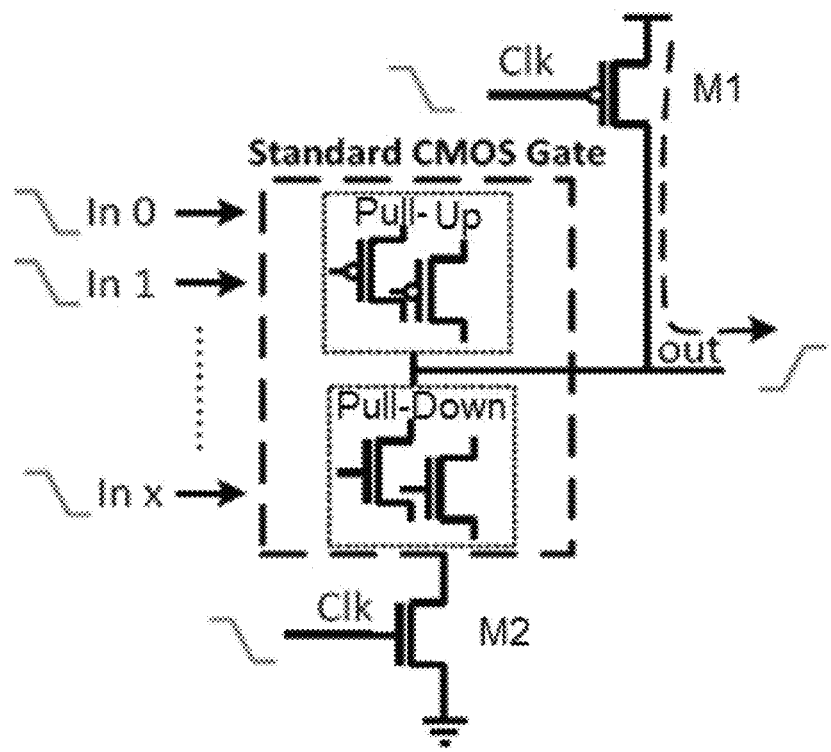
FIGS. 3A and 3B show the clock signals applied to the M1 and M2 gates of an exemplary Type-A DML logic gate with footer, during the pre-charge and evaluation phases respectively.
Figure 3B:
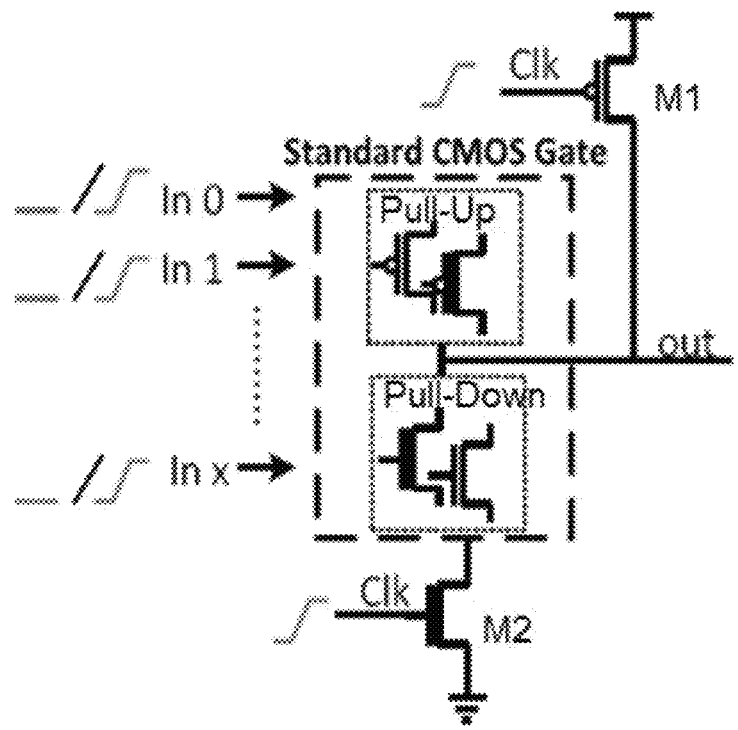

Reference is now made to FIGS. 3A and 3B, which illustrate the clock signals applied to the M1 and M2 gates of an exemplary Type-A DML logic gate with footer, during the pre-charge and evaluation phases respectively.

FIG. 3A illustrates the pre-charge phase of a Type-A DML gate with footer in dynamic mode. Mode selector 230 inputs a global Clk signal which goes low, turning on the pre-charge switching transistor M1, and charging the output high. At the same time the footer M2 is closed, disabling a path to the ground. To allow faster pre-charge, the inputs should be held low, even though this is not mandatory when using a footer.

FIG. 3B illustrates the evaluation phase. Mode selector 230 inputs a high Clk signal, turning off the upper pMOS transistor and opening a path to the ground through the footer. During the evaluation phase, the logic output is evaluated based on the input logic signal(s).

Dynamic mode operation for a Type-B DML gate with footer is performed in a similar manner.

Figure 4:
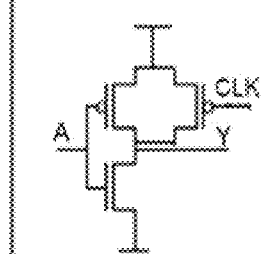
FIG. 4 shows simplified circuit diagrams of exemplary DML logic gates.

Reference is now made to FIG. 4, which shows simplified circuit diagrams of exemplary DML logic gates. NOT, NOR and NAND type gates. Each type of gate is presented in three configurations: unfooted A-type, unfooted B-type and footed A-type. It is understood that a footed B-type configuration of each type of DML gate may be readily obtained.

1.1. Placement of the Switching Transistor

In many static gate technologies which are inserted into a dynamic environment (such as CMOS) the static gate includes two portions. In the portion serving for evaluation, the majority of the transistors are placed in parallel to obtain low resistivity and high performance. The second portion includes the remaining transistors (i.e. not included in the evaluation portion), which typically have a majority of stacked transistors. In some embodiments, switching element 120 is placed in parallel with the second portion, which serves for precharge. The transistors in the second portion typically include a majority of stacked transistors. In some embodiments having a type-A DML gate topology, the second portion serves as a pull-up network. In other embodiments for a B-type DML gate topology, the second portion serves as a pull-down network. Thus the evaluation is performed with the parallel transistors and therefore it is faster. The second portion (typically having a majority of stacked transistors) may be sized to minimal widths to reduce intrinsic capacitances, thus increasing dynamic operation performance (i.e. speed) over reduced static operation performance. This sizing strategy also results in reduced energy dissipation, as compared to conventional static CMOS gates. Switching transistor M1 may also be minimum-sized to decrease leakage currents during static operation and evaluation.

II. Dual-Mode Logic Circuit

Figure 5A:
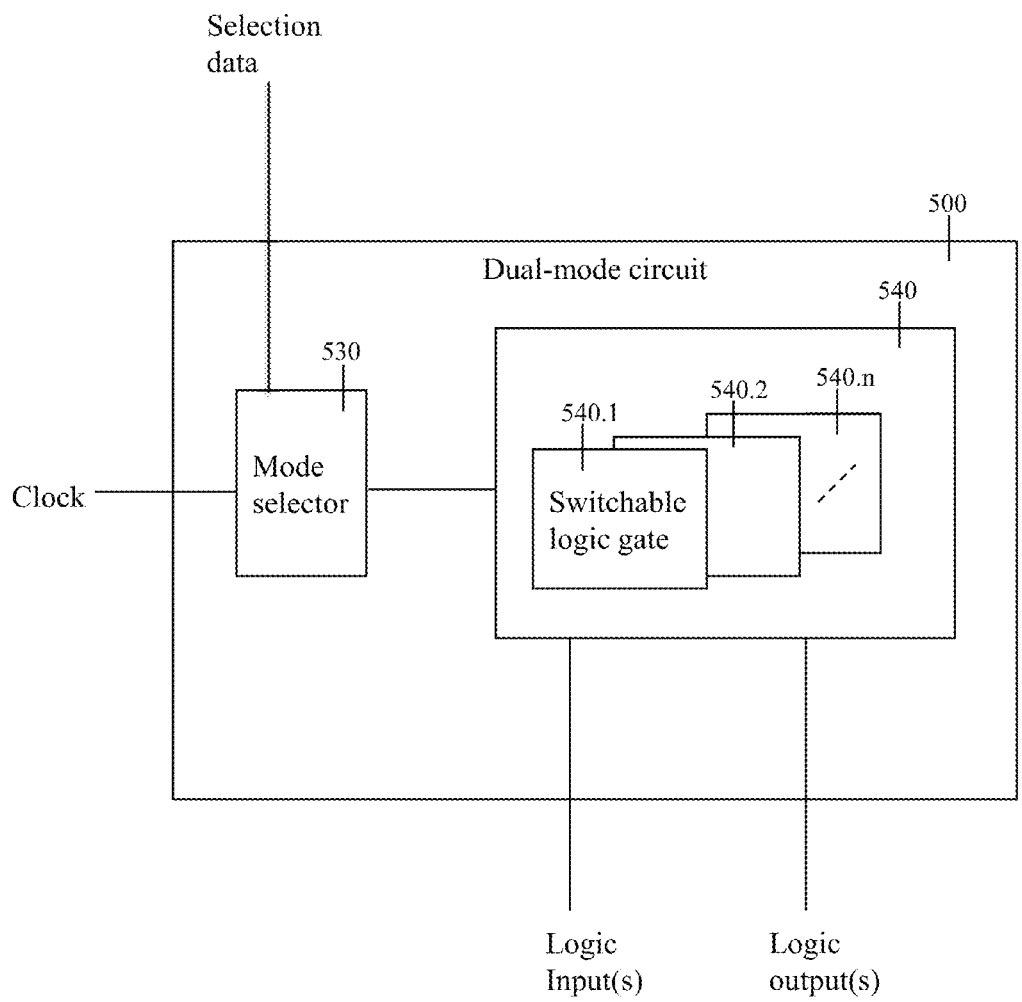
FIG. 5A is a simplified block diagram of a dual mode logic circuit, in accordance with embodiments of the present invention.

Reference is now made to FIG. 5A, which is a simplified block diagram of a dual mode logic circuit, in accordance with embodiments of the present invention. The DML circuit is a logic circuit which implements a required logic function, and which may be operated in both static and dynamic mode.

Figure 5B:
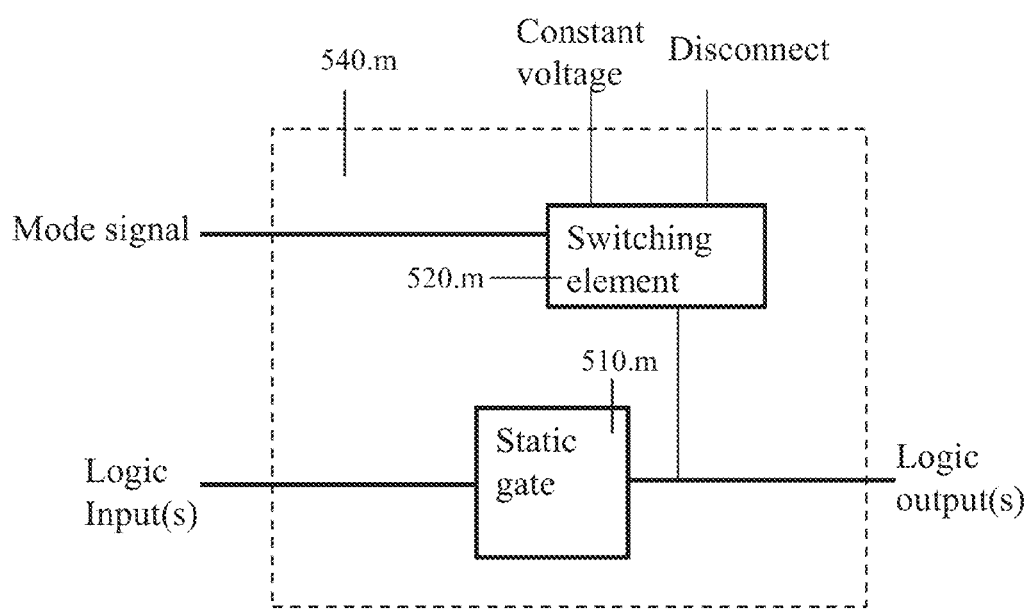
FIG. 5B is a simplified block diagram of a dual mode logic block, in accordance with embodiments of the present invention.

In the following the term "DML block" refers to a static logic gate connected to a respective switching transistor, as shown in FIG. 5B. Each DML block may therefore operate in both static and dynamic modes. The DML block may be Type-A or Type-B as described above.

DML circuit 500 utilizes the basic DML logic gate architecture to form a complete logic circuit. DML circuit 500 includes multiple DML blocks 540.1 to 540.n all controlled by a single mode selector 530. DML blocks 540.1 to 540.n are interconnected so as to perform the required logic function.

Mode selector 530 is connected to each of the DML logic blocks, and selects static or dynamic operation for each block by outputting a respective mode selection signal to each of the DML blocks. In order to select static operation for a given logic block 540.1 mode selector 530 applies a turn-off signal to the respective switching transistor gate connection so as to turn off the switching transistor, and to select dynamic mode for logic block 540.1 mode selector 530 applies a dynamic mode clock signal to the respective switching transistor gate. The specific voltage levels used for the turn off and dynamic clock signals will depend on the type of logic block (i.e. Type A or Type B). Therefore for a logic circuit which includes logic blocks of both types, mode selector 530 will apply the appropriate voltage to each logic block. In some embodiments, the mode selection signals are applied to each transistor individually. In other embodiments, the same signal may be applied in parallel to some or all of the logic blocks, depending on the circuit configuration.

II.1 Cascading A-Type and B-Type DML Gates

Figure 6:
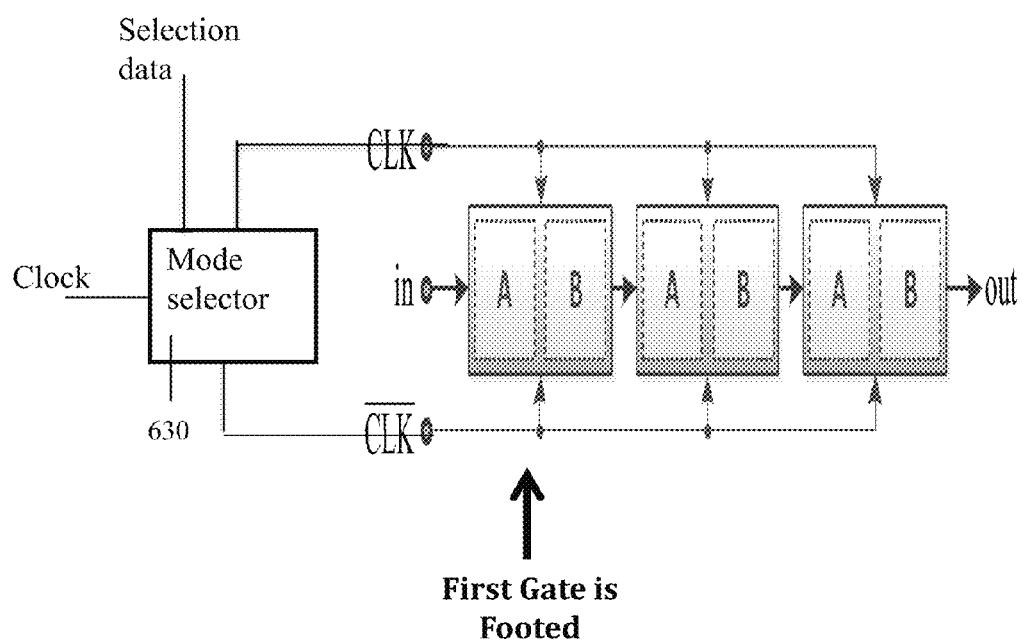
FIG. 6 is a simplified block diagram of an exemplary DML circuit with A-B cascade topology.

In some embodiments, Type A and Type B gates are cascade connected, similarly to the manner used with np-CMOS gates. Mode selector 130 applies the clock signals required by both Type A and Type B gates. An additional footer/header transistor 240 (connected in series to an evaluation path) is optional in order to ensure correct interface with other logic circuitry. An example of the A-B cascade topology is illustrated in FIG. 6 (where a type-A DML gate is the initial gate at the beginning of the logic chain). B-A cascading (where a type-B DML gate is the initial gate at the beginning of the logic chain) may also be used, but may cause reduced performance.

Even though the A-B cascade approach may allow maximum performance, minimized area and maximized power efficiency, it is also possible to connect gates of the same type by using an inverter buffering between them, in a similar way to how it is done in Domino logic. Connecting gates of the same type without inverters is also possible when a footer/header is used at each stage; however, this structure may cause glitching after pre-charge ends and until the evaluation data ripples through the chain. These are standard problems when designing with dynamic gates, however in contrast to the standard dynamic logic, DML's inherent keeper helps to recover the logical value.

III. DML Circuits with Multiple Critical Paths

DML allows dynamic switching between static and dynamic modes of operation. In circuits having multiple critical paths, DML design provides the powerful ability to operate each of the critical paths in the desired mode for current operating conditions, in order to minimize circuit delay without causing unnecessary power consumption. Selected critical paths are operated in the dynamic mode to improve the circuit delay. The rest of the circuit operates in the DML static mode, improving power consumption. Changing operating conditions may affect which of the critical paths it is desirable to operate in dynamic mode in order to reduce circuit delay.

To achieve this operation, all critical paths are implemented using Dual Mode Logic (DML), with each critical path being independently selectable for static or dynamic operation. Mode selector 530 determines the desired mode for each of the critical paths in accordance with current circuit operating conditions, and applies the required mode selection signals.

Figure 7:
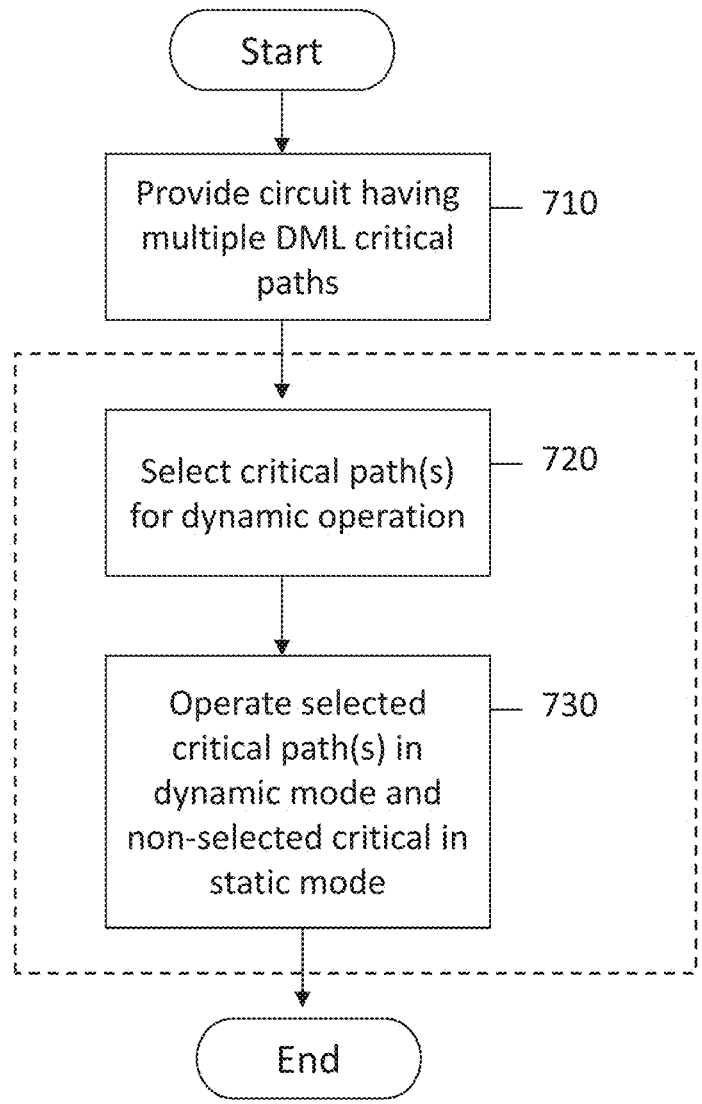
FIG. 7 is a simplified flowchart of a method of delay control for a DML circuit, according to an embodiment of the present invention.

Reference is now made to FIG. 7, which is a simplified flowchart of a method of delay control for a DML circuit, according to embodiments of the present invention.

In 710 a dual-mode logic circuit with two or more critical paths is provided. Each of the critical paths is independently selectable for static or dynamic operation;

In 720 at least one of the critical paths is selected for dynamic operation. In 730 the DML circuit is operated with the selected critical paths in dynamic mode and the unselected critical paths in static mode.

Critical path selection 720 may be repeated periodically, in order to update the selection of dynamic and static operating modes for each of the critical paths according to changes in circuit operation.

An exemplary embodiment of a DML Carry Look Ahead adder (CLA) is presented below (see FIG. 24).

IV. Logical Effort Sizing

A DML circuit includes multiple transistors. During the circuit design process, a sizing factor must be selected for each of the transistors. The selected sizing factors have a significant effect on circuit performance, even when the gate topology remains the same. Therefore a variety of methods have been developed in order to determine the optimal respective sizing factors. Transistor sizing optimization is performed to achieve the desired tradeoff between power consumption and circuit delay. In some embodiment, the respective sizing factors for the transistors in the DML circuit are by logical effort (LE) optimization.

LE is a simplified method of transistor sizing optimization to achieve an improved speed of a combinational logic network, to determine optimum number of stages to implement the network and for error estimation. In LE, an approximation of the gate delay is done as a function of transistor sizes (for example see Eqn. 18 below). The individual gates delays are summed to obtain the entire path delay (for example see Eqns. 22, 20 and 27). After the path delay is computed, all sizing parameters of the chain are selected in order to equalize the effort of each stage (for example see Eqn. 28). In other words, each stage has approximately the same delay as all other stages, and the sizing parameters also conform to the specific gate topology. An optimal number of stages needed to minimize the delay. The delay may be described as a parameter of the chain length. The chain length may be derived to find the optimum point (see Eqns. 24 and 25) (as a function of known parameters). In DML, relative to CMOS, transistor sizing optimization process may require more approximations in order to reduce its complexity. Different levels of approximation may be used, as described in more detail below.

Figure 8:
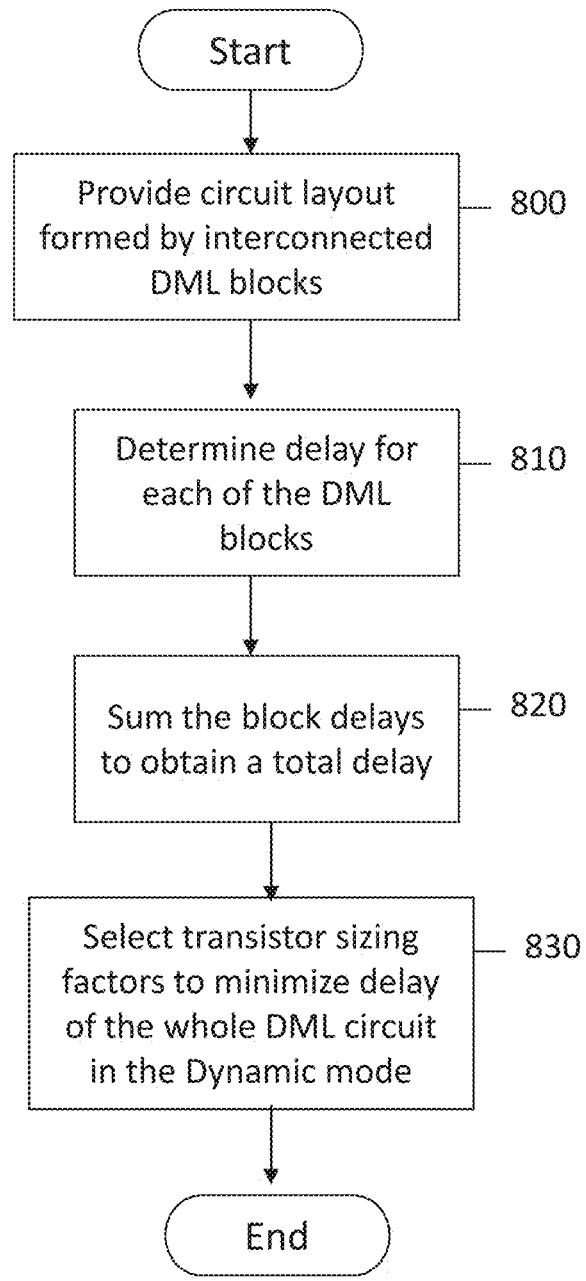
FIG. 8 is a is a simplified flowchart of a method for transistor sizing for a dual-mode logic circuit, according to embodiments of the present invention.

Reference is now made to FIG. 8, which is a simplified flowchart of a method for transistor sizing for a dual-mode logic circuit, according to embodiments of the present invention.

In 800, the layout of a DML circuit is provided. As described above, a DML logic circuit is formed by interconnecting multiple DML blocks, and controlling the operating mode (static or dynamic) of each of the blocks with a mode selector. The interconnected DML blocks may be considered to form a chain of logic stages forming a logic path.

In 810, the delay of each of said DML blocks is determined as a function of the respective sizing factors of the transistors forming the given DML block.

In 820, the delays of all of the DML blocks in the circuit are summed. The summed delay is thus a function of the sizing factors of the transistors in all of the DML blocks.

In 830, the sizing factors are selected in accordance with logical effort principles in order to obtain equal effort from each of the DML blocks. The sizing factors take into account the topology of the respective DML blocks.

Optionally, the optimal number of stages in the logic path is determined. Buffer stages may be added to the logic path in order to obtain said optimal number of stages.

The implementation of LE optimization on DML circuit design is now described in more detail.

An example of LE optimization for sub-threshold operation is presented in section VIII.

IV.1. Logical Effort Overview

When performing LE optimization the gate delay of stage i ($D_i$) in a chain of logic gates is expressed as a sum of the stage effort (f) and the parasitic capacitance ($p_i$):

$$D_i = f_i + p_i$$

where $f_i = g_i \cdot h_i \cdot b_i$, $g_i$ is the logical effort of the stage; and $h_i$ is the electrical effort of the stage:

$$h_i \triangleq \frac{C_{out\_i}}{C_{in\_i}} \qquad (2)$$

and b is the branching effort of the stage:

$$b_i = \frac{C_{on\_path\_i} + C_{off\_path\_i}}{C_{on\_path\_i}} \qquad (3)$$

The logical effort of stage i is marked by $LE_i$ and the electrical effort will be marked by $f_i$. The logical effort approach is based on normalization of all the parameters to a simple inverter and therefore $p_i$ and $LE_i$ are given by:

$$p_i \triangleq \frac{R_{gate\_i}}{R_{inv}} \cdot \frac{C_{D,gate\_i}}{C_{D,inv}} \qquad (4a)$$

$$LE_i = g_i \triangleq \frac{R_{gate\_i} C_{G,gate\_i}}{R_{inv} C_{G,inv}} \qquad (4b)$$

Using this terminology, the delay of a gate in stage i may be expressed as:

$$D_i = t_{pd\_t} = t_{P0}\left( P_i^* \gamma + \overbrace{LE_i * b_i * \frac{C_{on\_path\_i}}{\frac{C_{in\_gate\_i}}{b_i}}}^{EF_i} \right) = t_{P0}(P_i * \gamma + EF_i) \qquad (5)$$

where:

$$EF_i = LE_i * f_i \qquad (6)$$

$$t_{p.inv} = 0.69 R_{inv} C_{d\_inv} \qquad (7)$$

$$t_{P0} = \frac{0.69 R_{inv} C_{d\_inv}}{\gamma} \qquad (8)$$

$\gamma$ is a process parameter, deduced from:

$$\frac{C_{d\_inv}}{\gamma} = C_{g\_inv} \qquad (9)$$

In conventional CMOS logic the sizing ratio between PMOS pull up network (PUN) and NMOS pull down network (PUN) is marked as $\beta$. This ratio is set according to mobility ratio of holes and electrons and usually aims to equate the High-to-Low and Low-to-High transitions of CMOS gates:

$$\beta_{opt} = \sqrt{\frac{R_{eqp}}{R_{eqn}}\left(1 + \frac{C_{vivo}}{C_{dm1} + C_{gm2}}\right)} \bigg|_{C_{dm1}+C_{gm2}+C_{vivo}} \approx \sqrt{\frac{R_{eqp}}{R_{eqn}}} = \sqrt{\frac{\mu_o}{\mu_p}} \qquad (10)$$

with $$R_{inv} \simeq \frac{\left(R_{eqn} + \frac{R_{eqp}}{\beta}\right)}{2}; R_{eqn} \simeq \frac{\mu_o}{\mu_p} R_{eqn} \qquad (11)$$

Conventional LE provides the well explored solution for the up-sizing of a given chain of CMOS gates. The up-sizing factor and amount of gates needed in the chain are constrained by the driving output load, logical functions, area, delay and power consumption requirements. The optimum number of stages and the up-sizing factor may be easily derived from estimating the chain delay:

$$D = t_{pd} = \sum_1^N D_i = t_{P0} \sum_1^N (p_i * \gamma + EF_i)$$

The optimal chain sizing considers upsizing each stage by an optimal Electrical Effort ($EF_{opt}$), which is given by:

$$EF_{opt} = \sqrt[N]{PE} = \sqrt[N]{F * \prod LE_i * \prod b_i} \qquad (12)$$

where PE is the path effort and F is the ratio between the load capacitance and input capacitance of the first gate in the chain. It is important to note that sizing would not change the value of $$\gamma \sum_1^N (P_i)$$

which is totally dependent on the logical gates of the optimized path.

For a given chain, containing of an N CMOS gates, N is not necessarily equal to the optimal number of stages, Nopt. If N<Nopt, a number of inverters may be added to the path to better fit the stage effort of all the gates in the path and therefore to improve the delay of the path. Adding more inverters does not change the path effort ($LE_{inv}=1$, $b_{inv}=1$) and therefore only the parasitic term is affected. It was shown that for N<Nopt $EF_{opt}$ is given by:

$$EFopt = 3.6 \text{ (for } \gamma=1) \qquad (14)$$

For this case, $N_{opt}$ is given by:

$$\sqrt[N_{opt}]{PE} = EF_{opt}.$$

For N>Nopt, $EF_{opt}$ may be approximated as:

$$\sqrt[N]{PE} = EF_{opt} \tag{15}$$

Note that the optimal solution for $EF_{opt}$ is only dependent on $\gamma$, $p_{inv}$ and it may not be achieved in any actual path where N and PE are constrained. Another important issue, which will be referred in the next section in regards to LE of the DML gates, is that designing by over-estimation of $N_{opt}$ (with $N > N_{opt}$) may result in a relative minor deviation in delay from the optimum point. However, under-estimation may result in a more drastic deviation in delay. Therefore, may be preferable to over-estimate N.

V. Logical Effort for CMOS-Based DML

The logical effort formulation of DML is quite different from the conventional CMOS LE, which was discussed in the previous section. Achieving the optimal non-approximate solution is quite complex. Embodiments are presented below which enable DML LE transistor sizing by semi-approximated and fully-approximated methodologies while still achieving high precision. The embodiments below refer explicitly to CMOS-based DML gates. It is to be understood that the described embodiments may relate to other types of DML-gates, possibly with changes to reflect differences in gate topology.

V.1. Basic Assumptions

DML Gates are designed to optimize their delay in the dynamic mode. Therefore only one transition among Tplh and Tphl, which is a part of the evaluation phase, should be included in the delay evaluation. This means that only an equivalent resistance of the Pull-down network (NMOS transistors) will play the role in delay optimization of "Type A" gates and the Pull-up network (PMOS transistors) will be relevant in optimization of "Type B" gates.

Figure 9A:
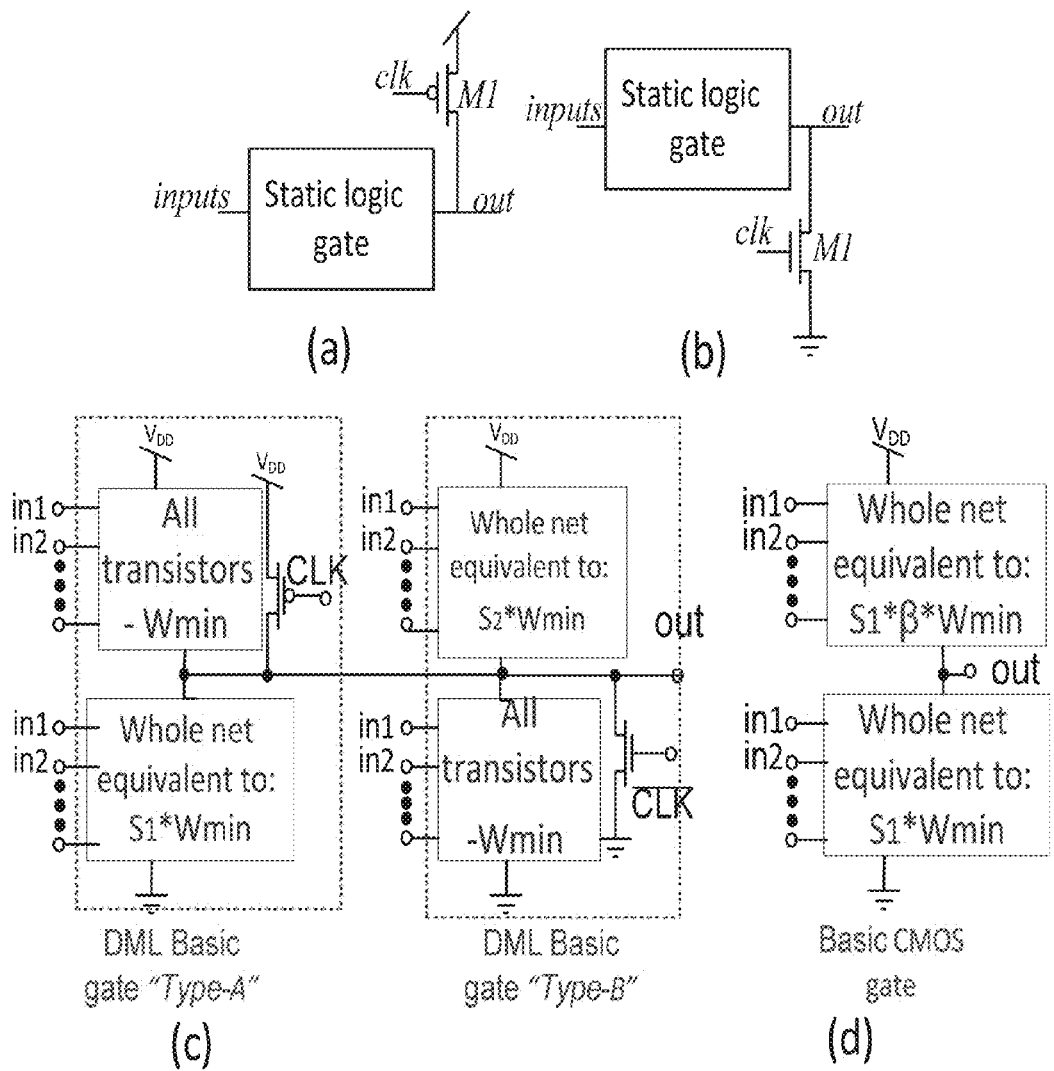
FIG. 9A illustrates that only one sizing factor, Si, for each i stage gate impacts the evaluation net and the pre-charge transistor.

While designing conventional CMOS gates the Pull-up network is typically upsized with $\beta$, independently of the sizing factor EFopt, which is the sizing contribution of the load driving effort. This $\beta$ is the outcome of the optimal delay of an unloaded gate. In DML, each stand-alone gate would not be inherently sized with $\beta$ since the delay in the dynamic mode is determined by a single transition through PDN or PUN and therefore there is no need in symmetric transitions (Low to High transition time equals High to Low one). Only one sizing factor, Si, for each i stage gate impacts the evaluation net and the pre-charge transistor (as shown in FIG. 9A). In CMOS LE method the normalization is performed to a standard CMOS inverter. DML gates are normalized to a standard minimal inverter (DML_INV) in "Type A", which represents the minimal stand-alone gate delay unit. A minimal inverter of "Type B" presents an increased delay since it evaluates the data through network of PMOS transistors. It is assumed for the present analysis that each DML chain would start with "Type A" gates following by "Type B" gates (in a NORA\ np-CMOS fashion).

As was previously mentioned in the previous section, $\gamma$ is the fabrication technology-dependent factor that describes the relation between transistor gate capacitance to transistor drain capacitance. Typically, in most nanoscale processes $\gamma$ is close to 1. For CMOS inverters it also describes the gate to drain capacitance of a single MOS transistor.

$$\frac{C_{d\_MOS}}{\gamma} = C_{g\_MOS} \tag{16}$$

But, for an all minimal width transistor DML_INV "Type A" or "Type B":

$$\frac{C_{d\_inv\_DML}}{C_{g\_inv\_DML}} = \frac{3C_{d\_MOS}}{2C_{g\_MOS}} \text{ yields: } \gamma' = 3\gamma/2 \tag{17}$$

The delay of a general gate i in the chain is given by:

$$t_{pd\_i} = \underbrace{\frac{\ln(2) \cdot R_{min\_A} C_{D,min}}{\gamma'}}_{t_{p0\_DML}} \left( \underbrace{\frac{R_{gate}}{R_{inv}} \cdot \frac{C_{D,gate}}{C_{D,inv}} \gamma'}_{P\_DML} + \underbrace{\frac{R_{gate}}{R_{inv}} \cdot \frac{C_{G,gate}}{C_{G,inv}}}_{LE\_DML} \underbrace{\frac{C_{Load}}{C_{G,gate}}}_{f\_DML} \right) \tag{18}$$

V.2. Generalized DML-LE Method for Complex Gates and Branches

This section includes a generalization of the DML-LE methods for complex topologies of gates and intersecting nets.

In Eqn. (18) we see the general delay structure of a DML gate. This structure may be generalized taking into account branching effort and the mobility ratio factor which discriminates from "Type A" gate to "Type B" gate. The generalized structure is given in the equation below:

$$D = t_{p0\_DML} \left( \underbrace{\frac{(N_{S\_drain}s_i + N_{min\_drain})}{2s_i}}_{P\_DML\ un-neglected} \gamma + \underbrace{\underbrace{\frac{(N_{S\_gate}s_i + 1)}{2 \cdot s_i}}_{LE\_DML\ un-neglected} \underbrace{b_i}_{b\_DML\ un-neglected} \underbrace{\frac{C_{Load\_on}}{(N_{S\_gain}s_i + 1)}}_{f\_DML\ un-neglected}}_{EF\_un-neglected} \right) \begin{bmatrix} *1 & \text{if } A \\ *\mu_{n/p} & \text{if } B \end{bmatrix}$$

where: Nmin_drain is the sum of all the minimal width transistors connected directly to the gates output (which are the complementary network transistors directly connected to the output), Ns_drain is the sum of all the transistors connected directly to the gate's output multiplied by Si (pre-charge and evaluation transistors directly connected to the output). Ns_gate is the multiple of the gate input transistor sizing factor (Si) of the evaluation network.

The following two expressions are taken into consideration for determining LE and P:

$$2s_i \nearrow 1 \rightarrow 2s_i, s_{i+1} \nearrow 1 \rightarrow s_{i+1}.$$

where $S_i$ is the i'th stage sizing factor (i>2). For example, P and LE for several complex gates are:

$$\underbrace{4s_i \cancel{1} \to 4s_i}_{NAND3\_B,\ NOR3\_A},\ \underbrace{4s_i \cancel{2} \to 4s_i}_{OAI21\_B,\ AOI21\_A},\ \underbrace{4s_i \cancel{3} \to 4s_i}_{NOR3\_B,\ NAND3\_A},$$

$$\underbrace{5s_i \cancel{2} \to 5s_i}_{OAI21\_A,\ AOI21\_B},\ \underbrace{3s_i \cancel{1} \to 3s_i}_{NAND2\_B,\ NOR2\_A},\ \underbrace{3s_i \cancel{2} \to 3s_i}_{NAND2\_A,\ NOR2\_B}$$

In the vast majority of cases Si is larger than the minimum sizing (1). This leads to an improved approximation error when implementing complex gates. DML designers may choose to design with a minimum number of gates such as: NAND3_A, NOR3_B, NAND2_A, NOR2_B, due to their relative high delay penalty. Notably, DML efficient gate topologies are gates in which the evaluation net is parallel, transistor-wise, and the transistors in it have a minimal width times sizing factor. This is why NAND2_A, NOR2_B may be more efficient delay-wise than NAND3_A, NOR3_B.

FIG. 9B illustrates the delay structure of the neglected and un-neglected stages, and also considers an approximated version of the branching effort.

The i'th gate output stage, gate (i+1), reflects its input-capacitance as the i'th stage load. FIG. 9C shows the proportionality of the load capacitance to the (i+1)'th gate capacitance and therefore $S_{i+1}$ factor. In general, $C_{Load}$ is defined from the consequent gate topology and it is regarded as proportional to the values in FIG. 9C. From the values in FIG. 9C we understand, that for gates which possess more complexity than inverters (larger Ns), the approximation is legitimate.

Generally, applying the approximation leads to:

$$C_{Load} = (N_{S\_LOAD} \cdot S_{i+1} \cancel{1}) \cdot W \cdot L \cdot C_{oxide} \propto (N_{S\_LOAD} \cdot S_{i+1}).$$

In CMOS the branching effort is independent of the sizing factors (i.e. if all gates, in the same stage i, are sized by the same $S_i$). In DML, the branching effort as depends on the sizing factors Si. In order to optimize the delay, differentiation by the sizing factors is quite complex. In order to apply a Semi-approximate solution to achieve the sizing factors for complex gates we have derived the approximated branching effort which is independent in Si (of stages: i>2) which is given in Eqn. 38 and may be seen in FIG. 9B.

$$b_{i_{neglected}} = \frac{\sum_{(On+Off)Path\_i}(N_{S\_gate})}{N_{S\_gate\_on\_path\_i}} \quad (38)$$

Optimizing the Delay Under the Completely-Approximated Model for Complex Gates

Optimizing the delay under the complete approximated model implies the use of the neglected LE, P for all the design along with the approximated branching that may be seen in FIG. 9B. P, LE and f are noted with "_simplified" to emphasize that they are approximated. Differentiating by the sizing factors and equating to 0 yields the next set of equations:

$$\text{marking: }(i) = \frac{LE_{DML\_i} b_{DML\_i}}{N_{s\_gate\_i}};\ N_{s\_gate\_i} = N_i$$

For all odd i:

$$\frac{S_i}{S_{i-1}} = \frac{S_{i+1}}{S_i} \frac{(i)N_{i+1}}{\mu_{n/p}(i-1)N_i} \quad (39)$$

For all even i, the results is:

$$\frac{S_i}{S_{i-1}} = \frac{S_{i+1}}{S_i} \mu_{n/p} \frac{(i)N_{i+1}}{(i-1)N_i} \quad (40)$$

The outcome sizing factors sequence is shown as:

| $S_1$ | $S_2$ | $S_3$ | $S_4$ | ... | $S_{N-1}$ |
|---|---|---|---|---|---|
| 1 | $EF\frac{\sqrt{\mu_{n/p}}}{(1)N_2}$ | $EF^2\frac{1}{(1)(2)N_2 N_3}$ | $EF^3\frac{\sqrt{\mu_{n/p}}}{(1)(2)(3)N_2 N_3 N_4}$ | ... | $EF^N\frac{1}{(1)(2)(3)...(N)N_2 N_3...N_{N+1}}$ |
| 1 | $EF\frac{\sqrt{\mu_{n/p}}}{(1)N_2}$ | $EF\frac{1}{(2)N_3\sqrt{\mu_{n/p}}}$ | $EF\frac{\sqrt{\mu_{n/p}}}{(3)N_4}$ | ... | $EF\frac{1}{(N)N_{N+3}\sqrt{\mu_{n/p}}}$ |

And the required sizing factor may be extracted from:

$$EF_{DML} = \sqrt[N]{\frac{S_{N+1} N_{N+1}}{S_1 N_1} \prod_{i=1}^{N} LE_{DML\_i} \prod_{i=1}^{N} b_{DML\_i}} \quad (41)$$

Where, the simplified branching and logical effort values, $$F_{DML} = \frac{S_{N+1} N_{N+1}}{S_1 N_1},$$

are used.

For a general case the sizing factors may be computed backwards from N+1 (load) to 1 using the relationship:

$$\text{even } i:\ S_{i+1} N_{i+1} = \frac{EF_i}{LE_i \cdot b_i \cdot \sqrt{\mu_{n/p}}} S_i N_i$$

$$\text{odd } i:\ S_{i+1} N_{i+1} = \frac{EF_i \cdot \sqrt{\mu_{n/p}}}{LE_i \cdot b_i} S_i N_i$$

The optimal number of stages for a given load may be computed as:

$$N_{opt} \cong \log_{f_{DML\_opt}}(F_{DML})$$

to yield:

$$\frac{\gamma(\mu_{n/p}^{-0.5} + \mu_{n/p}^{0.5})}{c_1} + \sqrt[N]{PE_{DML}} - \frac{\sqrt[N]{PE_{DML}} * \ln(PE_{DML})}{N} = 0$$

Where the optimal sizing factor may be numerically solved from:

$$EF_{DML\_OPT} = e^{\left(1 + \frac{c_1}{EF_{DML\_OPT}}\right)}$$

This leads to $EF_{DML\_opt} = 4.65$ (similarly to inverters in section VI), for large $F_{DML}$. In consequence, $N_{opt}$ may be larger than $N_{minimum}$. $N_{opt}$ may be approximated by:

$$N_{opt} \cong \log_{EF_{opt\_DML}}(PE) = \log_{EF_{opt\_DML}}(F * LE * B) \quad (43)$$

V.3. Optimizing the Delay Under the Semi-Approximated Model for Complex Gates Under the semi-approximated model P, LE and b are noted with "_simplified" and they are independent in Si only from the third stage. The total delay is shown in Eqn. 44 below. The computations of the optimal sizing factors with this method are derived from the differentiation of Eqn. 44 and equating to zero.

marking: lj—input j of an l'th stage gate.

$$(i) = \frac{LE_{DML\_i} b_{DML\_i}}{N_{s\_gate\_i}}, \text{ and: } N_{s\_gate\_i} = N_i$$

$$D = \sum_N D_i = \quad (44)$$

$$t_{DML}^{p0} \left\{ \begin{array}{l} \left( P_{DML\ un-neglected} \gamma + LE_{DML\ un-neglected} b_{DML\ un-neglected} \frac{N_{s\_gate\_i+1} s_{i+1} + 1}{(N_{s\_gate} s_i + 1)} \right) + \\ \sum_{\substack{odd\_i>1 \\ Type\_A}} \left( P_{DML\_i\ Simplified} \gamma + LE_{DML\_i\ Simplified} b_{DML\_i\ Simplified} \frac{N_{S\_Load\_on} \cdot s_{i+1}}{N_{S\_gate\_i} \cdot s_i} \right) + \\ \mu_{n/p} \left( P_{DML\ un-neglected} \gamma + LE_{DML\ un-neglected} b_{DML\ un-neglected} \frac{N_{s\_gate\_i+1} s_{i+1} + 1}{(N_{s\_gate} s_i + 1)} \right) + \\ \mu_{n/p} \sum_{\substack{even\_i>2 \\ Type\_B}} \left( P_{DML\_i\ Simplified} \gamma + LE_{DML\_i\ Simplified} b_{DML\_i\ Simplified} \frac{N_{S\_Load\_on} \cdot s_{i+1}}{N_{S\_gate} \cdot s_i} \right) \end{array} \right\}$$

Yielding a set of N equations:

$$\frac{dt_{pd}}{dS_2} = 0 \rightarrow \frac{S_2}{S_1} = \frac{\left(S_3 \sum_{3j} N_{s\_gate\_3j} + \sum_{3j} 1 + N_{min\_drain\_2} \cdot \gamma\right)}{S_2 \sum_{2j} N_{s\_gate\_2j}} \mu_{n/p}$$

$$\forall \left(\text{odd } i>1\right): \frac{S_i}{S_{i-1}} = \frac{S_{i+1}}{S_i} \frac{(i)N_{i+1}}{\mu_{n/p}(i-1)N_i}$$

$$\forall \left(\text{even } i>2\right): \frac{S_i}{S_{i-1}} = \frac{S_{i+1}}{S_i} \mu_{n/p} \frac{(i)N_{i+1}}{(i-1)N_i}$$

The sizing factors series again is:

$$S_1 \quad \frac{S_2(A')}{\sqrt{\mu_{n/p}}} = S_2' \quad S_3 \quad S_4 \quad S_5 \ldots S_N \quad S_{N+1}$$

$$1 \xrightarrow{\frac{S_2(A')}{\sqrt{\mu_{n/p}}}} \frac{S_2(A')}{\frac{A'}{(2)N_3\sqrt{\mu_{n/p}}}} \xrightarrow{\frac{A'}{(2)N_3}} \frac{S_2(A')A'}{\frac{A'}{(3)N_4}\mu_{n/p}} \xrightarrow{\frac{S_2(A')A'^2}{(2)(3)N_3N_4}\mu_{n/p}} \xrightarrow{\frac{A'}{(4)N_5}\sqrt{\mu_{n/p}}} \cdots \xrightarrow{\frac{A'}{(N)N_{N+1}}\sqrt{\mu_{n/p}}}$$

Where $S_2$ is given by:

$$S_2 = \frac{C_1 A' + \sqrt{C_1^2 A'^2 + 4C_2}}{2} \qquad (45)$$

and A' is solved by:

$$A' = \sqrt[N]{PE_{DML} \frac{2}{(1)N_2(C_1 + \sqrt{C_1^2 + 4C_2/A'^2})}} \qquad (46)$$

where, $$PE_{DML} = F_{DML} \cdot \prod LE_{DML\_i} \cdot \prod b_{DML\_i}.$$

The constants $C_i$ are given Eqns. 47 and 48:

$$\underbrace{\frac{1}{LE_{DML\_2} b_{DML\_2} N_{s\_gate\_3\_on}} \cdot \mu_{n/p} \frac{\sum_{3j} N_{s\_gate\_3j}}{\sum_{2j} N_{s\_gate\_2j}}}_{C_1} \qquad (47)$$

and:

$$\underbrace{\frac{\sum_{3j} 1 + N_{min\_drain\_2} \cdot \gamma \cdot \mu_{n/p}}{\sum_{2j} N_{s\_gate\_2j}}}_{C_2} \qquad (48)$$

For the constants C1 and C2 we use the approximated values of LE and b. It is concluded that $N_{opt}$ may be easily computed by the steps given in Section VI.2 below with the complete approximated solution due to the very small sensitivity of Nopt to the approximation quality. The appropriate sizing factors may be more accurately derived by the semi-approximate solution presented in this sub-section for cases where the load is small and the chains are relatively long.

DML optimization for complex structures and nets may thus achieve high performance in comparison to standard CMOS optimization. It should be noted that for simplicity for all calculations and analysis $S_1=1$ was used. In the case of a complex logic net a bigger factor may boost the performance up due to more equalized stage-effort throughout the chain.

A dual-mode logic gate and circuit have been described above. The DML gate and circuits are capable of switching between static and dynamic modes. Circuit design methodologies and transistor sizing techniques directed at dual-mode circuits have also been described. The ability to selectably switch between static and dynamic mode enables optimum performance, along with attaining an improved tradeoff between evaluation speed and power requirements.

It is expected that during the life of a patent maturing from this application many relevant static gates, transistor types, logic circuit and logic circuit design methodologies will be developed and the scope of the term corresponding terms is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find calculated and simulated support in the following examples.

EXAMPLES

Reference is now made to the following examples, which together with the above descriptions illustrate some embodiments of the invention in a non limiting fashion.

VI. LE Transistor Sizing Analysis for a CMOS-Based DML Inverter Chain

Figure 10:
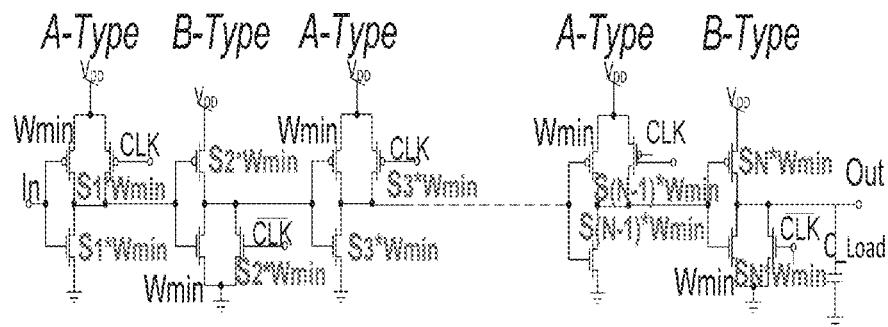
FIG. 10 shows the chain used to extract the optimal sizing factors for a simple DML inverter chain.

In order to extract the optimal sizing factors for a simple DML inverter chain, we assume a chain, shown in FIG. 10. As shown above, the delay of a general gate i in the chain is given by:

$$t_{pd\_i} = \underbrace{\frac{\ln(2) \cdot R_{min\_A} C_{D,min}}{\gamma'}}_{t_{p0\_DML}} \left( \underbrace{\frac{R_{gate}}{R_{inv}} \cdot \frac{C_{D,gate}}{C_{D,inv}}}_{P\_DML} \gamma' + \underbrace{\frac{R_{gate}}{R_{inv}} \cdot \frac{C_{G,gate}}{C_{G,inv}}}_{LE\_DML} \underbrace{\frac{C_{Load}}{C_{G,gate}}}_{f\_DML} \right)$$

A normalized delay of each odd gate ("Type A") and each even gate ("Type B") may be described in terms of the delay of a "Type A" minimal DML inverter tpo_DML:

$$t_{pd\_i\_odd} = t_{p0\_DML} \left( \frac{(2s_i + 1)}{3s_i} \gamma' + \frac{(s_{i+1} + 1)}{2s_i} \right) \quad (19)$$

$$t_{pd\_i\_even} = t_{p0\_DML} \left( \mu_{n/p} \left[ \frac{(2s_i + 1)}{3s_i} \gamma' + \frac{(s_{i+1} + 1)}{2s_i} \right] \right)$$

Then, assuming even number of inverters N in the chain, the delay of the chain may be expressed by adding together delays of all the chain components:

$$D = \sum_i t_{pd\_i} = t_{p0\_DML} \left( \underbrace{\sum_{\substack{odd\_i \\ Type\_A}} \left( \frac{(2s_i + 1)}{3s_i} \gamma' + \frac{(s_{i+1} + 1)}{2s_i} \right)}_{} + \underbrace{\sum_{\substack{even\_i \\ Type\_B}} \left( \mu_{n/p} \left[ \frac{(2s_i + 1)}{3s_i} \gamma' + \frac{(s_{i+1} + 1)}{2s_i} \right] \right)}_{} \right) \quad (20)$$

In the next sub sections, three different solutions to the delay optimization problem are developed. The first one is a complete non-approximated solution, the second is a complete approximated solution and the last solution is a partially\semi approximated solution. These solutions are trading off complexity with accuracy.

VI.1. Non-Approximated LE Solution for the Sizing Factors of DML Inverter Chain

In order to perform accurate LE optimization of an inverter change we will differentiate Eqn. (20) by all $S_i$ factors of the chain and equate to 0, i.e.:

$$\frac{dt_{pd}}{ds_i} = 0$$

After simplification and substituting $\gamma'$, the following expression may be written for all odd i:

$$\frac{S_i}{S_{i-1}} = \frac{(\gamma + 1 + S_{i+1})}{S_i} \frac{1}{\mu_{n/p}}$$

Where $\mu_{n/p}$ is defined as $\mu_n/\mu_p$. For all even i, the results is:

$$\frac{S_i}{S_{i-1}} = \frac{(\gamma + 1 + S_{i+1})}{S_i} \mu_{n/p}$$

Setting:

$$A = (\gamma + 1) \cdot \mu_{n/p}, B = \mu_{n/p}$$

Typically, the first gate in the chain would be all minimal sized transistors and therefore $S_1 = 1$ If we write down the last two equations for all i ($1 \leq i \leq N$) the next set of equations is received:

$$S_1 = 1 \quad (21)$$
$$0 = AS_1 - S_2^2 + BS_1 S_3$$
$$0 = AS_2 - B^2 S_3^2 + BS_2 S_4$$
$$0 = AS_3 - S_4^2 + BS_3 S_5$$
$$0 = AS_4 - B^2 S_5^2 + BS_4 S_6$$
$$\vdots \quad \vdots \quad \vdots \quad \vdots \quad \vdots$$
$$S_N^2 = AS_{N-1} + BS_{N-1} S_{N+1}$$

This is a set of N equations with N un-known variables; each equation is non-linear containing mixed variable multiplication. In general, it may be solved numerically.

This is the optimal and accurate solution for DML inverter chain sizing, with a high level of complexity.

Typically $S_1 = 1$. For simplicity in the rest of this paper we will use this value. However, $S_1$ may be generalized for all sizes and therefore for all input capacitance. We assume herein that there are an even number of stages (even N). The methodology is equally applicable to an odd number of stages.

VI.2. Completely Approximated LE Solution for the Sizing Factors of DML Inverter Chain In this sub section a less accurate model, from the complete solution, is developed. But, it may benefit from a very low computational effort. We previously saw, Eqn. (20), describes the general delay expression for all the chain, assuming even number of inverters N-even. We assume in this sub-section that for all stages that the minimal transistor contribution to the drain and gate capacitance is negligible in comparison to $2S_i$ and to $S_{i+1}$. We will later see that for more complex gates this neglection is even more reasonable. This leads to Eqn. (22):

$$D = \sum_N D_i = t_{p0\_DML} \left( \sum_{\substack{odd\_i \\ Type\_A}} \left( \frac{(2s_i)()}{3s_i} \gamma' + \frac{(s_{i+1})()}{2s_i} \right) + \sum_{\substack{even\_i \\ Type\_B}} \left( \mu_{n/p} \left[ \frac{(2s_i)()}{3s_i} \gamma' + \frac{(s_{i+1})()}{2s_i} \right] \right) \right) \quad (22)$$

These assumptions are justified when the load capacitance is large. The large load capacitance may impact the sizing factors $S_i$. And as we proceed along the chain, this approximation may more legitimately account for the rise in $S_i$. Moreover, for the first stage, we set $S_1 = 1$ and so only for the first and second stages most likely that never will this approximation be good (however it introduces a very small error even in these rare situations). We present this solution in contrast to the previous un-approximated solution for error estimation. We will see that with big loads or long chains this simple solution bears very small error. In the next sub-section we will present a solution that stands in between this solution and the un-approximated solution error wise. Eqn. (22) turns to:

$$D = \sum_N D_i = t_{p0\_DML}\left(\sum_{\substack{odd\_i \\ Type\_A}}\left(\frac{2}{3}\gamma' + \frac{s_{i+1}}{2s_i}\right) + \sum_{\substack{even\_i \\ Type\_B}}\left(\mu_{n/p}\left[\frac{2}{3}\gamma' + \frac{s_{i+1}}{2s_i}\right]\right)\right) \quad (23)$$

As in sub-section B, by taking $$\frac{dt_{pd}}{ds_i} = 0$$

the following expression may be written for all odd i:

$$\frac{S_i}{S_{i-1}} = \frac{S_{i+1}}{S_i}\frac{1}{\mu_{n/p}}$$

For all even i, the results is:

$$\frac{S_i}{S_{i-1}} = \frac{S_{i+1}}{S_i}\mu_{n/p}$$

The solution to the sizing factors for this sub-section is quite similar to the standard CMOS solution, the upsizing factor is constant and all odd stages will be factored in an additional $\sqrt{\mu_{n/p}}$. These factors may be written in a series by:

| $S_1$ | $S_2$ | $S_3$ | $S_4$ | $S_5$ | $S_6$ | $S_6$ | $S_8$ | ... | $S_{N-1}$ | $S_N$ | $S_{N+1}$ |
|---|---|---|---|---|---|---|---|---|---|---|---|
| 1 | $\sqrt{\mu_{n/p}}A^{0.5}$ | $A$ | $\sqrt{\mu_{n/p}}A^{1.5}$ | $A^2$ | $\sqrt{\mu_{n/p}}A^{2.5}$ | $A^3$ | $\sqrt{\mu_{n/p}}A^{3.5}$ | ... | $A^{\frac{N}{2}-1}$ | $\sqrt{\mu_{n/p}}A^{(\frac{N}{s}-1)+0.5}$ | $A^{\frac{N}{2}}$ |

In CMOS the sizing factors were derived from the linear connection of the Load to input capacitance ratio and in DML we see that it is derived in a slightly different manner, from the ratio of the first to last sizing factors:

$$\text{In } DML: \frac{S_{N+1}}{S_1} = A^{\frac{N}{2}}, F_{DML} = \frac{S_{N+1}}{S_1} = f_{DML}^{\frac{N}{2}}, A = f_{DML} = \sqrt[\frac{N}{2}]{F_{DML}}$$

$$\text{In } CMOS: F = \frac{C_{Load}}{C_{in,g}} = f^N, f = \sqrt[N]{F}$$

Where the connection between the capacitance and the sizing factors is given by:

$$\frac{(S_{N+1}+1)WL_{min}}{(S_1+1)WL_{min}} = \left\{\frac{\text{Typicaly}}{S_1 = 1}\right\} = \frac{S_{N+1}+1}{2} = \frac{C_{Load}}{C_{in,g}}$$

Now we know how to upsize a given N length DML inverter chain in this method.

If our point of interest is to derive the optimal chain length $N_{opt}$ under a given load capacitance we will define the problem in the next manner:

Consider a path of logic gates containing $n_1$ stages, to which we append $n_2$ additional DML inverters to obtain a path with N=n1+n2 stages. We assume that the original $n_1$ stages cannot be altered except by scaling because they perform necessary logic functions, while the number of inverters may be altered if necessary to reduce delay. More-over, assuming that the optimum length will be greater than $n_1$, we further assume that $n_2$ is even (adding buffers, inverter in "Type A"→inverter in "Type B") and the logic function won't be altered. We will assume that $F_{DML}$ is known: the logical effort properties of the logic stages will not be altered by adding buffers. The electrical effort is determined by the input and load capacitance. To note that by adding inverters we would generally impact the electrical effort:

$$LE_1 * LE_2 = \frac{1}{2} * \frac{\mu_{n/p}}{2}, \text{ approximated at } \mu_{n/p} \cong 4 \rightarrow LE_1 * LE_2 = 1$$

$b_1*b_2=1$. This may be generally solved for any value of mobility ratio, here we approximate: $\mu_{n/p} \approx 4$. The parasitic for each buffer is 1. The delay of the chain is the sum of the logic stages delay and of the inverting stages. Deriving the chain delay by N and equating to 0 yields:

$$\frac{\gamma(\mu_{n/p}^{-0.5} + \mu_{n/p}^{0.5}) + \sqrt[N]{F_{DML}}}{C_1} - \frac{\sqrt[N]{F_{DML}}*\ln(F_{DML})}{N} = 0 \quad (24)$$

Where the optimal sizing factor may be numerically solved from:

$$f_{DML\_opt} = e^{\left(1+\frac{C_1}{f_{DML\_opt}}\right)}$$

which leads for $f_{DML\_opt}$=4.65 and as in section II, for large $F_{DML}$, which means $N_{opt}$ will be larger than $N_{minimum}$, $N_{opt}$ may be approximated by:

$$N_{opt} \cong \log_{f_{DML\_opt}}(F_{DML}) \quad (25)$$

Figure 11:
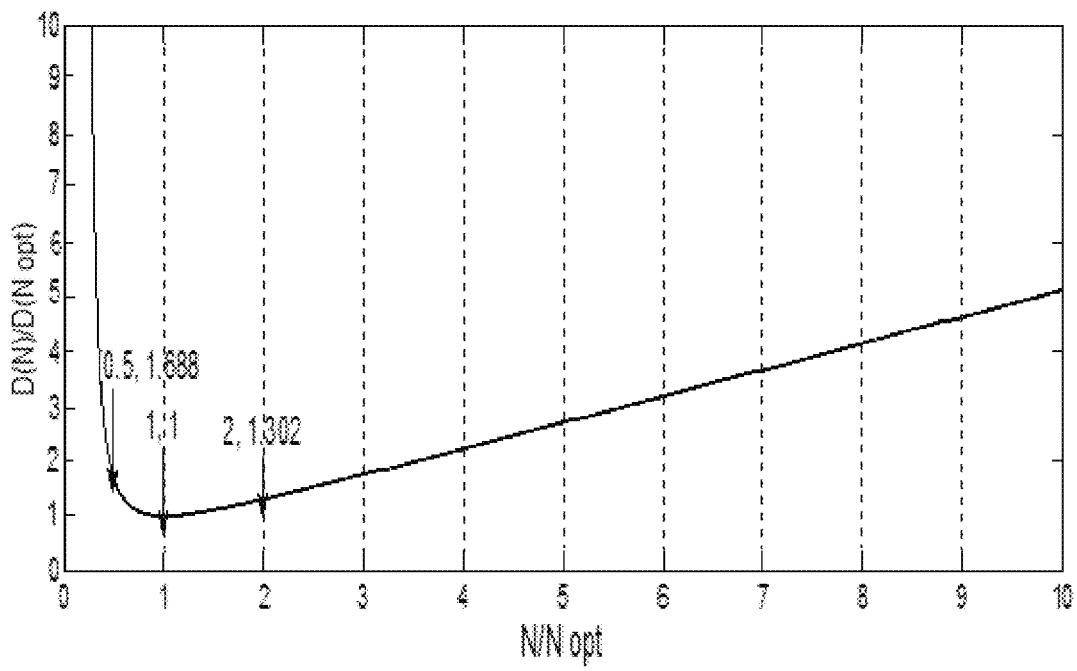
FIG. 11 shows the deviation in delay from the minimal delay achieved under an $N_{opt}$ length implementation.

The deviation in delay from the minimal delay achieved under an $N_{opt}$ length implementation may be represented graphically as shown in FIG. 11, where S is the deviation factor from $N_{opt}$, $D_N$ is the optimal delay for a given general N, and $D_N$ is the optimal delay under the optimal implementation which is the normalization point of the graph. Notice, that the sole difference from the CMOS solution is the constant $C_1$ which changes the slopes of the graph. The graph answers:

$$\frac{D(s \cdot N)}{D(N)} = \frac{C_1 s + s \cdot f_{opt}^{1/s}}{C_1 + f_{opt}} \quad (26)$$

In comparison to the values from CMOS topology standard graph we see that similarly we are more sensitive to under shoot in N from the optimal value, delay-wise, then in over shooting. In DML the results and concepts are similar but are a little more severe in error:

In under-shooting, half the number of stages, in CMOS, 51% delay deviation. Where in DML, 68.8% delay deviation.

And in over-shooting, doubling the number of stages, in CMOS, 26% delay deviation. Where in DML, 30.2% delay deviation. The solution in this sub-section is accurate for a smaller set of cases (from the complete solution). But, it benefits from a very low necessity for computational effort.

VI.3. Semi-Approximated (SA) LE Solution for the Sizing Factors OF DML INVERTER CHAIN In Sections V.1 and V.2 we saw a complex exact solution and a completely approximated LE solution, which is simple but less accurate (for a small set of cases). In Section VI.2 we present a semi-approximated sizing factor calculation methodology. As discussed above, for the first stage we set $S_1=1$ and so, for the first and second stages it is most likely that the sub section II.3 approximation will never be good (but it introduces a very small error only in these very rare situations).

Therefore, we will approximate the gate and drain capacitances starting only from stage 3. In stages 1, 2 where the approximation is less trivial we will use the full expression. Eqn. (20) thus becomes:

$$D = \sum_N D_i = \qquad (27)$$

$$t_{p0\_DML} \begin{pmatrix} \frac{(2s_1+1)}{3s_1}\gamma' + \frac{(s_2+1)}{2s_1} + \sum_{\substack{odd\_i>1 \\ Type\_A:3,5,7...}} \left(\frac{(2s_i)}{3s_i}\gamma' + \frac{(s_{i+1})}{2s_i}\right) + \\ \left(\mu_{n/p}\left[\frac{(2s_2+1)}{3s_2}\gamma' + \frac{(s_3+1)}{2s_2}\right]\right) + \\ \sum_{\substack{even\_i>2 \\ Type\_B:4,6,8...}} \left(\mu_{n/p}\left[\frac{(2s_i)}{3s_i}\gamma' + \frac{(s_{i+1})}{2s_i}\right]\right) \end{pmatrix}$$

Deriving by all $S_i$ and equating to 0 leads to:

$$\frac{dt_{pd}}{dS_2} = 0 \rightarrow \frac{S_2}{S_1} = \frac{(\gamma + 1 + S_3)}{S_2}\mu_{n/p} \qquad (28)$$

$$\forall (i>1), \text{ odd } (3,5,7\ldots): \frac{S_i}{S_{i-1}} = \frac{S_{i+1}}{S_i \cdot \mu_{n/p}}$$

$$\forall (i>2), \text{ even } (4,6,8\ldots): \frac{S_i}{S_{i-1}} = \frac{S_{i+1} \cdot \mu_{n/p}}{S_i}$$

Where the solution to this set of equations for $S_i$ factors may be written in series by:

| $S_1$ | $S_2$ | $S_3$ | $S_4$ | $S_5$ | $S_6$ | $S_7$ | ... | $S_N$ | $S_{N+1}$ |
|---|---|---|---|---|---|---|---|---|---|
| 1 | $S_2(A_1)$ | $\frac{A_1^{0.5}}{\sqrt{\mu_{n/p}}}S_2(A_1)$ | $A_1 S_2(A_1)$ | $\frac{A_1^{1.5}}{\sqrt{\mu_{n/p}}}S_2(A_1)$ | $A_1^2 S_2(A_1)$ | $\frac{A_1^{2.5}}{\sqrt{\mu_{n/p}}}S_2(A_1)$ | ... | $A_1^{\frac{N}{2}-1}S_2(A_1)$ | $\frac{A_1^{\frac{N-1}{2}}}{\sqrt{\mu_{n/p}}}S_2(A_1)$ |

Where $S_2$ is the solution to a quadratic equation:

$$S_2 = \frac{\sqrt{A_1\mu_{n/p}} + \sqrt{A_1\mu_{n/p} + 4(\gamma+1)\mu_{n/p}}}{2} \qquad (29)$$

Now, we may extract $A_1$ (and from $C_{load}$ we extract $S_{N+1}$):

$$A_1 = \left[\frac{S_{N+1}}{S_1}\frac{2}{1+\sqrt{1+4(\gamma+1)/A_1}}\right]^{\frac{2}{N}} \qquad (30)$$

Equation 30 includes the sole difference from the complete approximated solution in the previous section.

Eqn. (30) may be easily solved for any $C_{load}$ and N to receive $A_1$.

To summarize, in order to solve in the semi-approximated (SA) method one needs to find:

$$\text{In } SADML: F_{DML} = \frac{S_{N+1}}{S_1}\frac{2}{1+\sqrt{1+4(\gamma+1)/A_1}} = f_{DML}^{\frac{N}{2}},$$

$$\underline{A_1} = f_{DML} = \sqrt[\frac{N}{2}]{F_{DML}}$$

If our point of interest is to derive the optimal chain length, $N_{opt}$ under a given load capacitance as done in the previous sub-section then we need to differentiate by N. Then equate to 0.

$$D = t_{p0\_DML}\left(\frac{(2s_1+1)}{3s_1}\gamma' + \frac{(s_2+1)}{2s_1} + \mu_{n/p}\left[\frac{(2s_2+1)}{3s_2}\gamma' + \frac{(s_3+1)}{2s_2}\right] + \right.$$

$$\left.\left(\frac{(N-2)}{2}\gamma(1+\mu_{n/p}) + (N-2)\frac{\sqrt{\mu_{n/p}}A_1^{0.5}}{2}\right)\right)$$

Setting:

$$S_1 = 1, S_2 = \frac{\sqrt{A_1\mu_{n/p}} + \sqrt{A_1\mu_{n/p}+4(\gamma+1)\mu_{n/p}}}{2}, S_3 = \frac{A_1^{0.5}}{\sqrt{\mu_{n/p}}}S_2(A_1)$$

And by using the chain role for derivatives $dM/dA_1$ on:

$$N = \frac{2\ln\left(\dfrac{2S_{N+1}}{S_1\left(1+\sqrt{1+\dfrac{4(1+\gamma)}{A_1}}\right)}\right)}{\ln(A_1)}$$

Solving this equation numerically to derive $A_1$ (we used MATLAB) which leads to the optimal number of stages $N_{opt}$. Note that in the complete solution and in the semi approximate solution, which unlike the CMOS solution or the complete approximate solution, the optimal sizing factors $f_{opt}$ or $A_1$ depends on the load capacitance.

VII. Low Voltage DML Logical Effort Optimization

An exemplary embodiment of LE transistor sizing optimization for Low Voltage DML circuits is now presented.

The main issues and drawbacks of low voltage (LV) dynamic logic are elegantly solved or avoided when using DML. Charge leakage and charge sharing are not issues in DML, since the complementary part acts as a keeper and restores the logical level, without the need for a high power consuming bleeder or an area and power consuming keeper. The ability to properly restore the logical levels also prevents the back gate coupling issue. In the following section, we will optimize the DML gates, and derive the required transistor sizes.

In the following, the term "low voltage operation" is to be understood to include both Sub-Threshold (ST) and/or Near-Threshold (NT) Operation, unless the level of operation (e.g. ST or NT) is explicitly stated.

Section V above presents a general LE optimization technique for a general DML logic circuit. Section VII directs the LE optimization to Low-Voltage (LV) DML circuitry.

The optimization space of DML gates, similar to the majority of VLSI designs, is composed of area, power and speed. Since ST and NT designs suffer from reduced performance, the analysis in Section VII targets the LV DML gate optimization for speed using the LE technique to evaluate the delay. To repeat the discussion of LE above, according to the LE technique, the gate delay (d) may be expressed as a sum of the stage effort (f) and the parasitic capacitance (p), as noted in Equation 49.

$$d = f + p \quad (49)$$

where $f = g \cdot h \cdot b$; g is the logical effort of the stage; h is the electrical effort; and b is the branching effort.

In order to optimize for LV, we will need to evaluate the logical effort (g) of the gate, which is defined as the ratio of the input capacitance of the gate to that of an inverter, assuming that both gates drive the same current. g is an intrinsic property of the gate and is constant. In order to evaluate g we need to set the transistor widths, so the DML gate may deliver the same amount of output current as an inverter.

VII.1. Low Voltage Dual Mode Logic

An exemplary embodiment of DML LE optimization using the transregional current model for low voltage operation, e.g. ST and NT regions is now presented. This model is used to evaluate the stacked transistors fitting parameters to achieve the same current as driven by a single transistor.

VII.2. Modeling $I_{on}$ Using the Transregional Model

Since characteristics of MOS transistors operating in the ST and NT regions are substantially different from transistors operating in strong inversion, the present embodiment uses the transregional model. This model is especially suited to fit the ST and NT regions. According to the model, the on-current ($I_{on}$) of the transistor is modeled by (50):

$$I_{on} = I_0 W e^{\frac{V_{DT} - \alpha V_{DT}^2}{n v_T}} \quad (50)$$

where $V_{DT}$ is an abbreviation for $V_{DD} - V_T$; $\alpha$ and n are empirical fitting parameters; and $v_T$ is the thermal voltage.

Figure 12A:
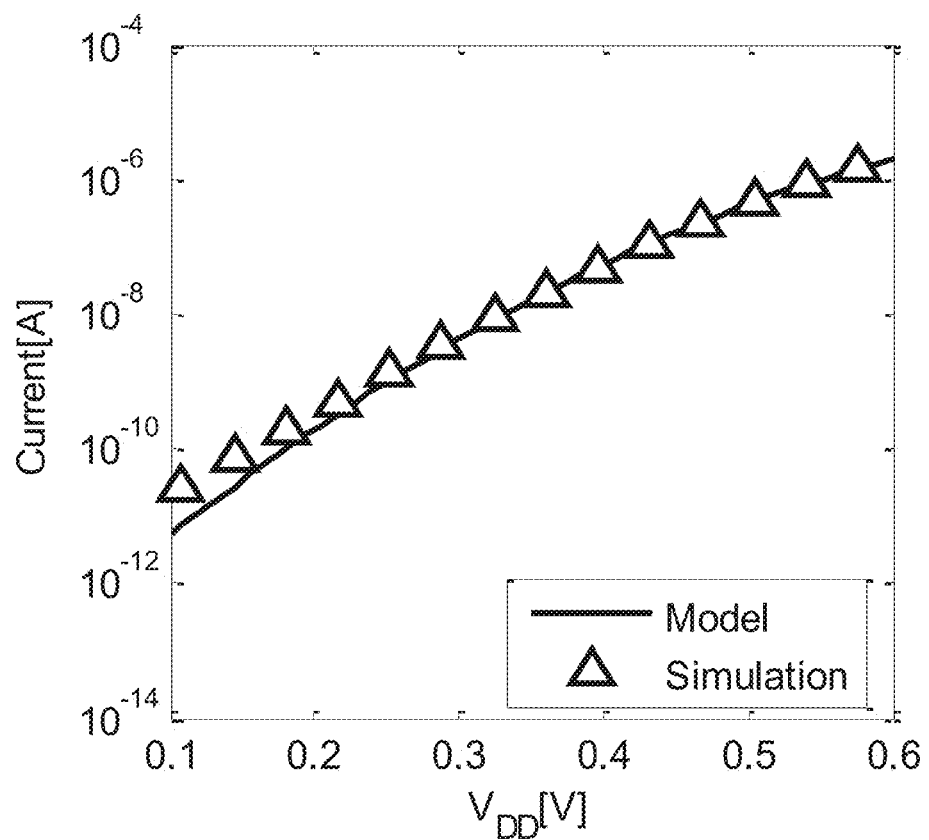
FIG. 12A shows the simulation results plotted versus the calculated Ion model.
Figure 12A:
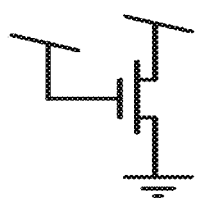

The model parameters were derived by curve-fitting Spectre simulations for the chosen low power 40 nm technology. $I_{on}$ is a function of $V_{DT}$; and therefore changes in $V_T$ caused by process variations or body biasing do not require re-fitting of $I_0$, $\alpha$ and n. $V_{DD}$ was swept to extract the model parameters for (50), as shown in FIG. 12A. In FIG. 12A, the simulation results are plotted versus the calculated model. The model must be accurate in the functional ST and NT regions, in order to be used to derive the required transistor widths. Indeed, throughout the entire range, from the functional subthreshold region ($V_{DD} > 0.25V$) to the NT vicinity, the least square error fit has an average error of less than 2% and a maximum error of 12%.

Figure 12B:
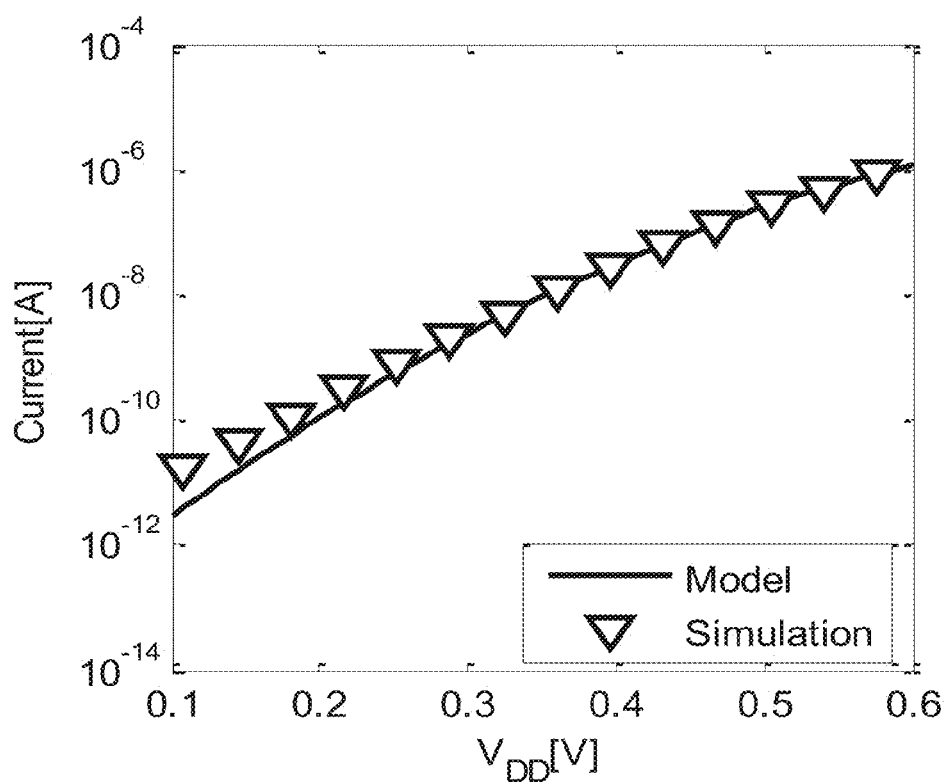
FIGS. 12B and 12C demonstrate that the $I_{ON}$ model fits accurately for the operational regions.
Figure 12B:
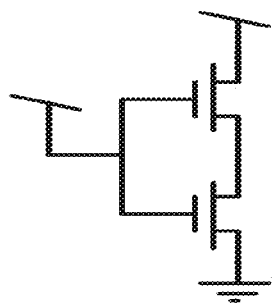
Figure 12C:
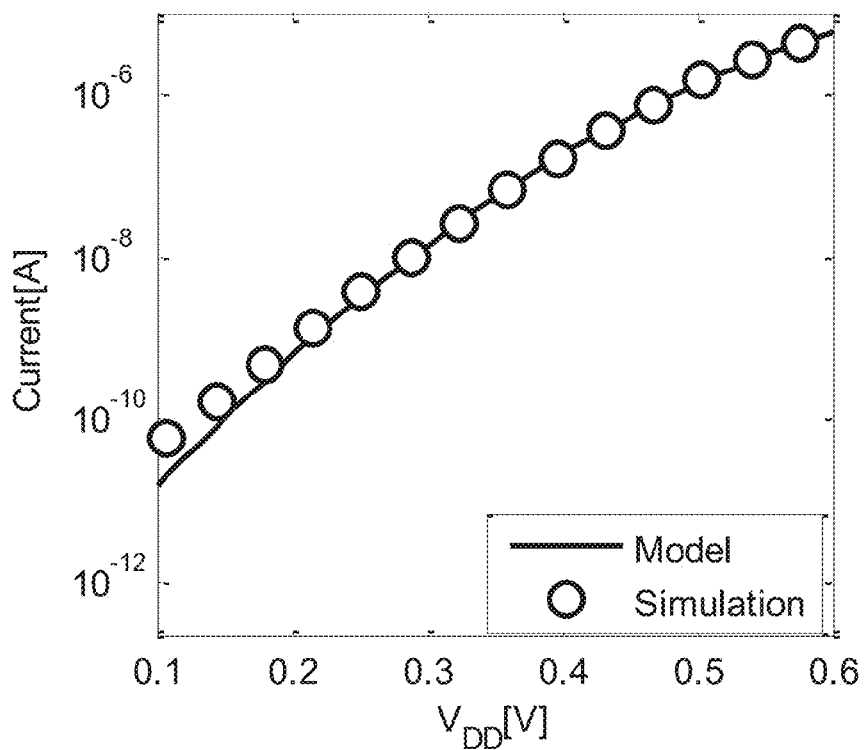
Figure 12C:
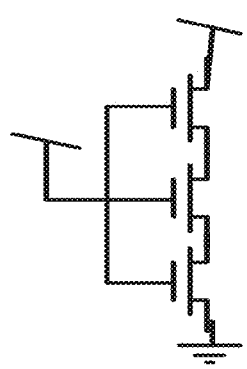

In order to demonstrate that the transregional model is not only suitable for modeling a single transistor, it was also examined for a stack of two and three transistors. FIG. 12B and FIG. 12C show that the model fits accurately for the operational regions, exhibiting an average least square fit error of 4% and a maximal error of 18%. Modeling of stacks of several transistors may be important during LE development for DML.

VII.3. Low Voltage DML Sizing Methodology

In the dynamic mode, attaining a fast evaluation period is critical and therefore the analysis will be performed on the DML topology, where the pre-charge transistor is preferably placed in parallel to the stacked transistors (preferably: NOR in "Type_A" and NAND in "Type_B"). In addition, a footer is rarely employed in DML gates, and an analysis will be performed to size the footer and evaluation transistors (i.e. a stack of two transistors in an optimal parallel evaluation net). It is important to understand that the vast majority of gates would be unfooted, as was mentioned. Moreover, in complex logic gates (i.e. AOI\IOA) the evaluation net might comprise more than one transistor, even without a footer. The complementary serial transistors, which are parallel to the pre-charge transistor, will be sized to minimal width, to decrease gate capacitances and intrinsic delay, and thus allow fast dynamic operation. The pre-charge transistor will also have a minimal width, to decrease leakage currents. The pre-charge transistor may be sized even bigger to gain robustness in pre-charging, if required. The gain in output capacitance was shown to be negligible.

Based on the transregional current model, we will calculate the widths of the footer and evaluation transistors (W') required to drive the same on-current as a single transistor (W). The $I_{on,single}$ of a single transistor was equated to $I_{on,2\,stack}$ and $I_{on,3\,stack}$, and W was extracted as a function of the fitting parameters, as may be seen in Equation 51. The variables marked with a tick (e.g. W') refer to the stacked transistors.

$$\frac{W'}{W} = \frac{I_0}{I_0'} \exp\left(\frac{V_{DT} - \alpha V_{DT}^2}{n v_T} - \frac{V_{DT}' - \alpha' V_{DT}'^2}{n' v_T}\right) \quad (51)$$

Figure 13A:
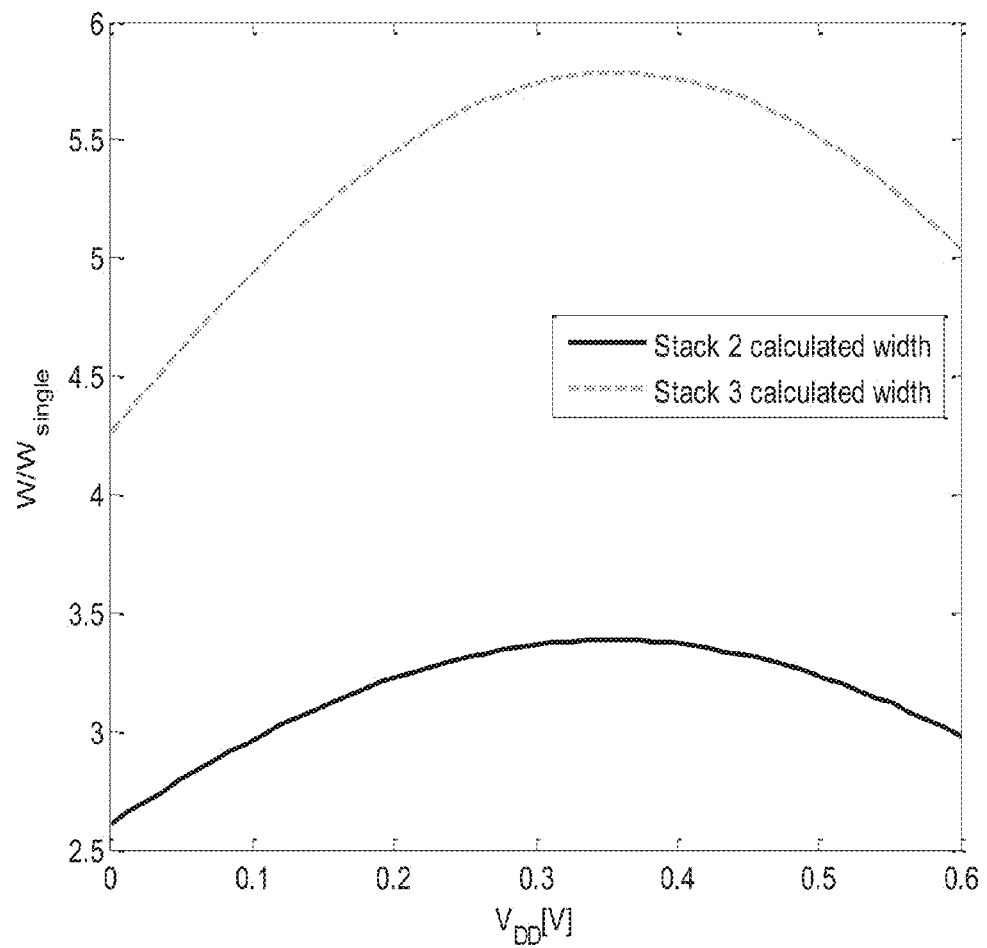
FIG. 13A shows the ratio between the calculated widths of the stacked transistors the width of a single transistor.

FIG. 13A shows the ratio between the calculated widths of the stacked transistors (i.e. W') and the width of a single transistor (i.e. W). It should be noted that the widths of the transistors in a stack are not constant, but a function of $V_{DD}$. Thus, the optimal width varies with the supply voltage and is different from region to region. This optimization is worthwhile for the ST and NT region circuits, since traditional sizing (ratio of two and three, for the two and three transistors stacks, respectively) is not precise at low voltages. For example, at 300 mV supply voltage, the sizing factor required to achieve the same current through 2-stack transistors as in the case of a single minimal transistor is 3.3 (for 3-stack—5.6, and for 4-stack—10). Nevertheless, for the strong inversion regime the calculated width converges to the nominal values (not shown in FIG. 13A).

Figure 14A:
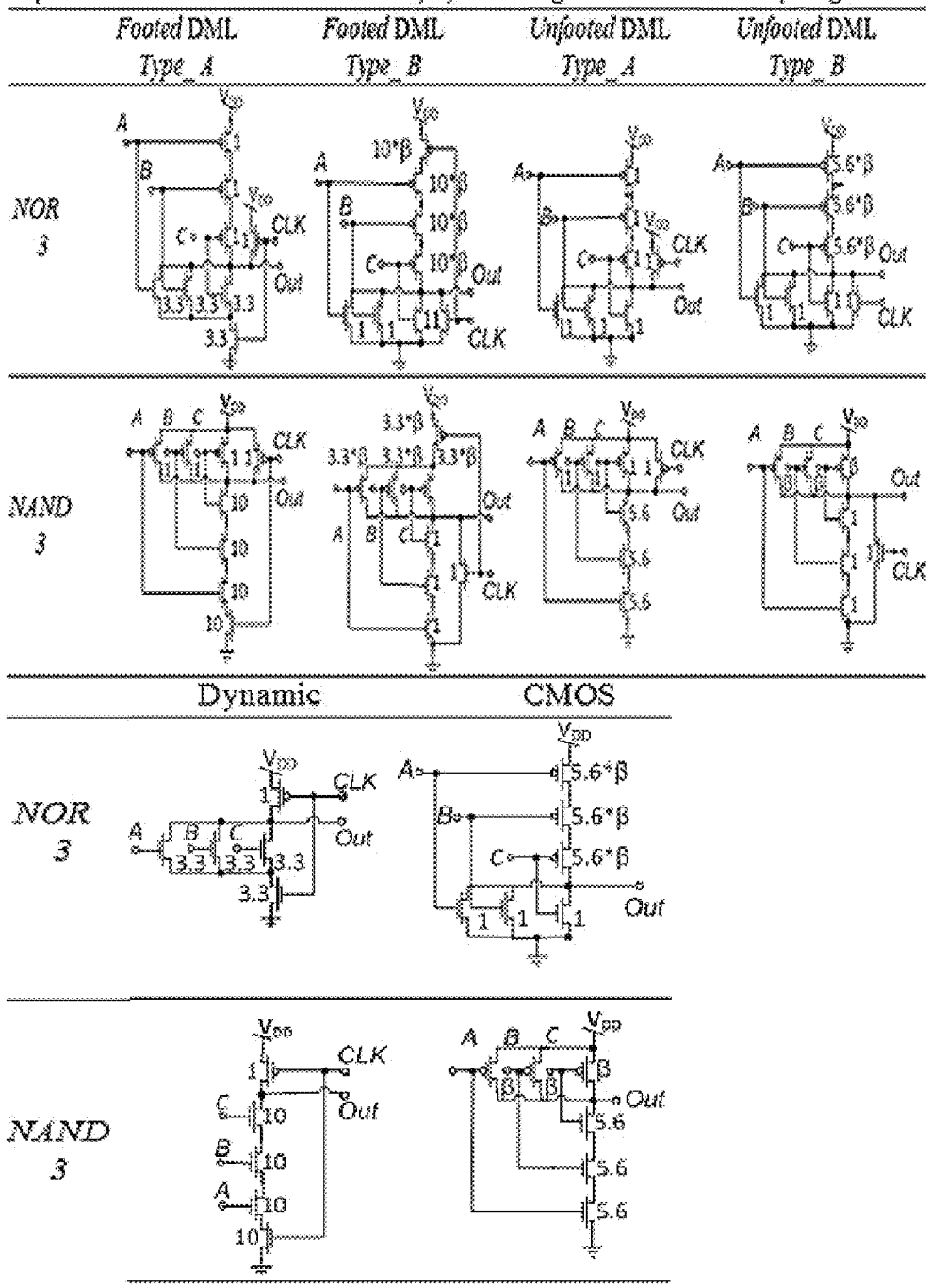
FIG. 14A shows an example of optimized transistor sizing.

Using the presented analysis, we have calculated the optimal transistors sizing of basic DML gates. FIG. 14A presents an example for optimized transistor sizing, normalized to the minimal transistor width for NAND and NOR gates with Fan-In=3 for VDD=0.3V for DML, CMOS and Domino designs for both footed and unfooted topology. The same stacked-transistor analysis was also used to calculate the widths of CMOS/Dynamic transistors. The sizing factor β, which is defined as the optimal ratio for transistors in the pull up to the pull down network, was simulated and found to be ~1.5 for the 40 nm process, which is the factor for all calculations henceforth.

VII.4. Low Voltage Logical Effort Parameters

Using the transistor widths from section VII.3, LE parameters may be calculated as shown in FIG. 13B.

Note that the derived values are smaller than their CMOS/Domino counterparts for the unfooted Type A NOR3 and Type B NAND3 gates. These delays relate to the DML operation in the dynamic mode. For the static mode, it is clear that DML gates would be a bit slower than CMOS due to the unsymmetrical sizing, yet not drastically due to very small input and output capacitances. A DML designer may construct logic in such a manner that gates are constructed with a high-stack pull up network in Type A and high-stack pull down network in Type B. Such a design approach would gain very fast circuits.

Figure 14B:
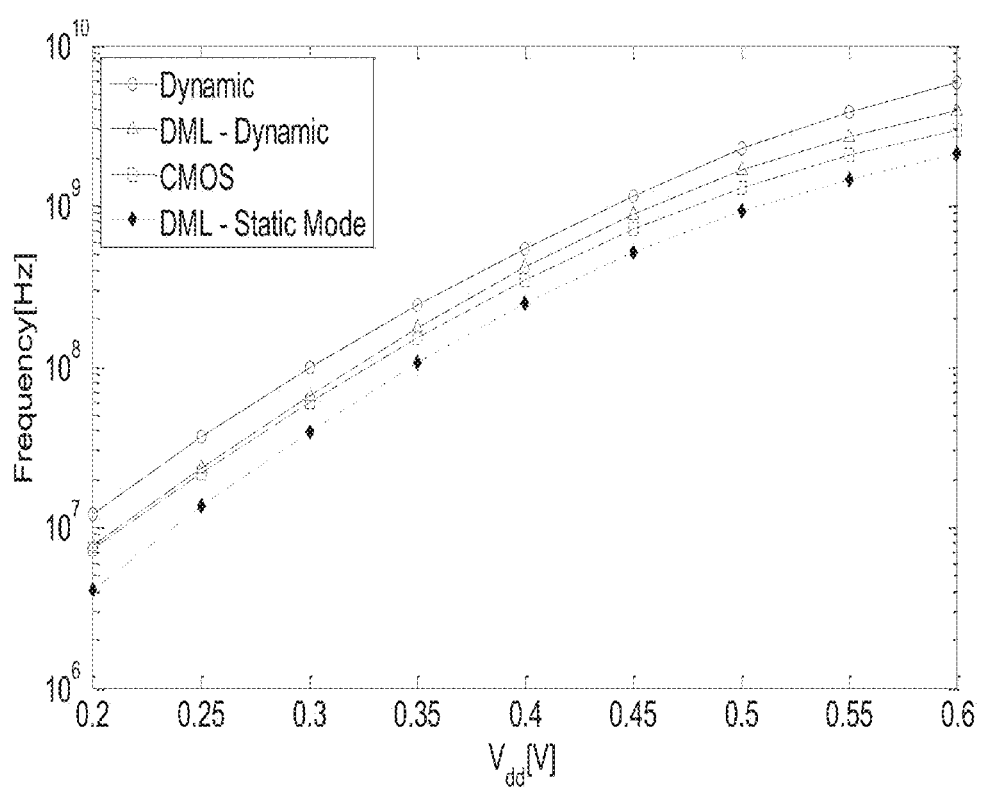
FIG. 14B shows the achievable frequency of a 40 nm NAND-NOR DML chain.

FIG. 14B shows the achievable frequency of a 40 nm NAND-NOR DML chain (a chain of 20 gates, 10 NAND gates in Type B; 10 NOR gates in Type A), CMOS and Domino chains with FO3 of the same length. It should be noted that a very noticeable gain is achieved when testing more complicated designs, as will be shown below.

A NOR DML gate operating in static mode is on average 33% slower than a CMOS gate. Switching a DML gate from static mode to dynamic mode offers an average speed improvement of 2× in the footed topology (for example, at VDD=0.3V, dynamic DML achieves 66 Mhz, whereas CMOS achieves only 50 Mhz and static DML 35 Mhz). In the unfooted topology an improvement of up to 14× was measured. As expected, Domino logic may operate at the highest frequency, but it suffers from susceptibility to process variations. On average, dynamic DML operation consumes 100% more energy than static DML, as will be discussed below.

Figure 15:
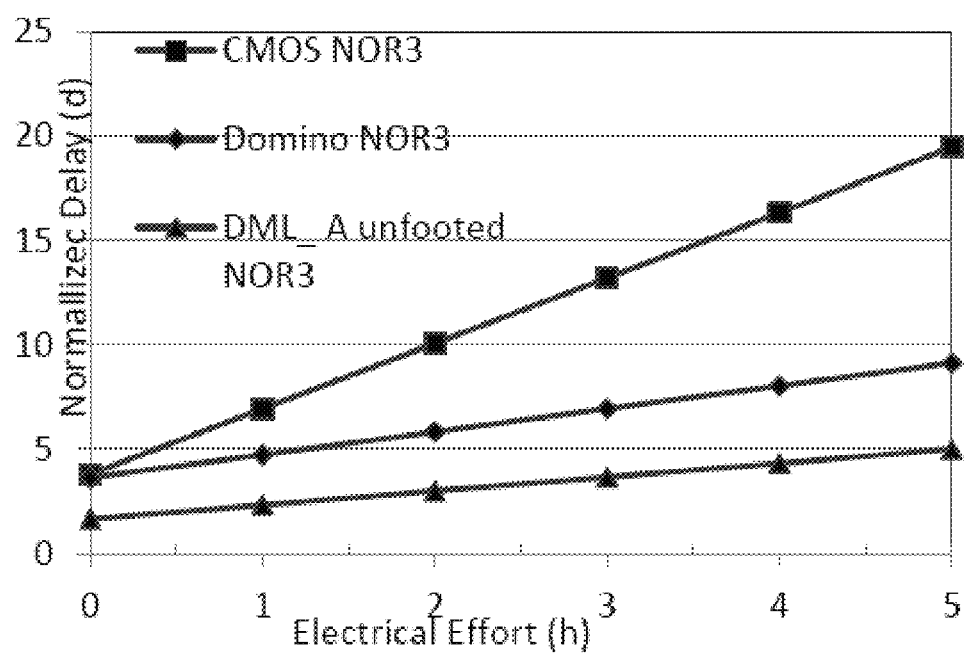
FIG. 15 shows NOR gates with Fan-In=3.

In this section we have derived the logical effort parameters under the modeling of the current through a single transistor. An example of a normalized delay by LE analysis based CMOS, Domino and unfooted DML_A NOR gates with Fan-In=3 is illustrated in FIG. 15. As expected, the CMOS NOR gate has the biggest LE value, and therefore it exhibits the highest delay for any given h, while the DML unfooted NOR has the smallest LE and parasitic delay, and therefore the smallest normalized delay for a given h.

VIII. Sub-Threshold DML with Le Optimization

In the dynamic mode, attaining a fast evaluation period is critical; therefore, the analysis will be performed on the DML topology, where the pre-charge transistor is placed in parallel to the stacked transistors, thus the evaluation is performed through the parallel transistors. The described topology was chosen in order to increase the robustness of the DML gates to process variations and leakage currents. Also, a footer will be employed to enhance the speed of the consequentially connected gates' pre-charge and to decrease the leakage of the parallel transistors, using the stack effect. We will address the increased resistance in the evaluation network, caused by the added footer with optimal transistor sizing.

In order to acquire the optimal width of the footer and the parallel transistors, we will use stack sizing analysis. The analysis will be done for a stack of two transistors: the footer and one of the parallel transistors of the evaluation path.

In the present embodiment the EKV3 model was used to obtain the transistor sizing for sub-threshold analysis.

The characteristics of MOS transistors operating in the sub-threshold region are substantially different from transistors operating in strong inversion. Furthermore, with process scaling, some of the higher order effects like Drain Induced Barrier Lowering (DIBL) have become more prominent. As previously mentioned, the present example is directed to achieve optimal performance when the DML gate operates in the dynamic mode.

The following equation describes the sub-threshold current using the EKV3 model with reference to the DIBL effect, which is the main secondary effect. Respectively, $V_{T0}$ is the threshold voltage when the channel is at equilibrium, n is the sub-threshold slop, $\Phi_t$ is the thermal voltage and $V_G$, $V_S$ and $V_D$ are the voltages at the gate, source and drain of the nMOS transistor.

$$I_{SUB} = I_S \cdot e^{\frac{(V_G - V_{T0})}{n\phi_t}} \cdot \left(e^{\frac{V_S}{\phi_t}} - e^{\frac{V_D}{\phi_t}}\right) \cdot e^{\frac{\eta(V_S + V_D)}{\phi_t}}$$

In short channel devices, the threshold voltage and, consequently, the leakage current vary with drain bias. This effect is referred to as DIBL, and is modeled using, η the DIBL coefficient. Other intrinsic leakage mechanisms like threshold Rolloff and Narrow-Width Effect may be moderated through process changes. $I_S$ is defined below, where μ is the mobility, $C_{ox}$ is the oxide capacitance and L is the channel's length.

$$I_s = 2 \cdot n \cdot \mu \cdot C_{ox} \cdot \frac{W}{L} \cdot \phi_t^2$$

A conventional LE assumes equal sizing of all transistors in a stack. However, a more advanced LE allows optimization of gates that utilize stacks with transistors with non-similar sizes. Using the above equations, we will analyze and find the optimal width ratio of a stack of nMOS transistors for maximal current drive. The following equations describe the current in the upper and lower transistors, where the $V_X$ is the voltage at the drain source connection of the two transistors.

$$I_U = I_S^U \cdot e^{\frac{(V_G - V_{T0})}{n\phi_t}} \cdot e^{\left(\frac{\eta(V_{DD} + V_X)}{\phi_t}\right)} \cdot e^{\frac{V_X}{\phi_t}}$$

-continued $$I_L = I_S^L \cdot e^{\frac{(V_G-V_{T0})}{n\phi_t}} \cdot e^{\frac{\eta V_X}{\phi_T}} \cdot \left(1 - e^{\frac{V_X}{\phi_t}}\right)$$

Notating $$e^{\frac{\eta V_{DD}}{\phi_t}}$$

as α. Equating $I_L$ and $I_U$ and solving for $V_X$ yields:

$$V_X = -\phi_T \cdot \ln\ln\left(\frac{I_S^L}{I_S^U \cdot \alpha + I_S}\right)$$

Using $V_X$, we will find the current in the two transistors:

$$I_L = I_U = I_S^L \cdot e^{\frac{(V_G-V_{T0})}{n\phi_t}} \cdot \left(\frac{I_S^U \cdot \alpha + I_S^L}{I_S^L}\right)^\eta \cdot \left(1 - \frac{I_S^L}{I_S^U \cdot \alpha + I_S}\right)$$

Rearranging yields:

$$I_{DS} = I_L = I_U = I_S^U \cdot \alpha\left(\frac{I_S^L}{I_S^U \cdot \alpha + I_S^L}\right)^{1-\eta} \cdot e^{\frac{(V_G-V_{T0})}{n\phi_t}}$$

Defining $W_T = W_U + W_L$ to eliminate $W_L$, fixating the total width of the route. To find the optimal size for $W_u$, we apply $\partial/\partial W_U$ and equate to zero. This yields the equation below as the optimal size of $W_U$ to $W_T$ ratio, and for the $W_L$ to $W_T$ ratio.

$$\frac{W_U}{W_T} = \frac{\left(-2 + \alpha\eta + \sqrt{\alpha}\sqrt{4 - 4\eta + \alpha\eta^2}\right)}{2(-1+\alpha)} \quad (9)$$

$$\frac{W_L}{W_T} = \frac{\left(\alpha(2-\eta) - \sqrt{\alpha}\sqrt{4 - 4\eta + \alpha\eta^2}\right)}{2(-1+\alpha)} \quad (10)$$

The derived ratio is not the naïve 1/n partition, normally used in LE stack analysis; but, according to these results, the maximal drive current for a stack two transistors' height will be obtained by the ratio:

$$\frac{W_U}{W_L} = \frac{-2 + \alpha\eta + \sqrt{\alpha}\sqrt{4 + \alpha\eta^2 - 4\eta}}{\sqrt{\alpha}\sqrt{4 + \alpha\eta^2 - 4\eta} + \alpha(-2+\eta)} \quad (11)$$

For example, the ratio of widths for the upper and lower transistor with the following parameters is η=0.06, $V_{DD}$=0.3 and Temperature 300 K is $W_U/W_L$=0.76 and not the conventional 1:1 ratio. Even though there is a difference in sizes, the difference in currents is less than 1%, thus we will use the same size for the upper and lower transistor to reduce the complexity of the design and simplify layout.

Now, we will find the sizing of the transistors: each transistor in the stack should be sized up in order to achieve the same current drive as a single transistor. Setting $W_U = W_L = W$, thus $I_S^U = I_S^L = I_S$, (8) may be rewritten as:

$$I_{DS}^{Stacked} = I_L = I_U = I_S \cdot \alpha\left(\frac{1}{\alpha+1}\right)^{1-\eta} \cdot e^{\frac{(V_G-V_{T0})}{n\phi_t}} \quad (12)$$

The following equation notates the current driven through a single transistor:

$$I_{DS}^{Single} = I_S^{single} \cdot \alpha \cdot e^{\frac{(V_G-V_{T0})}{n\phi_t}} \cdot \left(1 - e^{\frac{vdd}{\phi_t}}\right) \quad (13)$$

From the above two equations the required channel width ratio may be derived:

$$\frac{W}{W^{single}} = (1+\alpha)^{1-\eta} \cdot \left(1 - e^{\frac{vdd}{\phi_t}}\right)$$

This analysis will be used for proper ratio selection for the DML gates, in which the parallel transistors will be concatenated to a footer. The evaluation transistors and the footer are sized according to the analysis introduced. The stacked transistors of the pre-charge path will be sized to minimal widths to reduce intrinsic capacitances, thus increasing dynamic operation performance over reduced static operation performance.

Figure 16:
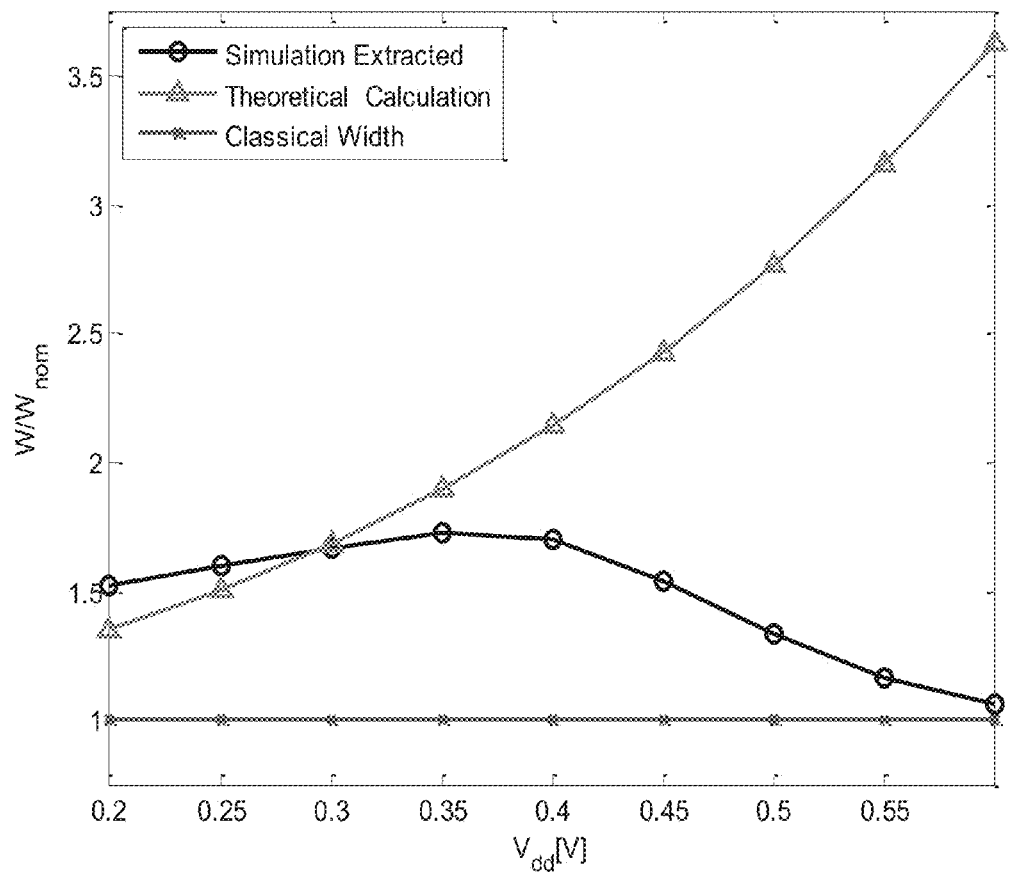
FIG. 16 shows an optimized width of a stack of two nMOS transistors.

FIG. 16 shows the width of a stack of two nMOS transistors, which have been optimized to drive the same current as a single transistor, as a function of $V_{DD}$ in a low power 80 nm process. The η=26 mV/V that was used for the calculation was extracted from a 80 nm process, using:

$$\eta = \frac{\Delta V_{th}}{\Delta V_{DS}} = \frac{V_{t\ldots lin} - V_{t\ldots sat}}{1.1 - 0.05} \quad (15)$$

The optimization was carried out in accordance with RMS minimization of the difference between the current driven through the single transistor and the stack of transistors. It may be noted that, when working in the sub-threshold region, the optimized width is greater than the nominal width ($W_{nom} = 2W_{single}$). As the operation voltage surpasses $V_{th}$, the optimized width converges to nominal width. The theoretical results comply with the simulation results until $V_{DD} = V_{th} = 0.34V$.

Using the presented analysis, we have calculated the transistors' sizing of the basic DML gates along with the LE parameters. The same analysis was used to calculate the widths of CMOS and Domino transistors. Table 1 presents an example for transistor sizing, normalized to the min width, for NAND and NOR gates with Fan-In=3 for $V_{DD}$=0.3V versus CMOS and Domino designs:

TABLE 1

| Gate | NOR | | | NAND | | |
|---|---|---|---|---|---|---|
| Technology | CMOS | Domino | DML | CMOS | Domino | DML |
| pMOS width | 12 | 2 | 1 | 2 | 1 | 4 |
| nMOS width | 1 | 1 | 3.3 | 6 | 6 | 1 |

TABLE 1-continued

| Gate | NOR | | | NAND | | |
|---|---|---|---|---|---|---|
| Technology | CMOS | Domino | DML | CMOS | Domino | DML |
| Clock transistor width | — | 1 | 1 | — | 1 | 1 |
| p | 5 | 5/3 | 4 | 3 | 7/3 | 14/3 |
| g | 13/3 | 1/3 | 4.3/3 | 8/3 | 2 | 5/3 |

Note that the derived g and p values are respectively smaller/bigger than their CMOS/Domino counterparts, even though the DML topology employs a footer. This yields a reduced calculated delay as compared to CMOS.

Figure 17:
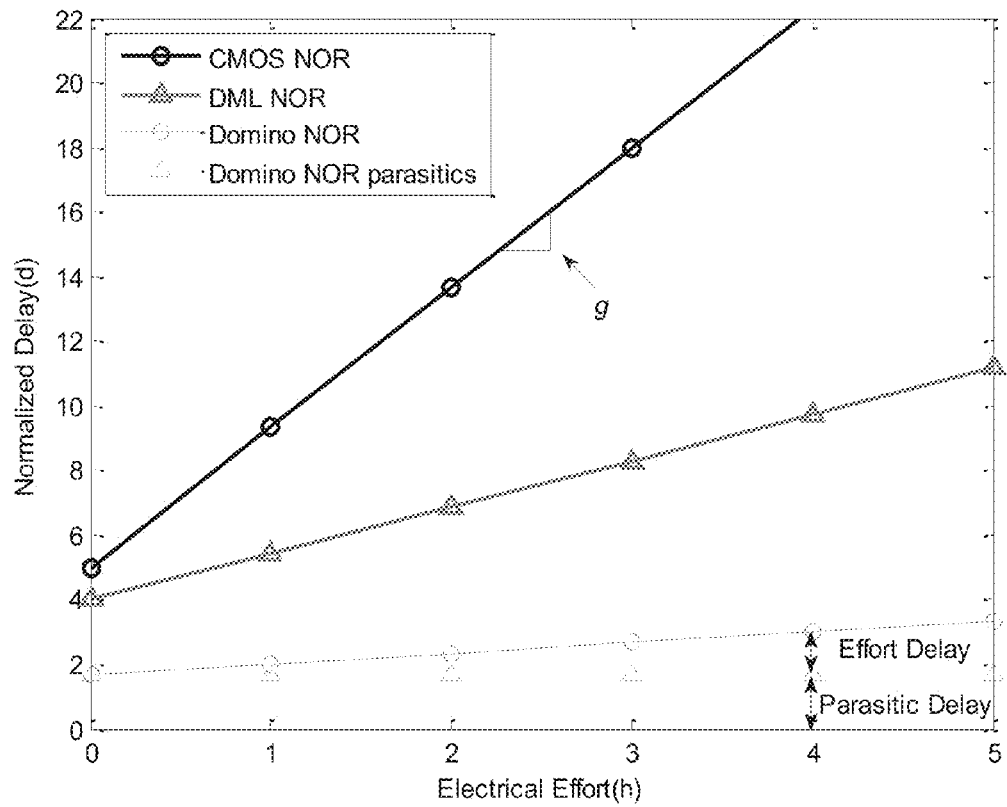
FIG. 17 shows an example of a normalized delay of NOR with Fan-In=3 based on the LE analysis.

An example of a normalized delay of NOR with Fan-In=3, based on the LE analysis, is illustrated in FIG. 17. A NOR3 gate delay was calculated, using the CMOS, Domino and DML topologies parameters. Because the CMOS NOR has the biggest LE value, its delay increases linearly as a function of the electrical effort. It exhibits the highest delay for any given h; while the Domino NOR has the smallest LE and, therefore, the smallest normalized delay for a given h. As expected, the DML normalized delay is located between CMOS and Dynamic. For example, for h=3, meaning the output capacitance is 3 times bigger than the input capacitance, the normalized delays received for a NOR gate are 2.67, 8.3 and 18 for Dynamic, DML and CMOS NOR, respectively.

VIII.1. Comparative Performance Analysis for Sub-Threshold DML

We compared DML gates to their CMOS and Domino counterparts in the means of speed, power and robustness. All the test gates were examined and characterized in a standard low-power 80 nm process, using the Cadence Virtuoso-based Spectre simulator. Power supplies between 150 mV and 600 mV were tested for energy estimation. Monte Carlo statistical simulations were performed at 300 mV to compare the sensitivity of the simulated gates to process variations and mismatch. The DML gates, tested in the rest of this paper, are unfooted; except for sub-section 3.C, where the comparison of the footed DML gates to their footed dynamic counterparts is presented. In cases of DML gates without footers, the simulation results include the overhead of generating the ripple pre-charge signals. In order to provide a fair comparison, the same metric was used to design all gates (CMOS, Domino and DML). Instead of achieving the same delay, all gates were designed to conduct the same $I_{on}$ current during the evaluation. This current is equal to the $I_{on}$ current flowing through a single transistor of a CMOS inverter.

VIII.2. Speed

We set up a framework for evaluating frequency consisting of Fan-Out 3 NAND and NOR gates. We compared standard CMOS gates, unfooted DML gates, and Domino gates both with and without a keeper (The role of the keeper in receiving acceptable robustness is discussed.

A test chain was composed of 20 consecutive NAND and NOR gates, in which the NOR gate was implemented in A topology, and NAND was implemented in B topology, laying a similar structure to an np-CMOS design. While this np-CMOS like chain demonstrated better results, we also show the performance of consecutive DML gates of the same type. We tested the minimal functional period T of the entire chain, in which T is defined below, and the operation frequency of the entire chain is f=1/T, where:

$$T = \frac{t_{HL} + t_{LH}}{2}$$

Figure 18:
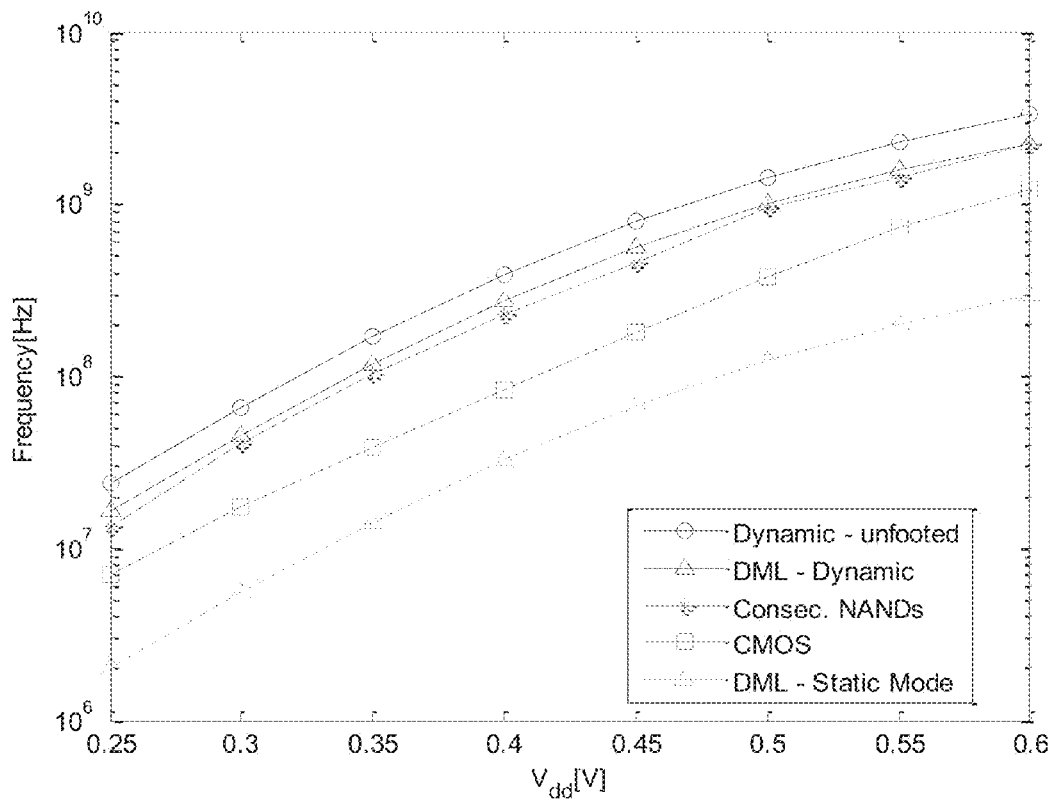
FIG. 18 shows a comparison of the maximum gate frequency as a function of VDD for CMOS, Dynamic & DML chains.

After the pre-charge phase, the output of a dynamic NOR gate is high, and, when no switching occurs, it literally gives $t_{plh}$=0. When switching does occur, the output capacitance $C_L$ is discharged through the pull-down network. Usually, the mentioned $C_L$ will be the input capacitance of the next node in the dynamic chain, so it is substantially smaller than the input capacitance of the CMOS equivalent. The switching period thus is decreased and becomes similar to the CMOS-design current-sinking capabilities of the pull-down network. This analysis seems somewhat unfair, since it does not take into account the pre-charge phase. However, it is very often possible to conceal the pre-charge during other system functions. FIG. 18 depicts a comparison of the maximum gate frequency as a function of VDD for CMOS, Dynamic & DML chains. First, as expected, the highest frequency is achieved by unfooted Dynamic logic. However, Dynamic logic is very sensitive to process variations (will be discussed below), which make it unusable for the sub-threshold regime. Second are the Dynamic DML gates with an average of an order of magnitude higher frequency than CMOS. The unfavorable case of consecutive gates of the same type (in this case the chain was composed of interleaved Type A and Type B NAND gates) is third, showing speed degradation of 17%, as compared to the DML chain of consecutive NAND and NOR gates. CMOS logic is fourth, achieving frequency which is lower by 60% than the worst case of the Dynamic DML. Fifth, and last, is the static DML, which offers on average 55% of the achievable CMOS frequency. This means that switching from static mode in DML to dynamic mode offers a 14× frequency boost on average, with energy consumption consequences that will be discussed in the following sub-section.

VIII.3. Energy Dissipation

Figure 19:
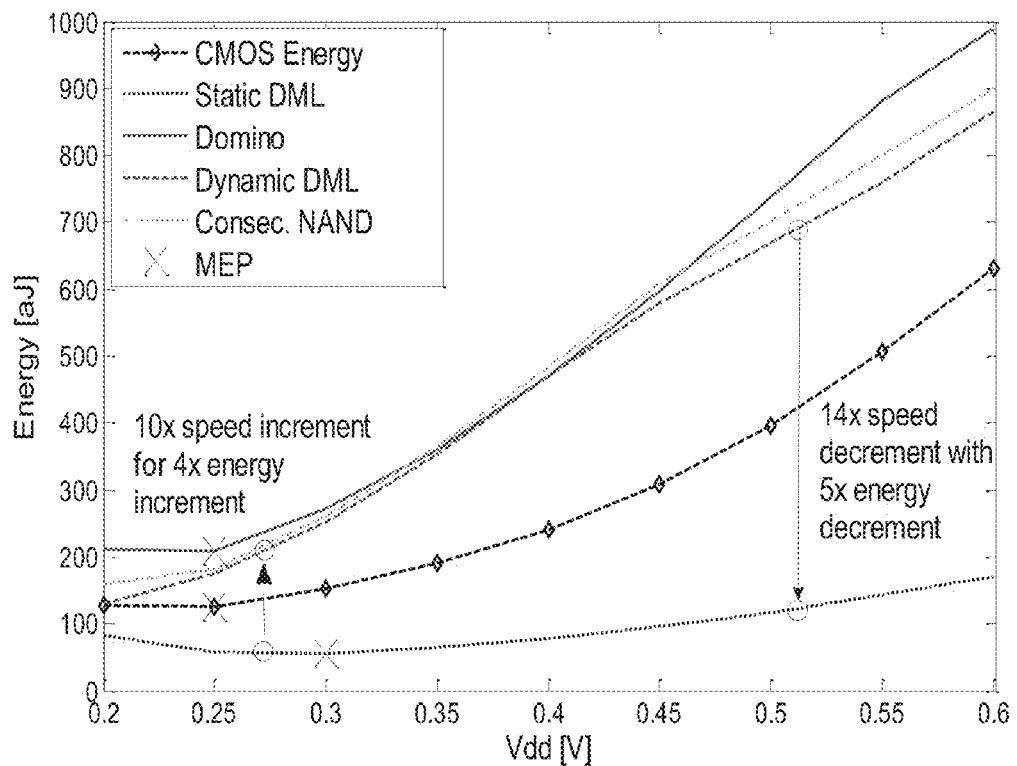
FIG. 19 shows a NAND-NOR test chain energy consumption.

A simulation of the same chain composed of 20 consecutive NAND-NOR demonstrates an energy consumption analysis. We used the test chain to estimate the total energy consumed during one switch. We used only footed Dynamic gates, since, as previously noted, an unfooted Dynamic gate does not stand process variation. The results of the analysis are shown in FIG. 19, which shows a NAND-NOR test chain energy consumption vs. VDD for CMOS, Domino & DML (Static & Dynamic). $V_{DD}$ varies from 0.2V to 0.6V, and the Minimum Energy Point (MEP) is marked with an 'X'. The DML Static mode demonstrated a lowest energy consumption, on average, 2.2× less than CMOS and 5× less than Domino. As may be observed, the MEP for DML gates is located in the sub-threshold region. Although it may not be possible, the optimal operation voltage for ultra low power applications is $V_{DD,MEP}$ at MEP. If $V_{DD}$ is higher than $V_{DD,MEP}$, dynamic energy is wasted, and if $V_{DD}$ is below $V_{DD,MEP}$, leakage energy is wasted, due to the prolonged $T_{Cycle}$. Herein lies an interesting DML feature: the circuit may be tuned to operate at an MEP bound to a certain nominal frequency, but, when required for higher throughput, a higher frequency may be easily achieved by changing the operation mode to dynamic with an acceptable energy penalty.

The opposite is also possible: the circuit may operate at a high frequency, but at standby the consumed energy may drop down to 20% of the nominal consumption. As expected, Domino logic consumes the highest amount of energy, due to the pre-charging, high leakage and excessive transistors as keepers.

VIII.4. Robustness and Sensitivity to Process Variations

The sub-threshold regime, while offering low power consumption, suffers greatly from process variation susceptibility and reduction of noise margins. The extent of process variability is amplified due to the exponential relation of the active current with $V_{th}$ and $L_{eff}$. Furthermore, the ratio between the active current and the idle current ($I_{on}/I_{off}$) is much lower than in strong inversion. The $V_{OL}$ and $V_{OH}$ of a gate are functions of the current ratios between the pull-up and pull-down network. In the following sub-sections we present two metrics used to quantitatively estimate the robustness of DML logic versus CMOS and Domino design. A different, precise noise margin extraction for sub-threshold may be used for a given circuit, but for a more general analysis we will use the following methods.

VIII.5. Static Noise Margin

The metric to estimate an employed logic gate failure is static noise margin (SNM) for logic gates. This metric suggests a simple analysis of the butterfly curve. Logic failure is defined as a butterfly plot SNM analysis with no inscribed square, analogous to a 6T SRAM cell displaying negative SNM. In order to test DML we connected back-to-back a NAND gate to a NOR gate. SNM is defined as the largest inscribed square's side in the smaller lobe of a butterfly plot.

Figure 20:
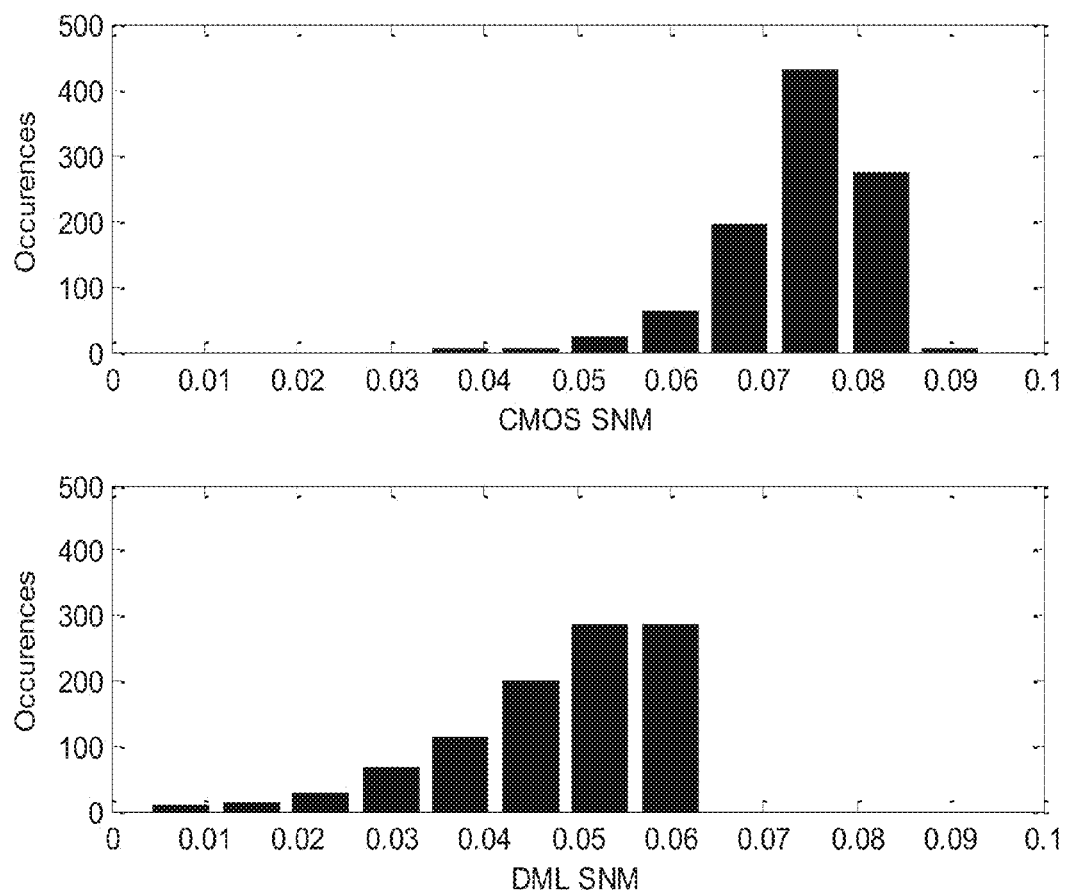
FIG. 20 shows the DML and CMOS SNMs at $V_{DD}$=300 mV.

We have used this criterion only for the CMOS and the static DML, since Dynamic logic and Dynamic DML cannot be tested correctly using this analysis. FIG. 20 shows the DML and CMOS SNMs at $V_{DD}$=300 mV. The Monte Carlo analysis for 1k points, which takes into account both local and global variations, was utilized. The simulated SNM for CMOS is $\mu_{CMOS}$=77 mV, $\sigma_{CMOS}$=7.7 mV, and the DML Static SNM is $\mu_{DML}$=52 mV, $\sigma_{DML}$=11.2 mV. The SNR of the SNM received for CMOS is a little bit higher than the SNR of Static DML, which implies higher robustness of CMOS. However, it may be seen that static DML is still very robust. Moreover, it should be noted that when DML was optimized for improved robustness rather than improved speed, better SNM values were received. In the following section we will evaluate the Dynamic DML versus the Domino robustness.

VIII.6. Logical Level Analysis

Figure 21:
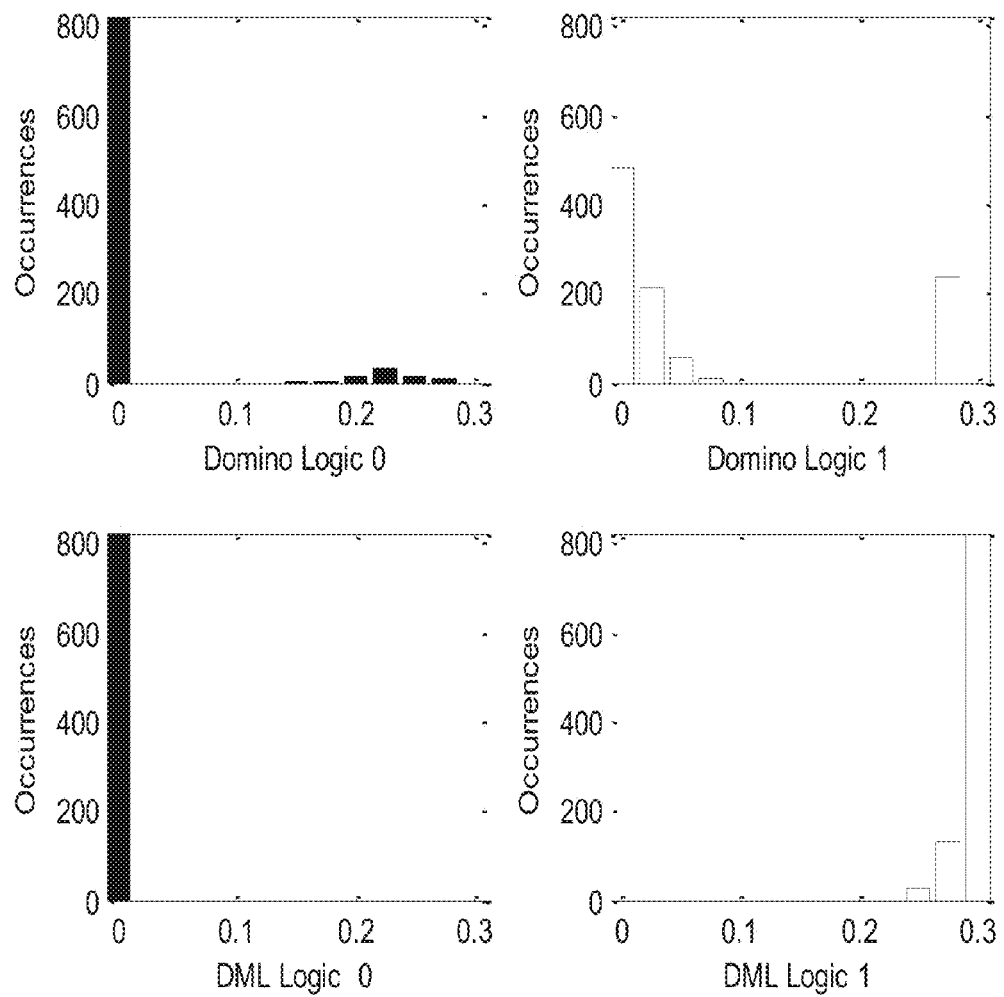
FIG. 21 shows LL histograms received at $V_{DD}$=300 mV.

To evaluate the process variation susceptibility of the Dynamic DML and the Domino, we introduced Logical Level (LL) analysis. We used LL analysis as a framework to evaluate the tested dynamic logic's ability to handle leakage currents. According to the LL analysis, a gate is pre-charged either to a $V_{DD}$ or dis-pre-charged to 0V; and, after a pre-defined period, the output voltages of the different gates are compared. Dynamic gates suffer from charge leakage, which becomes more severe in sub-threshold due to long static periods. This analysis takes into account all of the parasitic leakages, and approximates the robustness of the dynamic gate to hold a logical 0 or a logical 1. The test consisted of a single gate in a chain, pre-charged, and, after a period suitable for 10 Mhz operation, the voltage was measured at the output of the gate. We tested the DML unfooted gates versus the Domino gates with a keeper. We used a keeper since Domino gates without a keeper failed to operate. The LL analysis was performed using a 1K point Monte Carlo simulation with local and global inter-die variations, which simulate a sampling of logic gates across various dies. FIG. 21 shows the LL histograms received at $V_{DD}$=300 mV. The received results for logical '0' are $\mu_{DOMINO-0}$=16.8 mV, $\sigma_{DOMINO-0}$=61.3 mV and $\mu_{DML-0}$=22 mV, $\sigma_{DML-0}$=14.2 mV. For logical '1': $\mu_{DOMINO-1}$=89 mV, $\sigma_{DOMINO-1}$=118.4 mV and $\mu_{DML-1}$=299.8 mV, $\sigma_{DML-1}$=206 µV. These results strongly indicate an improved robustness of DML Dynamic logic versus standard Domino implementation. It may be noted that a fairly large amount of the tested Domino gates failed to keep the LL '1', due to the topology which consists of a stack of nMOS transistors struggling with a feeble pMOS pre-charge transistor at some of the simulated dies. We also examined the lowest possible Vdd for CMOS, Domino and DML under global and local variations. The results were 285 mV for CMOS, 470 mV for Domino and 300 mV for DML.

VIII.7. Delay Variation

Figure 22:
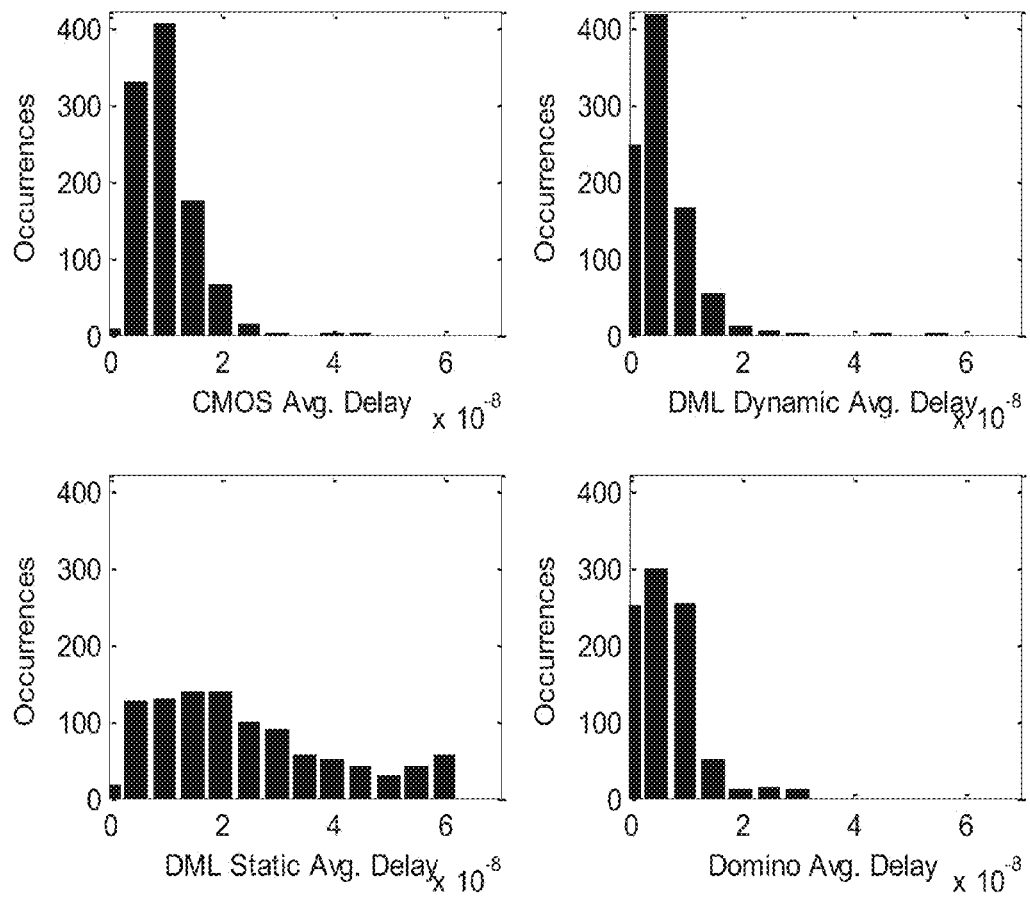
FIG. 22 shows lk a Monte Carlo analysis of average delay.

In addition to the logic level variation, another parameter that is of interest to designers is the variation in delay. Obviously, delay variation affects the performance, which thus affects the yield. It is well known that circuits operating in the sub-threshold regime exhibit more magnified sensitivity to variations than in the above-threshold. This is due to the exponential dependence of $V_{th}$. The common assumption is that $V_{th}$ is distributed normally; hence the sub-threshold current is distributed log-normally. The delay of a sub-threshold logic gate may be modeled as:

$$t_d = \frac{KC_g V_{DD}}{I_0 \cdot e^{\frac{(V_{GS}-V_T)}{n\phi_t}}}$$

where K is a fitting parameter, and Cg is the extracted output capacitance. The denominator is the active current, modeled using $I_0$ as a fitting parameter, which takes into account the total current flowing through the nMOS and pMOS transistors. Assuming non-varying output capacitance, we predict that the delay will also be log-normally distributed, since it is linearly related to the on current. Indeed, the 1k Monte Carlo analysis of the average delay yields a log-normal distribution, as depicted in FIG. 22. The received results are from fastest to slowest: Domino with $\mu_{Domino}$=12.77 nsec, DML Dynamic Mode with $\mu_{DML\_w\_footer}$=16.22 nsec, CMOS with $\mu_{CMOS}$=18.8 nsec and DML Static Mode with $\mu_{DML\_static}$=31 nsec. The Domino offers the highest frequency, but as previously discussed, it suffers greatly from leakage, and consequently exhibits a very low yield. In terms of yield, for example, if the target operation frequency is 10 Mhz at 300 mV, Monte Carlo results mean almost 100% yield in the case of the DML, and less than 40% in the Domino; thus, in practice, standard Domino logic is unsuitable for the sub-threshold regime.

IX. Exemplary DML Carry Look Ahead Adder

An exemplary high speed DML Carry Look Ahead Adder (CLA) architecture and performance analysis is now presented.

According to the proposed approach, the critical carry paths of the CLA are dynamically identified and sped, based on the input vectors. The rest of the CLA circuitry operates in the slower, energy efficient mode. In each calculation, the CLA adder's self-control chooses the paths to be dynamically operated by applying a statistical approach. To achieve this operation, all carry paths are implemented using Dual Mode Logic family (DML). The DML family may be switched between static and dynamic modes of operation according to system requirements. In the static (CMOS-like) mode, the DML gates feature very low power dissipation with moderate performance, while in the dynamic (NP or Domino-like) mode they achieve high performance, albeit with higher power dissipation. This unique feature of DML offers the ability to control system performance on-the-fly and thus support applications, such as the proposed CLA.

It was shown above that un-footed Type A DML topology possess much smaller delay than its CMOS counterparts (improvements of up to X 3.5 in frequency). It was also shown that Type A DML NOR gates achieved better performance than Type A DML NAND gates, mainly due to the reduced area\ capacitance of the DML NOR to the DML NAND structure in the type A topology. When compared to the un-footed Type B DML, it was shown that the DML possess smaller than or equal delay to its CMOS counterparts, but in this topology there is a significant delay advantage in the implementation of Type B DML NAND gates over Type B DML NOR gates. From delay comparison to the footed topology, it may be easily understood that although the added footer has several advantages, it severely deteriorates the delay in comparison to the un-footed topology, and only several footed DML gates are faster than their CMOS counterparts. For this reason the un-footed implementation would be preferable in most cases, where the pre-charge phase and power consumption are not constraining. While DML operation in the dynamic mode achieves a much better performance, it consumes more power than CMOS. On the other hand, DML operation in the static mode is power efficient and allows a power reduction of up to 33% and 45%, compared to CMOS and dynamic DML, respectively.

The DML CLA embodiment presented below was only made with an un-footed topology. Footed exceptions were implemented due to special cascading issues which are presented below.

To demonstrate the efficiency of the proposed approach, we have implemented a 32 bit DML CLA in low power TSMC 40 nm technology, and compared it to an equivalent CMOS CLA. The simulation results show that the proposed CLA architecture achieves 45% improvement in speed, with a small or non-existent overhead in area compared to the CMOS, and about 70% power improvement, when compared to the dynamic counterpart. The simulations show full functionality and robustness to global and local process variations at supply voltages as low as 0.6V.

IX.1. CLA Implementation

The CLA design offers reduced delay at the price of higher hardware complexity. In standard CMOS implementation, the critical path will typically be the longest carry route and it is determined by the number of bits: 2 log 2(N)−1. The proposed solution allows the critical path of the CLA to be dynamically chosen and accelerated by the operation of the DML gates of that path in the dynamic mode. The critical path is identified according to the inputs during operation, and set by 2 log 2(i)−1, where i<N is the max index of the generated carry. The longer the critical path, the better the improvement in delay will be achieved. In order to implement the proposed mechanism, decision logic, which identifies the critical path and creates the appropriate clock signals for the DML gates in this path, is required.

IX.2. Decision Logic

The decision whether or not to accelerate a carry route is based on the input of the CLA. The route should only be dynamically operated in cases where the carry out is generated. Table 2 shows a simple case, where two corresponding bits $X_i$ and $Y_i$ of the CLA inputs X and Y are examined. It is shown that a simple NOR operation between $X_i$ and $Y_i$ will ensure the dynamic operation of the path in the case of carry out generation. However, this simple solution will also operate 33% of the paths dynamically when the dynamic operation is not required, resulting in the increased power dissipation of the adder.

TABLE 2

| $X_i$ | $Y_i$ | $C_{in}$ | $C_{next}$ | Dynamic activation is needed | NOR ($x_i, y_i$): when = 0 the route is dynamically activated | False dynamic activation |
|---|---|---|---|---|---|---|
| 0 | 0 | 0 | 0 |  | 1 |  |
| 0 | 0 | 1 | 0 |  | 1 |  |
| 1 | 0 | 0 | 0 |  | 0 | Yes |
| 1 | 0 | 1 | 1 | Yes | 0 |  |
| 0 | 1 | 0 | 0 |  | 0 | Yes |
| 0 | 1 | 1 | 1 | Yes | 0 |  |
| 1 | 1 | 0 | 1 | Yes | 0 |  |
| 1 | 1 | 1 | 1 | Yes | 0 |  |

Figure 23:
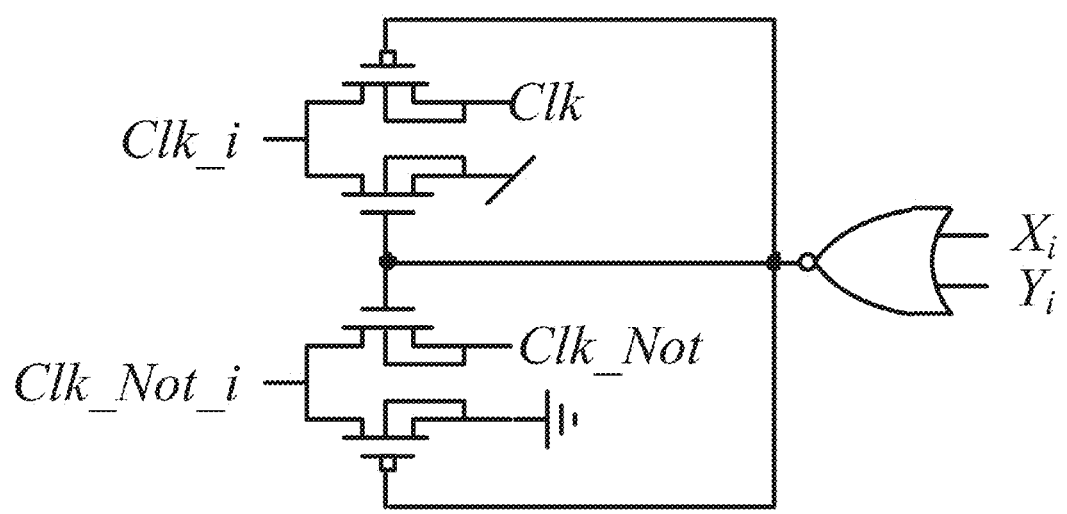
FIG. 23 shows an embodiment of a simple 1-bit decision circuitry.

FIG. 23 illustrates an implementation of a simple 1-bit decision circuitry, which is responsible for switching between dynamic to static modes of operation. This very simple 1-bit decision circuitry consists of two low-$V_{TH}$ transmission gates controlled by a 2-input NOR gate.

The decision is made based on $X_i$ and $Y_i$ bits (1 bit from each input) and the circuits' outputs are connected to the pre-charge transistors of the DML logic on the carry route. The CLK_i controls the pre-charge operation of Type A DML logic and CLK_NOT_i controls the pre-charge of the Type B logic. In cases where dynamic operation is not required, the outputs of the decision circuitry disable all M1 transistors on the route, achieving static operation of the DML gates. The proposed system is self-controlled and self-switched between static and partial-dynamic operation.

We have shown a very simple 1-bit decision circuit. However, a more precise decision may be implemented using more complex N-bit decision gates, which will decrease power dissipation by reducing the number of dynamically operated gates; albeit at the expense of area. It may be shown (not presented in this paper due to limitations of length) that the optimal solution (by means of a power-area trade-off) is achieved with the 2 to 4 bits based decision.

IX.3. DML CLA Architecture

Figure 24:
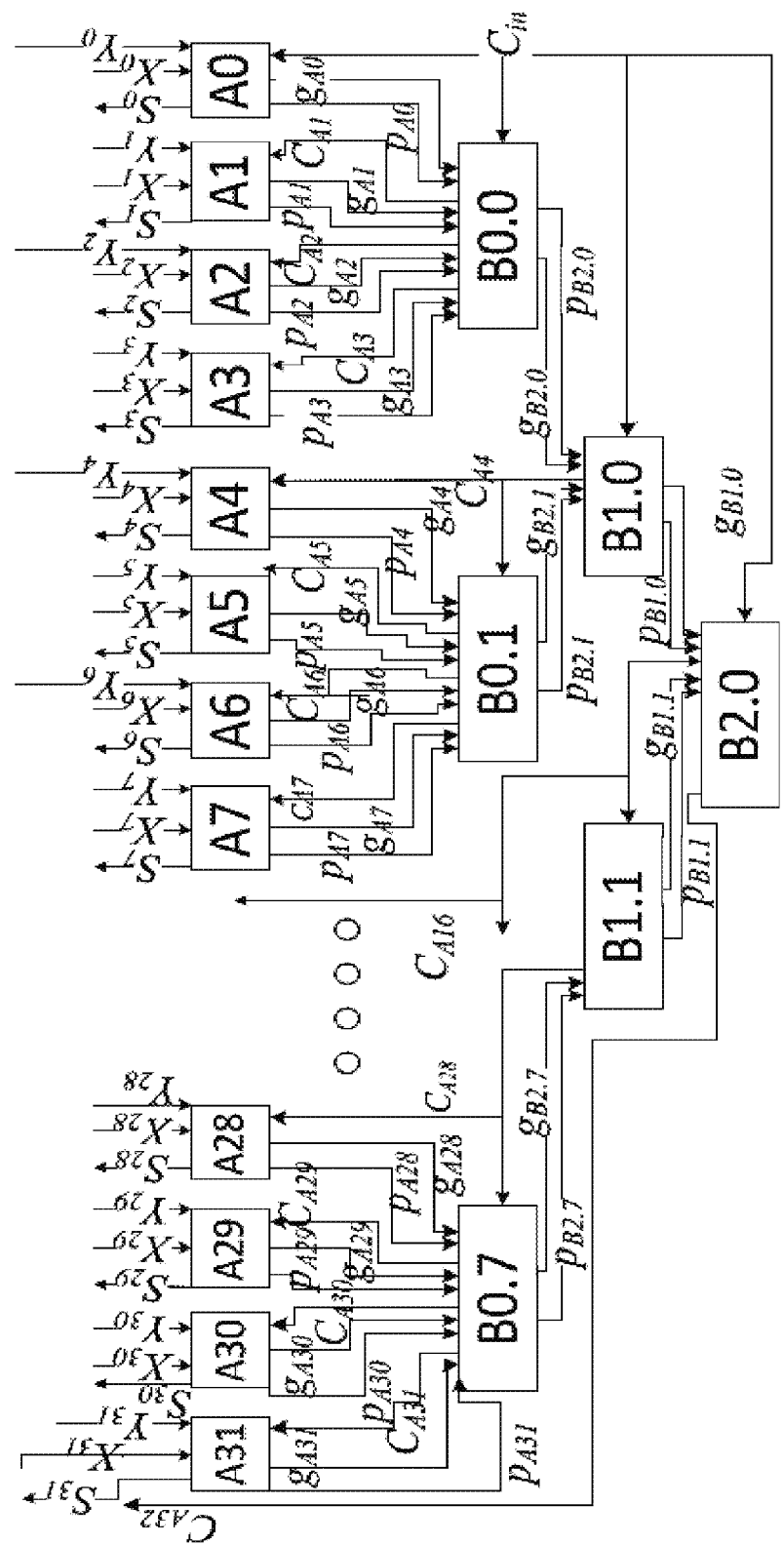
FIG. 24 is a simplified circuit diagram of an exemplary DML 32-bit CLA.

The architecture of the proposed 32-bit CLA is shown in FIG. 24. The core of the CLA is very similar to a conventional well-known and explored CLA design which is composed of 2 basic building-blocks: A and B. The functionality of these blocks is given in Table 3:

TABLE 3

| Block A | Block B |
|---|---|
| $s_i = X_i \oplus Y_i \oplus C_{At}$<br>$g_{At} = X_i \cdot Y_i$<br>$p_{At} = X_i + Y_i$ | $P_{out} = \prod_{l=0}^{3} p_{inl}$<br><br>$g_{out} = g_{in0} \cdot p_{in1} \cdot p_{in2} \cdot p_{in3} + g_{in1} \cdot p_{in2} \cdot p_{in3} + g_{in2} \cdot p_{in3} + g_{in3}$<br>$C_{out1} = g_{in0} + p_{in0}C_{in}; C_{out2} = g_{in1} + g_{in0}p_{in1} + C_{in}p_{in0}p_{in1}$<br>$C_{out3} = g_{in2} + g_{in1}p_{in2} + g_{in0}p_{in1}p_{in2} + C_{in}p_{in0}p_{in1}p_{in2}$ |

Figure 25A:
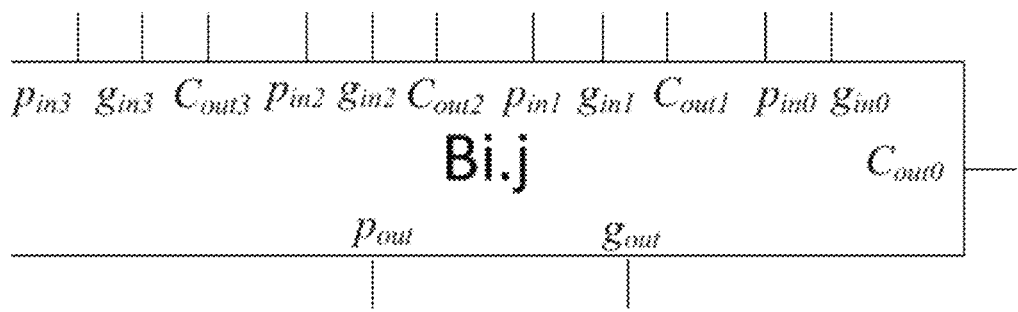
FIG. 25A shows inputs and outputs to a B block.
Figure 25B:
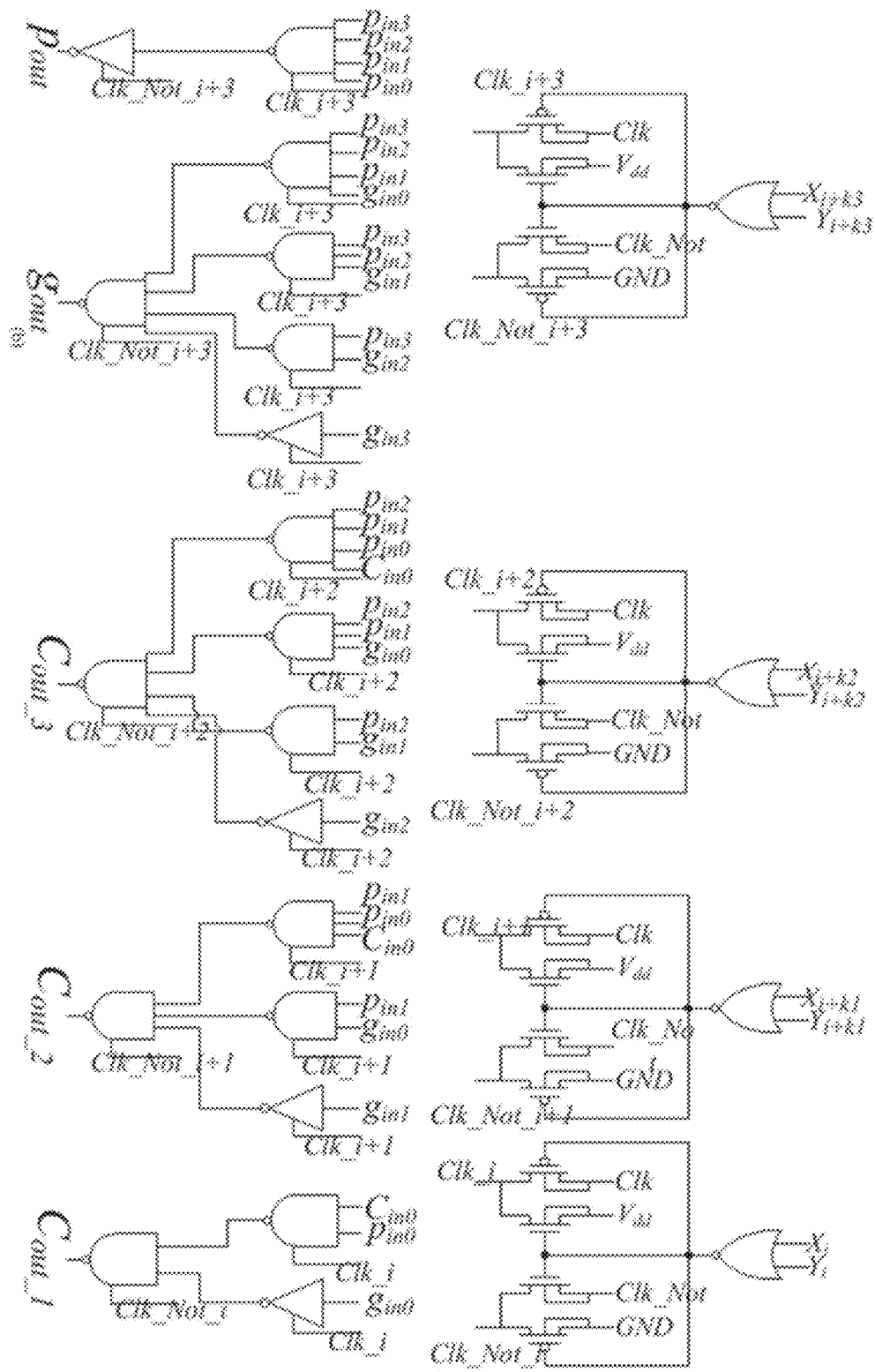
FIG. 25B shows the structure of a $B_{0,j}$ block.

The B blocks are indexed by m, j, where m represents the hierarchical level of the block (m=0, 1, 2). The inputs and outputs to a B block are presented in FIG. 25A. As may be seen in FIG. 25B the X and Y indexes are in the form of i+$k_j$ (where l is a sub series, l=0, 1, 2, 3). The i, k indexes depend on the B block hierarchical level, such that they depend on m (m=0, 1 or 2):

$m=0 \rightarrow i=0,4,8, \ldots 4n; k_j=1,2,3;$ $m=1 \rightarrow i=3,19,35, \ldots (4^2n+3); k_j=4,8,12;$ $m=2 \rightarrow i=15,79, \ldots (4^3n+15); k_j=16,32,48;$ While examining the structure of the $B_{0,j}$ (m=0) block, shown in FIG. 25B, it may be seen that besides the standard structure and logic functions that are present in conventional CMOS implementation, there are 4 extra 1-bit decision circuits. Each circuit is responsible for the dynamic or static operation of a specific route. For example, if the $X_i$, $Y_i$ inputs are such that a carry is needed, then the $C_{A(i+1)}$ route would be dynamically operated. Note that if inputs $X_{i+3}$, $Y_{i+3}$; Y=0, 4, 8, . . . , 28 are such that a carry is needed, then the carry is the output of a higher Hierarchical Level B block ($B_{m,j}$), and therefore all of this carry route ($C_{A(i+4)}$; Y=0, 4, 8, . . . , 28) is dynamically operated. This means that the inputs $p_{out}$, $g_{out}$ (or $p_{B(2,i\ mod3)}$, $g_{B(2,i\ mod3)}$) are dynamically operated from the $B_{0,j}$ block.

It is clear that this recursive and simple structure may be expanded to any CLA size. The third level 4 bit CLA is a recursive implementation of the previous level which only uses half of its hardware.

Gates with footer may be used at the first level of each B block to allow an efficient pre-charge. In order to allow correct operation, static signals must be stable at the system's inputs before evaluation, meaning they must overlap pre-charge time. This may be achieved through pipelining.

IX.4. Simulation Results

Figure 26:
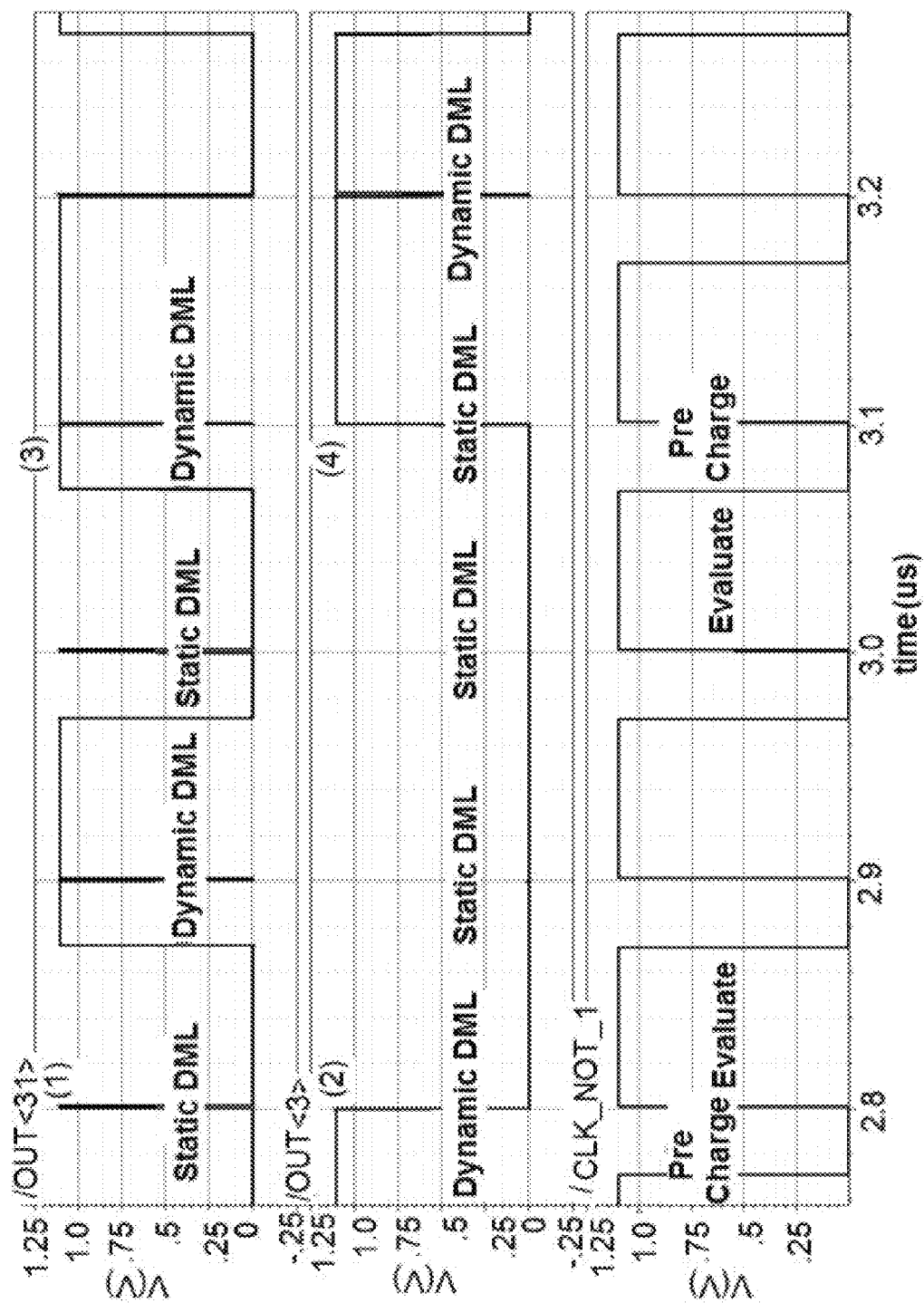
FIG. 26 shows an example of the simulation of two routes in the DML CLA.

The proposed 32 bit CLA was tested and characterized in a low power 40 nm TSMC process using a SPICE based Virtuoso simulator. Power supplies between 600 mV and 1V were tested to examine proper functionality. CLA functionally was examined in the presence of global and local process variations. DML CLA performance, power dissipation and area were compared to the CMOS and dynamic counterparts. FIG. 26 demonstrates an example of the simulation of two routes (out <3> and out <31>) and the global clock under standard 1.1V operation. As may be seen, depending on the input (not shown in FIG. 26), the routes are operated dynamically or statically. For example, it is clearly seen that the route of out <31> is in the dynamic mode at 2.9 usec, while the route of out <3> is computed statically.

Figure 27:
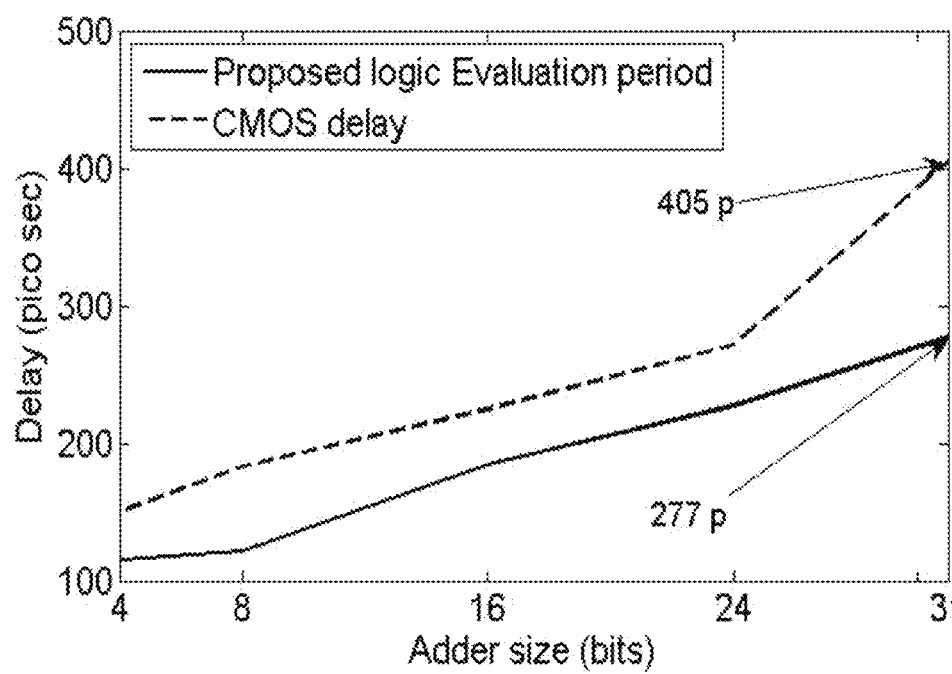
FIG. 27 shows a comparative the delay of a DML CLA to a conventional CMOS implementation.
Figure 28:
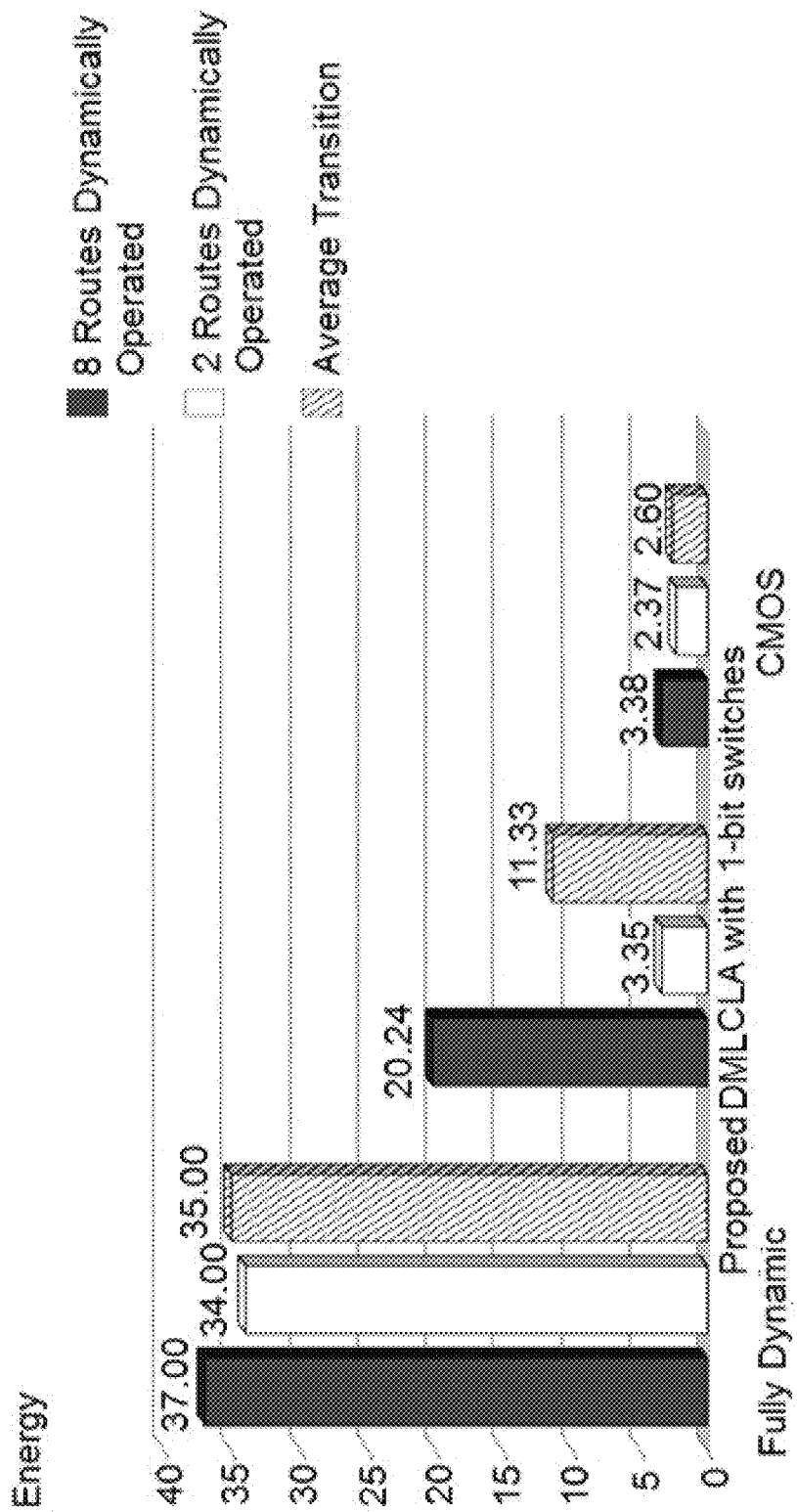
FIG. 28 shows energy dissipation (per single computation) of the exemplary DML CLA.

While the DML CLA achieves the same performance as a fully, dynamically operated adder (the proposed architecture ensures the dynamic operation of all critical paths), it presents improved delay compared to the CMOS CLA. FIG. 27 compares the delay of the DML CLA to the conventional CMOS implementation. The delay is shown as a function of the adder size. As may be seen, the proposed architecture achieves delay improvement of up to 45% for 32 bit size. Energy dissipation (per single computation) of the proposed architecture versus CMOS and the fully dynamic architecture is shown in FIG. 28.

The energy was measured for the case with simple input vectors (a small number of the dynamic carry routes) and for the case with complex vectors. As may be seen, the proposed architecture achieves significant power reduction, compared to the CLA, when constantly operated in the dynamic mode. On the other hand, fully static implementation achieves lower power dissipation. Power dissipation of the proposed CLA increases as the vector becomes more complex.

Table 4 shows a comparison between the number of transistors in CMOS and DML 32 and 64 bit adders. The area overhead decreases for large adders, where the overhead due to additional switches becomes negligible while the PC and footers overhead tends to a constant value.

Note that an increased number of transistors does not necessarily imply larger layout or capacitances due to the fact that about 50% of the transistors in the DML implementation are of minimum size.

TABLE 4

| Table content: transistor count | CMOS | Proposed DML with 1-bit switch's |
|---|---|---|
| 32 bit adder | 2524 | 3834 |
| 64 bit adder | 5180 | 7882 |

IX.5. DML CLA Conclusions

The above shows an exemplary high performance CLA. CLA implementation using DML logic allows the critical path of the CLA to be dynamically chosen and accelerated by operation of the DML gates of that path in the dynamic mode. Simulation results, carried out in a low power 40 nm TSMC process, showed an up to 45% improvement in speed compared to the CMOS CLA. While the proposed solution dissipates more power to achieve an improved performance, it was shown to be much more efficient than fully dynamic implementation.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A dual-mode logic gate, for selectable operation in either of static and dynamic modes, comprising:
   a static gate comprising, at least one logic input and a logic output;
   a mode selector, configured for outputting a turn-off signal to select static mode operation and for outputting a dynamic clock signal to select dynamic mode operation; and
   a switching element associated with said mode selector static gate, comprising a first input connected to a constant voltage, a second input for inputting said mode selection signal from said mode selector, and an output connected to a logic output of said static gate, configured to:
   i) disconnect said static gate output from both of said first and second inputs when said mode selector applies said turn-off signal to said second input; and
   ii) connect said static gate output to both of said first and second inputs when said mode selector applies said dynamic clock signal to said second input.

2. A dual-mode logic gate according to claim 1, wherein said switching element comprises a switching transistor having a first and second diffusion connection and a gate connection, wherein said first diffusion connection comprises said first input of said switching element, said gate connection comprises said second input of said switching element, and said second diffusion connection comprises said output of said switching element, such that for static operation said mode selector applies said turn-off signal to said gate connection so as to turn off said switching transistor, and for dynamic mode said mode selector applies said dynamic mode clock signal to said gate.

3. A dual-mode logic gate according to claim 2, wherein said static gate comprises a type-A gate and said switching transistor comprises a p-type transistor, said second diffusion connection being connected to a high constant voltage.

4. A dual-mode logic gate according to claim 2, wherein said static gate comprises a type-B gate and said switching transistor comprises an n-type transistor, said second diffusion connection being connected to a low constant voltage.

5. A dual-mode logic gate according to claim 1, further comprising a footer connected to said static gate.

6. A dual-mode logic gate according to claim 1, wherein said mode selector further comprises a clock input for inputting said dynamic mode clock signal.

7. A dual-mode logic gate according to claim 1, wherein said mode selector is further configured for internally-generating said dynamic mode clock signal.

8. A dual-mode logic gate according to claim 1, wherein said mode selector is further configured for determining a current mode of operation in accordance with mode selection inputs.

9. A dual-mode logic gate according to claim 1, wherein said static gate comprises a first portion comprising transistors configured for evaluation of logic input signals, and a second portion comprising transistors comprising static gate transistor unincluded in said first portion, and wherein said switching element is connected in parallel with said second portion of said static gate.

10. A dual-mode logic circuit, for selectable operation in either of static and dynamic modes, comprising:
   a plurality of DML blocks connected to perform a logic function, each of said DML blocks being independently selectable for static or dynamic operation; and
   a mode selector associated with said plurality of DML blocks, configured for selecting between static and dynamic operation by outputting a mode selection signal to each of said DML blocks to select between static and dynamic operation for each of said DML blocks.

11. A dual-mode logic circuit in accordance with claim 10, wherein said mode selector is configured for outputting a turn-off signal to select static mode operation and for outputting a dynamic clock signal to select dynamic mode operation.

12. A dual-mode logic circuit in accordance with claim 11, wherein each of said DML blocks comprises:
   a respective static gate comprising at least one logic input and a logic output; and
   a respective switching element associated with said static gate, comprising a first input connected to a constant voltage, a second input for inputting said mode selection signal from said mode selector, and an output connected to a logic output of said static gate, and configured to:
   i) disconnect said static gate output from both of said first and second inputs when said mode selector applies said turn-off signal to said second input; and
   ii) periodically connecting said static gate output to said constant voltage level, so as to enable dynamic operation.

13. A dual-mode logic circuit in accordance with claim 12, wherein said switching element comprises a switching transistor having a first and second diffusion connection and a gate connection, wherein said first diffusion connection comprises said first input of said switching element, said gate connection comprises said second input of said switching element, and said second diffusion connection comprises said output of said switching element, such that for static operation said mode selector applies said turn-off signal to said gate connection so as to turn off said switching transistor, and for dynamic mode said mode selector applies said dynamic mode clock signal to said gate.

14. A dual-mode logic circuit in accordance with claim 13, wherein to select static operation for a logic block said mode selector applies a turn-off signal to said second input of a respective switching element so as to turn off said respective switching element, and to select dynamic mode for said logic block said mode selector applies a dynamic mode clock signal to said second input of said respective switching element.

15. A dual-mode logic circuit in accordance with claim 10, wherein at least one of said DML blocks comprises a Type-A DML logic gate, each Type-A DML logic gate comprising a respective Type-A static gate and a respective p-type switching transistor having a first and second diffusion connection and a gate connection, said first diffusion connection of each switching transistor being connected to a logic output of said respective Type-A static gate.

16. A dual-mode logic circuit in accordance with claim 10, wherein at least one of said DML blocks comprises a Type-B static gate and a respective n-type switching transistor having a first and second diffusion connection and a gate connection, said first diffusion connection being connected to a logic output of said respective Type-B static gate.

17. A dual-mode logic circuit in accordance with claim 14, wherein said plurality of DML blocks comprises a plurality of Type-A DML blocks and a plurality of Type-B DML blocks, said Type-A and Type-B DML logic gates being cascaded in A-B pairs such that said mode selector applies said signals in parallel to said transistor gates.

18. A dual-mode logic circuit in accordance with claim 10, wherein said connected DML blocks comprise a plurality of transistors, each of said transistors being associated with a respective sizing factor, and wherein said respective sizing factors are selected so as to minimize a delay of said dual-mode logic circuit.

19. A dual-mode logic circuit in accordance with claim 18, wherein said minimized delay comprises a delay during dynamic operation.

20. A dual-mode logic circuit in accordance with claim 18, wherein said respective sizing factors are determined by logical effort optimization.

21. A dual-mode logic circuit in accordance with claim 10, comprising a plurality of critical paths, each critical path being independently selectable for static or dynamic operation, wherein said mode selector is further configured to determine a respective mode for each of said paths in accordance with current circuit operating conditions.

22. A method of delay control for a dual-mode logic circuit, comprising:
   providing dual-mode logic circuit comprising a plurality of critical paths, each of said critical paths being independently selectable for static or dynamic operation;
   selecting at least one of said critical paths for dynamic operation; and
   operating said selected critical paths in dynamic mode and said unselected critical paths in static mode.

23. A method according to claim 22, wherein said provided dual-mode logic circuit comprises a plurality of DML blocks connected to perform a logic function, each of said DML blocks being independently selectable for static or dynamic operation, and a mode selector associated with said plurality of DML blocks, configured for selecting between static and dynamic operation by outputting a mode selection signal to each of said DML blocks to select between static and dynamic operation for each of said DML blocks.

24. A method according to claim 23, wherein each of said DML blocks comprises:
   a respective static gate comprising at least one logic input and a logic output; and
   a respective switching transistor associated with said static gate, comprising a first and second diffusion connection and a gate connection, said first diffusion connection being connected to a logic output of said static gate.

25. A method according to claim 23, wherein said mode selector is configured for outputting a turn-off signal to select static mode operation and for outputting a dynamic clock signal to select dynamic mode operation, and wherein each of said DML blocks comprises:
   a respective static gate comprising at least one logic input and a logic output; and
   a respective switching element associated with said static gate, comprising a first input connected to a constant voltage, a second input for inputting said mode selection signal from said mode selector, and an output connected to a logic output of said static gate, and configured to:
   i) disconnect said static gate output from both of said first and second inputs when said mode selector applies said turn-off signal to said second input; and
   ii) periodically connecting said static gate output to said constant voltage level, so as to enable dynamic operation.

26. A method according to claim 22, wherein said operating comprises:
   applying a respective dynamic mode clock signal to each of said selected critical paths; and
   applying a respective turn-off signal to each of said unselected critical paths.

27. A method of transistor sizing for a dual-mode logic circuit according to claim 10, wherein each of said DML blocks comprises a plurality of transistors in a respective topology, each of said transistors being associated with a respective sizing factor, comprising:
   determining a delay of each of said DML blocks as a function of respective sizing factors of the transistors comprising said block;
   summing said determined DML block delays to obtain total path delay, said sum being a function of said respective transistor sizing factors of all of said DML blocks;
   deriving respective sizing factors to obtain equal effort from each of said DML blocks, in accordance with a respective topology of each of said DML blocks,
   thereby obtaining optimized delay for said dual-mode logic circuit.

28. A method according to claim 27, wherein said DML blocks form a logic path, further comprising determining an optimal number of stages in said path.

29. A method according to claim 28, further comprising inserting buffer stages within said logic path so as to obtain said optimal number of stages.

* * * * *